United States Patent
Jaros et al.

(10) Patent No.: US 8,219,507 B2
(45) Date of Patent: Jul. 10, 2012

(54) HIERARCHICAL TEMPORAL MEMORY SYSTEM WITH ENHANCED INFERENCE CAPABILITY

(75) Inventors: Robert G. Jaros, San Francisco, CA (US); Dileep George, Menlo Park, CA (US)

(73) Assignee: Numenta, Inc., Redwood City, CA (US)

( * ) Notice: Subject to any disclaimer, the term of this patent is extended or adjusted under 35 U.S.C. 154(b) by 991 days.

(21) Appl. No.: 12/147,348

(22) Filed: Jun. 26, 2008

(65) Prior Publication Data

US 2009/0006289 A1    Jan. 1, 2009

Related U.S. Application Data

(60) Provisional application No. 60/947,272, filed on Jun. 29, 2007, provisional application No. 61/060,891, filed on Jun. 12, 2008.

(51) Int. Cl.
*G06F 15/18* (2006.01)
*G06F 9/44* (2006.01)
*G06N 7/02* (2006.01)
*G06N 7/06* (2006.01)

(52) U.S. Cl. .......................... 706/12; 706/52

(58) Field of Classification Search .......... 706/12, 706/52
See application file for complete search history.

(56) References Cited

U.S. PATENT DOCUMENTS

| | | |
|---|---|---|
| 4,766,534 A | 8/1988 | DeBenedictis |
| 4,845,744 A | 7/1989 | DeBenedictis |
| 5,255,348 A | 10/1993 | Nenov |
| 5,712,953 A | 1/1998 | Langs |
| 6,122,014 A | 9/2000 | Panusopone et al. |
| 6,195,622 B1 | 2/2001 | Altschuler et al. |
| 6,400,996 B1 | 6/2002 | Hoffberg et al. |
| 6,468,069 B2 | 10/2002 | Lemelson et al. |

(Continued)

FOREIGN PATENT DOCUMENTS

EP    1557990 A    7/2005

(Continued)

OTHER PUBLICATIONS

Dean,T. et al. "Learning invariant features using inertial priors". Ann Math Artif Intell (2006) 47: pp. 223-250. DOI:10.1007/s10472-006-9039-9.*

(Continued)

*Primary Examiner* — Jeffrey A Gaffin
*Assistant Examiner* — Benjamin Buss
(74) *Attorney, Agent, or Firm* — Fenwick & West LLP

(57) ABSTRACT

A node, a computer program storage medium, and a method for a hierarchical temporal memory (HTM) network where at least one of its nodes generates a top-down message and sends the top-down message to one or more children nodes in the HTM network. The first top-down message represents information about the state of a node and functions as feedback information from a current node to its child node. The node may also maintain history of the input patterns or co-occurrences so that temporal relationships between input patterns or co-occurrences may be taken into account in an inference stage. By providing the top-town message and maintaining history of previous input patterns, the HTM network may, among others, (i) perform more accurate inference based on temporal history, (ii) make predictions, (iii) discriminate between spatial co-occurrences with different temporal histories, (iv) detect "surprising" temporal patterns, (v) generate examples from a category, and (vi) fill in missing or occluded data.

28 Claims, 26 Drawing Sheets

U.S. PATENT DOCUMENTS

| | | | |
|---|---|---|---|
| 6,567,814 B1 | 5/2003 | Banker et al. | |
| 6,625,585 B1 | 9/2003 | MacCuish et al. | |
| 6,714,941 B1 | 3/2004 | Lerman et al. | |
| 6,751,343 B1 | 6/2004 | Ferrell et al. | |
| 6,957,241 B2 | 10/2005 | George | |
| 7,088,693 B2 | 8/2006 | George | |
| 7,739,208 B2 | 6/2010 | George et al. | |
| 7,826,990 B2 | 11/2010 | Nasle et al. | |
| 7,840,395 B2 | 11/2010 | Nasle et al. | |
| 7,840,396 B2 | 11/2010 | Radibratovic et al. | |
| 7,844,439 B2 | 11/2010 | Nasle et al. | |
| 7,844,440 B2 | 11/2010 | Nasle et al. | |
| 7,937,342 B2 | 5/2011 | George et al. | |
| 7,983,998 B2 | 7/2011 | George et al. | |
| 8,037,010 B2 | 10/2011 | Jaros et al. | |
| 8,121,961 B2 | 2/2012 | George et al. | |
| 2003/0069002 A1 | 4/2003 | Hunter et al. | |
| 2003/0123732 A1 | 7/2003 | Miyazaki et al. | |
| 2003/0167111 A1 | 9/2003 | Kipersztok et al. | |
| 2004/0002838 A1 | 1/2004 | Oliver et al. | |
| 2004/0148520 A1 | 7/2004 | Talpade et al. | |
| 2004/0267395 A1 | 12/2004 | Discenzo et al. | |
| 2005/0063565 A1 | 3/2005 | Nagaoka et al. | |
| 2005/0190990 A1 | 9/2005 | Burt et al. | |
| 2005/0222811 A1 | 10/2005 | Jakobson et al. | |
| 2006/0184462 A1 | 8/2006 | Hawkins | |
| 2006/0235320 A1 | 10/2006 | Tan et al. | |
| 2006/0248026 A1 | 11/2006 | Aoyama et al. | |
| 2006/0248073 A1 | 11/2006 | Jones et al. | |
| 2006/0259163 A1 | 11/2006 | Hsiung et al. | |
| 2007/0005531 A1 | 1/2007 | George et al. | |
| 2007/0192264 A1 | 8/2007 | Hawkins et al. | |
| 2007/0192267 A1 | 8/2007 | Hawkins et al. | |
| 2007/0192268 A1 | 8/2007 | Hawkins et al. | |
| 2007/0192269 A1 | 8/2007 | Saphir et al. | |
| 2007/0192270 A1 | 8/2007 | Hawkins et al. | |
| 2007/0276744 A1 | 11/2007 | Burke | |
| 2007/0276774 A1 | 11/2007 | Ahmad et al. | |
| 2008/0059389 A1 | 3/2008 | Jaros et al. | |
| 2008/0208966 A1 | 8/2008 | Edwards et al. | |
| 2009/0240886 A1 | 9/2009 | Sayfan et al. | |
| 2009/0313193 A1 | 12/2009 | Hawkins et al. | |
| 2012/0005134 A1 | 1/2012 | Jaros et al. | |

FOREIGN PATENT DOCUMENTS

| | | | |
|---|---|---|---|
| WO | WO 2006/063291 A | 6/2006 | |
| WO | WO 2008/067326 A2 | 6/2008 | |
| WO | WO 2009/006231 A | 1/2009 | |

OTHER PUBLICATIONS

Dimitrova, N. et al., "Motion Recovery for Video Content Classification," ACM Transactions on Information Systems, Oct. 1995, pp. 408-439, vol. 13, No. 4.

Dolin, R. et al., "Scalable Collection Summarization and Selection," Association for Computing Machinery, 1999, pp. 49-58.

Guerrier, P., "A Generic Architecture for On-Chip Packet-Switched Interconnections," Association for Computing Machinery, 2000, pp. 250-256.

Kim, J. et al., "Hierarchical Distributed Genetic Algorithms: A Fuzzy Logic Controller Design Application," IEEE Expert, Jun. 1996, pp. 76-84.

Mishkin, M. et al., "Hierarchical Organization of Cognitive Memory," Phil. Trans. R. Soc. B., 1997, pp. 1461-1467, London.

Park, S. et al., "Recognition of Two-person Interactions Using a Hierarchical Bayesian Network," ACM SIGMM International Workshop on Video Surveillance (IWVS) 2003, pp. 65-76, Berkeley, USA.

Poppel, E., "A Hierarchical Model of Temporal Perception," Trends in Cognitive Sciences, May 1997, pp. 56-61, vol. 1, No. 2.

Tsinarakis, G.J. et al. "Modular Petri Net Based Modeling, Analysis and Synthesis of Dedicated Production Systems," Proceedings of the 2003 IEEE International Conference on Robotics and Automation, Sep. 14-19, 2003, pp. 3559-3564, Taipei, Taiwan.

Tsinarakis, G.J. et al. "Modular Petri Net Based Modeling, Analysis, Synthesis and Performance Evaluation of Random Topology Dedicated Production Systems," Journal of Intelligent Manufacturing, 2005, vol. 16, pp. 67-92.

United States Office Action, U.S. Appl. No. 11/680,197, Mar. 23, 2010, twelve pages.

United States Office Action, U.S. Appl. No. 11/713,157, Mar. 31, 2010, 14 pages.

United States Office Action, U.S. Appl. No. 11/622,458, Apr. 1, 2010, 16 pages.

United States Office Action, U.S. Appl. No. 11/622,455, Apr. 21, 2010, 12 pages.

Wu, G. et al., "Multi-camera Spatio-temporal Fusion and Biased Sequence-data Learning for Security Surveillance," Association for Computing Machinery, 2003, pp. 528-538.

Fine, S. et al., "The Hierarchical Hidden Markov Model: Analysis and Applications," Machine Learning, 1998, pp. 41-62, vol. 32, Kluwer Academic Publishers, Boston.

Kuenzer, A. et al., "An Empirical Study of Dynamic Bayesian Networks for User Modeling," Proc. of the UM 2001 Workshop on Machine Learning, pages.

Adelson, E.H. et al., "The Perception of Shading and Reflectance," Perception as Bayesian Inference, Knill, D.C. et al., ed., 1996, pp. 409-423, Cambridge University Press, UK.

Agrawal, R. et al., "Mining Sequential Patterns," IEEE, 1995, pp. 3-14.

Archive of "Numenta Platform for Intelligent Computing Programmer's Guide," Numenta, Mar. 7, 2007, pp. 1-186, www.numenta.com, [Online] Archived by http://archive.org on Mar. 19, 2007; Retrieved on Aug. 13, 2008] Retrieved from the Internet<URL:http://web.archive.org/web/20070319232606/http://www.numenta.com/for-developers/software/pdf/nupic_prog_guide.pdf>.

Becerra, J.A. et al., "Multimodule Artificial Neural Network Architectures for Autonomous Robot Control Through Behavior Modulation," IWANN 2003, LNCS, J. Mira (Ed.), pp. 169-176, vol. 2687, Springer-Verlag.

Csapo, A.B. et al., "Object Categorization Using VFA-Generated Nodemaps and Hierarchical Temporal Memories," IEEE International Conference on Computational Cybernetics, IEEE, Oct. 7, 2007, pp. 257-262.

Demeris, Y. et al., "From Motor Babbling to Hierarchical Learning by Imitation: A Robot Developmental Pathway," Proceedings of the Fifth International Workshop on Epigenetic Robotics: Modeling Cognitive Development in Robotic Systems, 2005, pp. 31-37.

Ding, C.H.Q., "Cluster Merging and Splitting in Hierarchical Clustering Algorithms," Proceedings of the 2002 IEEE International Conference on Data Mining (ICDM 2002), Dec. 9, 2002, pp. 139-146.

European Examination Report, European Application No. 05853611.1, Jun. 23, 2008, 4 pages.

European Examination Report, European Application No. 07750385.2, Apr. 21, 2009, 8 pages.

Felleman, D.J. et al., "Distributed Hierarchical Processing in the Primate Cerebral Cortex," Cerebral Cortex, Jan./Feb. 1991, pp. 1-47, vol. 1.

Fine, S. et al., "The Hierarchical Hidden Markov Model: Analysis and Applications," Machine Learning, Jul. 1998, pp. 41-62, vol. 32.

Foldiak, P., "Learning Invariance from Transformation Sequences," Neural Computation, 1991, pp. 194-200, vol. 3, No. 2.

Fukushima, K., "Neocognitron: A Self-Organizing Neural Network Model for a Mechanism of Pattern Recognition Unaffected by Shift in Position," Biol. Cybernetics, 1980, pp. 193-202, vol. 36.

George, D. et al., "A Hierarchical Bayesian Model of Invariant Pattern Recognition in the Visual Cortex," Mar. 2005.

George, D. et al., "Invariant Pattern Recognition Using Bayesian Inference on Hierarchical Sequences," Technical Report, Oct. 2004, pp. 1-8.

George, D. et al., "A Hierarchical Bayesian Model of Invariant Pattern Recognition in the Visual Cortex," Proceedings, 2005 IEEE International Joint Conference on Neural Networks, Jul. 31-Aug. 4, 2005, pp. 1812-1817, vol. 3.

Gottschalk, K. et al., "Introduction to Web Services Architecture," IBM Systems Journal, 2002, pp. 170-177, vol. 41, No. 2.

Guinea, D. et al., "Robot Learning to Walk: An Architectural Problem for Intelligent Controllers," Proceedings of the 1993 International Symposium on Intelligent Control, Chicago, IL, IEEE, Aug. 1993, pp. 493-498.

Guo, C-E. et al., "Modeling Visual Patterns by Integrating Descriptive and Generative Methods," International Journal of Computer Vision, May 29, 2003, 28 pages, vol. 53, No. 1.

Han, K. et al., "Automated Robot Behavior Recognition Applied to Robotic Soccer," In Proceedings of the IJCAI-99 Workshop on Team Behaviors and Plan Recognition, 1999, 6 pages.

Hasegawa, Y. et al., "Learning Method for Hierarchical Behavior Controller," Proceedings of the 1999 IEEE International Conference on Robotics & Automation, May 1999, pp. 2799-2804.

Hawkins, J. et al., "Hierarchical Temporal Memory Concepts, Theory and Terminology," Numenta, Mar. 27, 2007 [Online] [Retrieved on Oct. 7, 2008] Retrieved from the Internet<URL:http://www.numenta.com/Numenta_HTM_Concepts.pdf>.

Hawkins, J. et al., "Hierarchical Temporal Memory Concepts, Theory and Terminology," Numenta, May 10, 2006 [Online] [Retrieved on Jul. 16, 2008] Retrieved from the Internet<URL:http://www.neurosecurity.com/whitepapers/Numenta_HTM_Concepts.pdf>.

Hawkins, J. et al., "On Intelligence," Sep. 2004, pp. 23-29, 106-174, 207-232, Times Books, Henry Holt and Company, New York, NY 10011.

Hawkins, J., "Why Can't a Computer Be More Like a Brain?" IEEE Spectrum, Apr. 1, 2007, pp. 21-26, vol. 44, No. 4, IEEE Inc., New York, US.

Hernandez-Gardiol, N. et al., "Hierarchical Memory-Based Reinforcement Learning," Proceedings of Neural Information Processing Systems, 2001, 7 pages.

Hinton, G.E. et al., "The "Wake-Sleep" Algorithm for Unsupervised Neural Networks," Science, May 26, 1995, pp. 1158-116, vol. 268.

Hoey, J., "Hierarchical Unsupervised Learning of Facial Expression Categories," 2001, IEEE, 0-7695-1293-3, pp. 99-106.

Hyvarinen, A. et al., "Bubbles: A Unifying Framework for Low-Level Statistical Properties of Natural Image Sequences," J. Opt. Soc. Am. A., 2003, pp. 1237-1252, vol. 20, No. 7.

International Search Report and Written Opinion, International Application No. PCT/US2007/003544, Jun. 16, 2008, 14 pages.

International Search Report and Written Opinion, International Application No. PCT/US2005/044729, May 14, 2007, 14 pages.

International Search Report and Written Opinion, International Application No. PCT/US07/85661, Jun. 13, 2008, 7 pages.

International Search Report and Written Opinion, International Application No. PCT/US08/55389, Jul. 25, 2008, 8 pages.

International Search Report and Written Opinion, International Application No. PCT/US08/55352, Aug. 1, 2008, 8 pages.

International Search Report and Written Opinion, International Application No. PCT/US2008/054631, Aug. 18, 2008, 14 pages.

International Search Report and Written Opinion, International Application No. PCT/US2008/068435, Oct. 31, 2008, 14 pages.

International Search Report and Written Opinion, International Application No. PCT/US2009/035193, Apr. 22, 2009, 14 pages.

Isard, M. et al., "ICONDENSATION: Unifying Low-Level and High-Level Tracking in a Stochastic Framework," Lecture Notes in Computer Science 1406, Burkhardt, H. et al., ed., 1998, pp. 893-908, Springer-Verlag, Berlin.

Lee, T.S. et al., "Hierarchical Bayesian Inference in the Visual Cortex," Journal of the Optical Society of America, Opt. Image. Sci. Vis., Jul. 7, 2003, pp. 1434-1448, vol. 20, No. 7.

Lenser, S. et al., "A Modular Hierarchical Behavior-Based Architecture," RoboCup 2001, LNAI 2377, 2002, Birk, A. et al, (Eds.), pp. 423-428, Springer-Verlag, Berlin, Heidelberg.

Lewicki, M.S. et al., "Bayesian Unsupervised Learning of Higher Order Structure," Moser, M.G. et al., ed., Proceedings of the 1996 Conference in Advances in Neural Information Processing Systems 9, 1997, pp. 529-535.

Murphy, K. et al., "Using the Forest to See the Trees: A Graphical Model Relating Features, Objects and Scenes," Advances in Neural Processing System, 2004, vol. 16.

Murray, S.O. et al., "Shaper Perception Reduces Activity in Human Primary Visual Cortex," Proceedings of the Nat. Acad. of Sciences of the USA, Nov. 2002, pp. 15164-151169, vol. 99, No. 23.

"Numenta Node Algorithms Guide NuPIC 1.6," Numenta, Jun. 13, 2008, pp. 1-6.

"Numenta Node Algorithms Guide NuPIC 1.6," Numenta, Jul. 22, 2008, pp. 1-7.

Olshausen, B.A. et al., "A Neurobiological Model of Visual Attention and Invariant Pattern Recognition Based on Dynamic Routing Information," Jnl. of Neuroscience, Nov. 1993.

Pearl, J., "Probabilistic Reasoning in Intelligent Systems: Networks of Plausible Inference," 1988, pp. 143-223, Morgan Kaufmann Publishers, Inc.

Riesenhuber, M. et al., "Hierarchical Models of Object Recognition in Cortex," Nature Neuroscience, Nov. 1999, pp. 1019-1025, vol. 2, No. 11.

Sinha, P. et al., "Recovering Reflectance and Illumination in a World of Painted Polyhedra," Fourth International Conference on Computer Vision, Berlin, May 11-14, 1993, pp. 156-163, IEEE Computer Society Press, Los Alamitos, CA.

Stringer, S.M. et al., "Invariant Object Recognition in the Visual System with Novel Views of 3D Objects," Neural Computation, Nov. 2002, pp. 2585-2596, vol. 14, No. 11.

Sudderth, E.B. et al., "Nonparametric Belief Propagation and Facial Appearance Estimation," AI Memo 2002-020, Dec. 2002, pp. 1-10, Artificial Intelligence Laboratory, Massachusetts Institute of Technology, Cambridge, MA.

Thomson, A.M. et al., "Interlaminar Connections in the Neocortex," Cerebral Cortex, 2003, pp. 5-14, vol. 13, No. 1.

Tsukada, M, "A Theoretical Model of the Hippocampal-Cortical Memory System Motivated by Physiological Functions in the Hippocampus", Proceedings of the 1993 International Joint Conference on Neural Networks, Oct. 25, 1993, pp. 1120-1123, vol. 2, Japan.

Van Essen, D.C. et al., "Information Processing Strategies and Pathways in the Primate Visual System," An Introduction to Neural and Electronic Networks, 1995, $2^{nd}$ ed.

Vlajic, N. et al., "Vector Quantization of Images Using Modified Adaptive Resonance Algorithm for Hierarchical Clustering", IEEE Transactions on Neural Networks, Sep. 2001, pp. 1147-1162, vol. 12, No. 5.

Wiskott, L. et al., "Slow Feature Analysis: Unsupervised Learning of Invariances," Neural Computation, 2002, pp. 715-770, vol. 14, No. 4.

Yedidia, J.S. et al., "Understanding Belief Propagation and its Generalizations," Joint Conference on Artificial Intelligence (IJCAI 2001), Seattle, WA, Aug. 4-10, 2001, 35 pages.

Zemel, R.S., "Cortical Belief Networks," Computational Models for Neuroscience, Hecht-Nielsen, R. et al., ed., 2003, pp. 267-287, Springer-Verlag, New York.

"Zeta1 Algorithms Reference, Version 1.0," Numenta Inc., Mar. 1, 2007, pp. 1-36.

"Zeta1 Algorithms Reference, Version 1.2," Numenta Inc., Jun. 8, 2007, pp. 1-38.

"Zeta1 Algorithms Reference, Version 1.3," Numenta Inc., Aug. 22, 2007, pp. 1-41.

"Zeta1 Algorithms Reference, Version 1.5," Numenta Inc., Aug. 24, 2007, pp. 1-45.

European Patent Office Communication, European Patent Application No. 07750385.2, Dec. 6, 2010, eight pages.

Lim, K. et al., "Estimation of Occlusion and Dense Motion Fields in a Bidirectional Bayesian Framework," *IEEE Transactions on Pattern Analysis and Machine Intelligence*, May 2002, pp. 712-718, vol. 24, No. 5.

Colombe, J., "A Survey of Recent Developments in Theoretical Neuroscience and Machine Vision," *Proceedings of the IEEE Applied Imagery Pattern Recognition Workshop*, 2003, nine pages.

Farahmand, N. et al., "Online Temporal Pattern Learning," *Proceedings of the International Joint Conference on Neural Networks*, Jun. 14-19, 2009, pp. 797-802, Atlanta, GA, USA.

Lo, J. "Unsupervised Hebbian Learning by Recurrent Multilayer Neural Networks for Temporal Hierarchical Pattern Recognition," *Information Sciences and Systems $44^{th}$ Annual Conference on Digital Object Identifier*, 2010, pp. 1-6.

Mannes, C., "A Neural Network Model of Spatio-Temporal Pattern Recognition, Recall and Timing," Technical Report CAS/CNS-92-013, Feb. 1992, Department of Cognitive and Neural Systems, Boston University, USA, seven pages.

Nair, D. et al., "Bayesian Recognition of Targets by Parts in Second Generation Forward Looking Infrared Images," *Image and Vision Computing*, 2000, pp. 849-864, vol. 18.

Rao, R. et al., "Predictive Coding in the Visual Cortex: A Functional Interpretation of Some Extra-classical Receptive-field Effects," *Nature Neuroscience*, Jan. 1999, pp. 79-87, vol. 2, No. 1.

Starzyk, J.A. et al., "Spatio-Temporal Memories for Machine Learning: A Long-Term Memory Organization," *IEEE Transactions on Neural Networks*, May 2009, pp. 768-780, vol. 20, No. 5.

Hawkins, J. et al., "Hierarchical Temporal Memory Concepts, Theory and Terminology," Numenta, Mar. 27, 2007, twenty pages. [Online] [Retrieved on Oct. 7, 2008] Retrieved from the Internet<URL:http://www.numenta.com/Numenta_HTM_Concepts.pdf>.

Ahmad, S., "NuPIC Jumpstart—Part II," Numenta®, May 2008, Numenta HTM Workshop, Jun. 23-24, 2008, SRI Campus, Menlo Park, CA, 34 pages.

Ahmad, S. et al., "PowerNuPIC," Numenta®, Jun. 2008, Numenta HTM Workshop, Jun. 23-24, 2008, SRI Campus, Menlo Park, CA, 57 pages.

Biancaniello, P. et al., Multimodal Pattern Recognition with Hierarchical Temporal Memory (MPR), Lockheed Martin Brain-Inspired Computing Research Overview, Numenta HTM Workshop, Jun. 2008, 12 pages.

Bobier, B., "Content-Based Image Retrieval Using Hierarchical Temporal Memory," Numenta HTM Workshop, Jun. 23-24, 2008, SRI Campus, Menlo Park, CA, 7 pages.

Curry, C. et al., "Speech Processing with HTM," Numenta®, Jun. 2008, Numenta HTM Workshop, Jun. 23-24, 2008, SRI Campus, Menlo Park, CA, 57 pages.

Dubinsky, D., "Numenta Business Strategy," Numenta®, Jun. 2008, Numenta HTM Workshop, Jun. 23-24, 2008, SRI Campus, Menlo Park, CA, 15 pages.

"EDSA Project Information," Numenta®, Apr. 2008, Numenta HTM Workshop, Jun. 23-24, 2008, SRI Campus, Menlo Park, CA, 4 pages.

Eswaran, K., "Numenta Lightning Talk on Dimension Reduction and Unsupervised Learning," Numenta HTM Workshop, Jun. 23-24, 2008, SRI Campus, Menlo Park, CA, 30 pages.

Finley, M., "Exploration of Motion Capture," Qualia Labs, Jun. 24, 2008, Numenta HTM Workshop, Jun. 23-24, 2008, SRI Campus, Menlo Park, CA, 36 pages.

George, D. et al., "The HTM Learning Algorithm," [Online] [Retrieved on Jan. 1, 2009] Retrieved from the Internet<URL:http://www.numenta.com/for-developers/education/Numenta_HTM_Learning_Algos.pdf>.

Haitani, R. et al., "Vitamin D Toolkit, Introduction," Jun. 24, 2008, Numenta HTM Workshop, Jun. 23-24, 2008, SRI Campus, Menlo Park, CA, 11 pages.

"HTM Algorithms," Numenta®, Jun. 2008, Numenta HTM Workshop, Jun. 23-24, 2008, SRI Campus, Menlo Park, CA, 67 pages.

"HTM Optimized Drug Therapy," SDSytem24.com, Numenta HTM Workshop, Jun. 23-24, 2008, SRI Campus, Menlo Park, CA, 7 pages.

"HTM Workshop, Jumpstart," Numenta®, Jun. 2008, Numenta HTM Workshop, Jun. 23-24, 2008, SRI Campus, Menlo Park, CA, 86 pages.

Levinson, S. et al., "Automatic Language Acquisition for a Mobile Robot," Feb. 2005, Numenta HTM Workshop, Jun. 23-24, 2008, SRI Campus, Menlo Park, CA, 27 pages.

McDowell, C. et al., "SlugGo, a Computer Go Program," Numenta HTM Workshop, Jun. 23-24, 2008, SRI Campus, Menlo Park, CA, 18 pages.

PCT International Search Report and Written Opinion, PCT Application No. PCT/US2009/047250, Sep. 25, 2009, 13 pages.

"Problem Solving with HTMs," Numenta®, Jun. 2008, Numenta HTM Workshop, Jun. 23-24, 2008, SRI Campus, Menlo Park, CA, 23 pages.

Ross, L., "Discovering and Using Patterns in Plant Floor Data," Numenta HTM Workshop, Jun. 23-24, 2008, SRI Campus, Menlo Park, CA, 12 pages.

Saphir, B., "Power NuPIC Part II, How to Create a New Node Type," Numenta®, Jun. 2008, Numenta HTM Workshop, Jun. 23-24, 2008, SRI Campus, Menlo Park, CA, 32 pages.

U.S. Office Action, U.S. Appl. No. 11/622,456, Mar. 20, 2009, 9 pages.

U.S. Office Action, U.S. Appl. No. 11/622,456, Nov. 6, 2008, 7 pages.

U.S. Office Action, U.S. Appl. No. 11/622,456, May 7, 2008, 14 pages.

U.S. Office Action, U.S. Appl. No. 11/622,454, Mar. 30, 2009, 11 pages.

U.S. Office Action, U.S. Appl. No. 11/622,454, Jun. 3, 2008, 13 pages.

U.S. Office Action, U.S. Appl. No. 11/622,457, Apr. 21, 2009, 6 pages.

U.S. Office Action, U.S. Appl. No. 11/622,457, Nov. 20, 2008, 8 pages.

U.S. Office Action, U.S. Appl. No. 11/622,457, May 6, 2008, 14 pages.

U.S. Office Action, U.S. Appl. No. 11/622,457, Aug. 24, 2007, 10 pages.

U.S. Office Action, U.S. Appl. No. 11/147,069, Jul. 29, 2009, 43 pages.

U.S. Office Action, U.S. Appl. No. 11/147,069, Jan. 9, 2009, 38 pages.

U.S. Office Action, U.S. Appl. No. 11/147,069, May 15, 2008, 37 pages.

U.S. Office Action, U.S. Appl. No. 11/147,069, Oct. 30, 2007, 34 pages.

U.S. Office Action, U.S. Appl. No. 11/147,069, May 29, 2007, 36 pages.

U.S. Office Action, U.S. Appl. No. 11/147,069, Jan. 9, 2007, 27 pages.

Vaught, T.N., "Software Design in Scientific Computing," Jun. 23, 2008, Numenta HTM Workshop, Jun. 23-24, 2008, SRI Campus, Menlo Park, CA, 32 pages.

"Vision Framework," Numenta®, Jun. 2008, Numenta HTM Workshop, Jun. 23-24, 2008, SRI Campus, Menlo Park, CA, 36 pages.

* cited by examiner

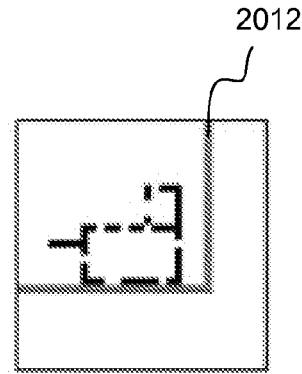
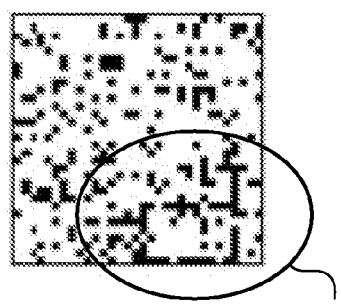
FIG. 20A  FIG. 20B
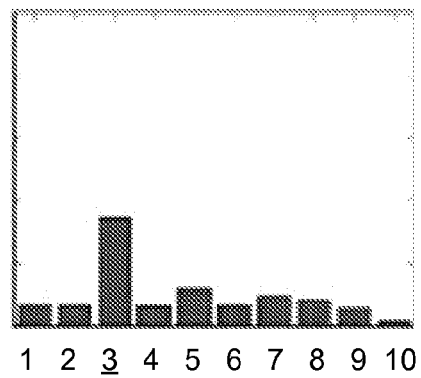
FIG. 20C
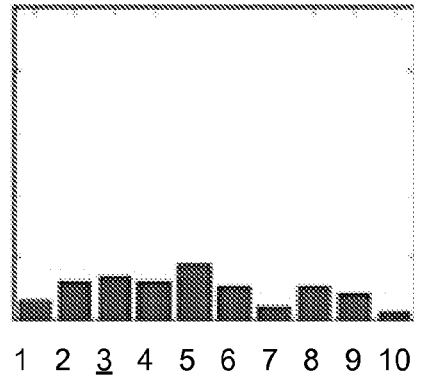
FIG. 20D

HIERARCHICAL TEMPORAL MEMORY SYSTEM WITH ENHANCED INFERENCE CAPABILITY

CROSS-REFERENCE TO RELATED APPLICATIONS

This application claims priority under 35 U.S.C. §119(e) to co-pending U.S. Provisional Application No. 60/947,272 entitled "Time Based Inference" filed on Jun. 29, 2007, and U.S. Patent Application Ser. No. 61/060,891 entitled "Higher-Order Temporal Pooler" filed on Jun. 12, 2008, the subject matter of which are incorporated by reference herein in their entirety. This application is related to U.S. patent application Ser. No. 12/039,630 entitled "Spatio-Temporal Learning Algorithms in Hierarchical Temporal Networks" filed on Feb. 28, 2008, which is incorporated by reference herein in its entirety.

FIELD OF THE INVENTION

The present invention is related to machine learning using Hierarchical Temporal Memory (HTM) systems, more specifically to using temporal relationships of input patterns and/or history of state of nodes during an inference stage to determine the cause of the input patterns.

BACKGROUND

Hierarchical Temporal Memory (HTM) networks represent a new approach to machine intelligence. In a HTM network, training data comprising temporal sequences of patterns are presented to a network of nodes. The HTM network then builds a model of the statistical structure inherent to the patterns and sequences in the training data, and thereby learns the underlying 'causes' of the temporal sequences of patterns and sequences in the training data. The hierarchical structures of the HTM network allow them to build models of very high dimensional input spaces using reasonable amounts of memory and processing capacity.

FIG. 1 is a diagram illustrating a hierarchical nature of the HTM network where the HTM network 10 has three levels L1, L2, L3, with level L1 being the lowest level, level L3 being the highest level, and level L2 placed between levels L1 and L3. Level L1 has nodes 11A, 11B, 11C and 11D; level L2 has nodes 12A and 12B; and level L3 has node 13. In the example of FIG. 1, the nodes 11A, 11B, 11C, 11D, 12A, 12B, and 13 are hierarchically connected in a tree-like structure such that each node has several children nodes (that is, nodes connected at a lower level) and one parent node (that is, node connected at a higher level). Each node 11A, 11B, 11C, 11D, 12A, 12B, and 13 may have or be associated with a capacity to store and process information. For example, each node 11A, 11B, 11C, 11D, 12A, 12B, and 13 may store sensed input data (for example, sequences of patterns) associated with particular causes. Further, each node 11A, 11B, 11C, 11D, 12A, 12B, and 13 may be arranged to (i) propagate information "forward" (that is, "up" an HTM hierarchy) to any connected parent node and/or (ii) propagate information "back" (that is, "down an HTM hierarchy) to any connected children nodes.

The nodes are associated or coupled to each other by links implemented as hardware or software. A link represents logical or physical relationships between an output of a node and an input of another node. Outputs from a node in the form of variables are communicated between the nodes via the links. Inputs to the HTM 10 from, for example, a sensory system, are supplied to the level L1 nodes 11A-D. A sensory system through which sensed input data is supplied to level L1 nodes 11A-D may relate to various senses (for example, touch, sight, sound).

The HTM training process is a form of unsupervised machine learning. However, during the training process, indexes attached to the input patterns may be presented to the HTM as well. These indexes allow the HTM to associate particular categories with the underlying generative causes that are learned. Once an HTM network has built a model of a particular input space, it can be switched into an 'inference' stage. In this stage, novel input patterns are presented to the HTM, and the HTM will generate a 'belief vector' that provides a quantitative measure of the degree of belief or likelihood that the input pattern was generated by the underlying cause associated with each of the indexed categories to which the HTM was exposed during the learning stage.

For example, an HTM might have been exposed to images of different animals, and simultaneously provided with category labels such as 'dog', 'cat', and 'bird' that identifies objects in the images during this training stage. In the inference stage, the network may be presented with a novel image of an animal, and the HTM may generate a vector of belief values. Each element in this vector represents the relative belief or likelihood that the novel input pattern is an image of a 'dog', 'cat', 'bird', etc.

The range of pattern recognition applications for which an HTM could be used is very wide. Example applications could include the categorization of email messages as unsolicited bulk email ('spam') or legitimate email ('non-spam'), digital pictures as pornographic or non-pornographic, loan applicants as good or bad credit risks, network traffic as malicious or benign, etc.

SUMMARY OF THE INVENTION

Embodiments provide a node, a computer program storage medium, and a method for a hierarchical temporal memory (HTM) network where top-down messages are generated and sent down to its children nodes in an inference stage. A node in a HTM network may include a spatial pooler, a temporal pooler and a top-down message generator. The spatial pooler may generate and store information about spatial co-occurrences ("spatial co-occurrences information") of input patterns received in a learning stage. The spatial pooler may generate an output representing probabilities that input patterns received in an inference stage correspond to the spatial co-occurrences based on the spatial co-occurrences information. The temporal pooler may generate and store temporal statistics data representing temporal groupings of the spatial co-occurrences based on temporal relationships of the spatial co-occurrences learned in the learning stage. The top-down message generator may generate a top-down message representing information about the state of the node in the inference stage based on the spatial co-occurrences information and the temporal statistics data. The generated top-down messages may be sent to the children nodes.

In one or more embodiments, the top-down messages are generated further based on history of input patterns previously received at the parent node in the inference stage. The history of input pattern may be represented by a variable that is updated at each time step in the inference stage.

In one or more embodiments, the top-down messages are generated by multiplying a downward dynamic variable, an output from a spatial pooler, and the temporal statistics data. The downward dynamic variable represents history of state of the node.

In one or more embodiments, the spatial pooler generates different outputs for the same input patterns depending on whether the node received the same input patterns in a previous time step.

In one or more embodiments, the node includes a bottom-up message generator that generates a bottom-up message. The bottom-up message represents information that an input pattern received at the node in the inference stage corresponds to the learned spatial co-occurrences, and is sent to a parent node of the node. The bottom-up message may be generated based on the input pattern received at a spatial pooler, and the history of state of the node.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

FIG. 8A illustrates a time adjacency matrix in accordance with an embodiment.

FIG. 8B illustrates a clustering of patterns into groups in a time adjacency matrix of FIG. 8A in, accordance with an embodiment.

FIG. 19A is a diagram illustrating portion of a black-and-white image for inclusion in a second noisy image, in accordance with an embodiment.

FIG. 19B is a second noisy image including the black-and-white image of a cat for presentation to the HTM network, in accordance with an embodiment.

FIG. 20A is a diagram illustrating portion of a black-and-white image for inclusion in a third noisy image, in accordance with an embodiment.

FIG. 20B is a third noisy image including the black-and-white image of a cat for presentation to the HTM network, in accordance with an embodiment.

FIG. 20C is the result of performing inference on the third noisy image of FIG. 20B by a HTM network with the enhanced inference node, in accordance with an embodiment.

FIG. 20D is the result of performing inference on the third noisy image of FIG. 20B by a HTM network without enhanced inference nodes, in accordance with an embodiment.

DETAILED DESCRIPTION

Figure 1:
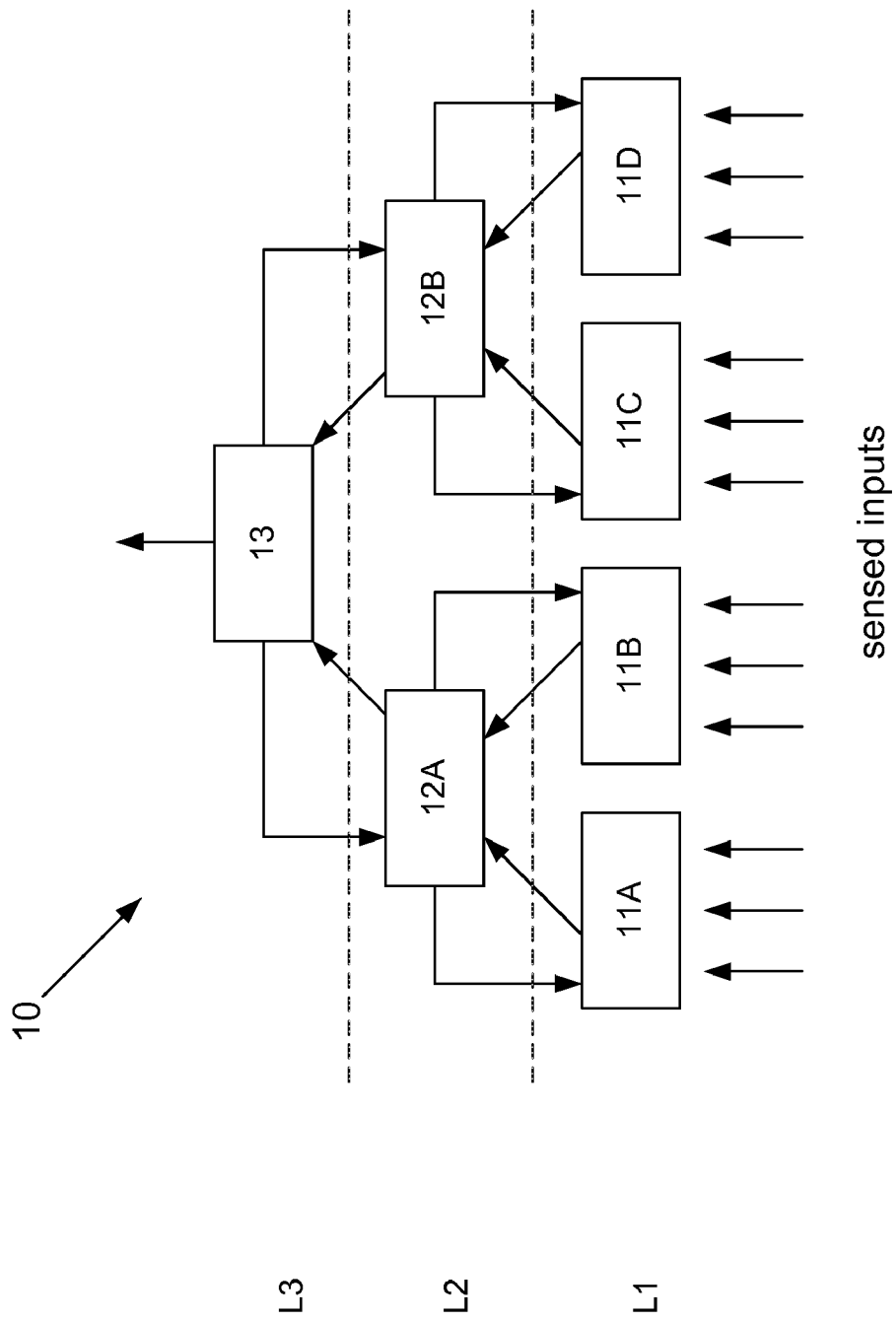
FIG. 1 is a conceptual diagram illustrating a hierarchical temporal memory (HTM) network.

In the following description of embodiments of the present invention, numerous specific details are set forth in order to provide a more thorough understanding of the present invention. However, note that the present invention may be practiced without one or more of these specific details. In other instances, well-known features have not been described in detail to avoid unnecessarily complicating the description.

A preferred embodiment of the present invention is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

A hierarchical temporal memory (HTM) network is a hierarchical network of interconnected nodes that individually and collectively (i) learn, over space and time, one or more causes of sensed input data and (ii) determine, dependent on learned causes, likely causes of novel sensed input data. The nodes are hierarchically arranged where the number of nodes decrease as level increases. In one or more embodiment, the HTM network has one top node that generates an output of the HTM network that is related to, among others, identification of object shown in an image, classification of digital images, as pornographic or non-pornographic, identification of email messages as unsolicited bulk email ('spam') or legitimate email ('non-spam'), prediction of a trend in stock market, analysis of failures in a large-scale power system, identification of a speaker in audio recording, classification of loan applicants as good or bad credit risks, and network traffic as malicious or benign, identity of the person appearing in the image, natural language processing, weather forecasting, control signals for automatic vehicle navigation, gene expression and protein interactions.

A parent node is located at a higher hierarchy compared to a child node. The parent node in turn may be associated with a grandparent node that is located at a higher hierarchy compared to the parent node. The "current" node described herein is associated with at least one parent node up in the hierarchy, and at least one child node lower down in the hierarchy. Nodes at different level may process information differently.

Embodiments provide a node, a computer program storage medium, and a method for a hierarchical temporal memory (HTM) network where at least one of its nodes generates top-down messages and sends the top-down messages to one or more children nodes in the HTM network. The first top-down messages represent information about the state of a node and functions as feedback information from the node to its child node. The node may also maintain history of the input patterns or co-occurrences so that temporal relationships between input patterns or co-occurrences may be taken into account in an inference stage. By providing the top-town message and maintaining the history of previous input patterns, the HTM network may, among others, (i) perform more accurate inference based on temporal history, (ii) make predictions, (iii) discriminate between spatial co-occurrences with different temporal histories, (iv) detect "surprising" temporal patterns, (v) generate examples from a category, and (vi) fill in missing or occluded data.

Learning Causes

In one or more embodiments, an HTM network discovers one or more causes of sensory input data received by the HTM network. In other words, an HTM network does not necessarily have a sense particular to each of the types of causes being sensed; instead, an HTM network may discover from raw sensed input data that causes such as cars and words exist. In such a manner, an HTM network may learn and form representations of causes of sensory input data.

A node in an HTM network "learns" by storing and associating input patterns with a common cause. The sensed input patterns are associated with the common cause by determining co-occurrences of sensed input patterns at the input of the HTM network. Determining co-occurrences of sensed input patterns involves determining which sensed input patterns are active at around the same time at a rate statistically greater than what would be expected based on mere chance. For example, if an HTM node having one hundred inputs has seven inputs that become active together at some statistically significant rate, then the HTM node learns that the sensed input patterns at those seven inputs co-occur.

Learning causes in an HTM-based system involves learning patterns and groups of patterns. In general, patterns and groups of patterns that co-occur frequently are stored and assigned to the same causes. For example, groups of patterns that co-occur frequently at some statistically significant rate may be assigned to the same cause. Accordingly, learning causes may effectively entail mapping many patterns and/or inputs to a single cause. Such assigning of multiple patterns and/or inputs to a single cause is referred to as "pooling" herein.

Spatial groups are learned using a series of different spatial pooling programs. Spatial group learning attempts to learn a set of meaningful co-occurrences in a set of input patterns. Spatial pooling is dependent on "spatial" similarities between two or more patterns (noting that a pattern may actually represent a sequence from a lower level). In embodiments where spatial pooling is used, an HTM node may compare a spatial property of a received sensed input pattern with that of a learned sensed input pattern (or "quantization" point). If the two patterns are "similar enough" (that is, have enough "overlap"), then the received sensed input pattern may be assigned to the same cause as that of the quantization point. The similarity needed to perform such "spatial" pooling may vary within and/or among HTM-based systems.

Figure 2:
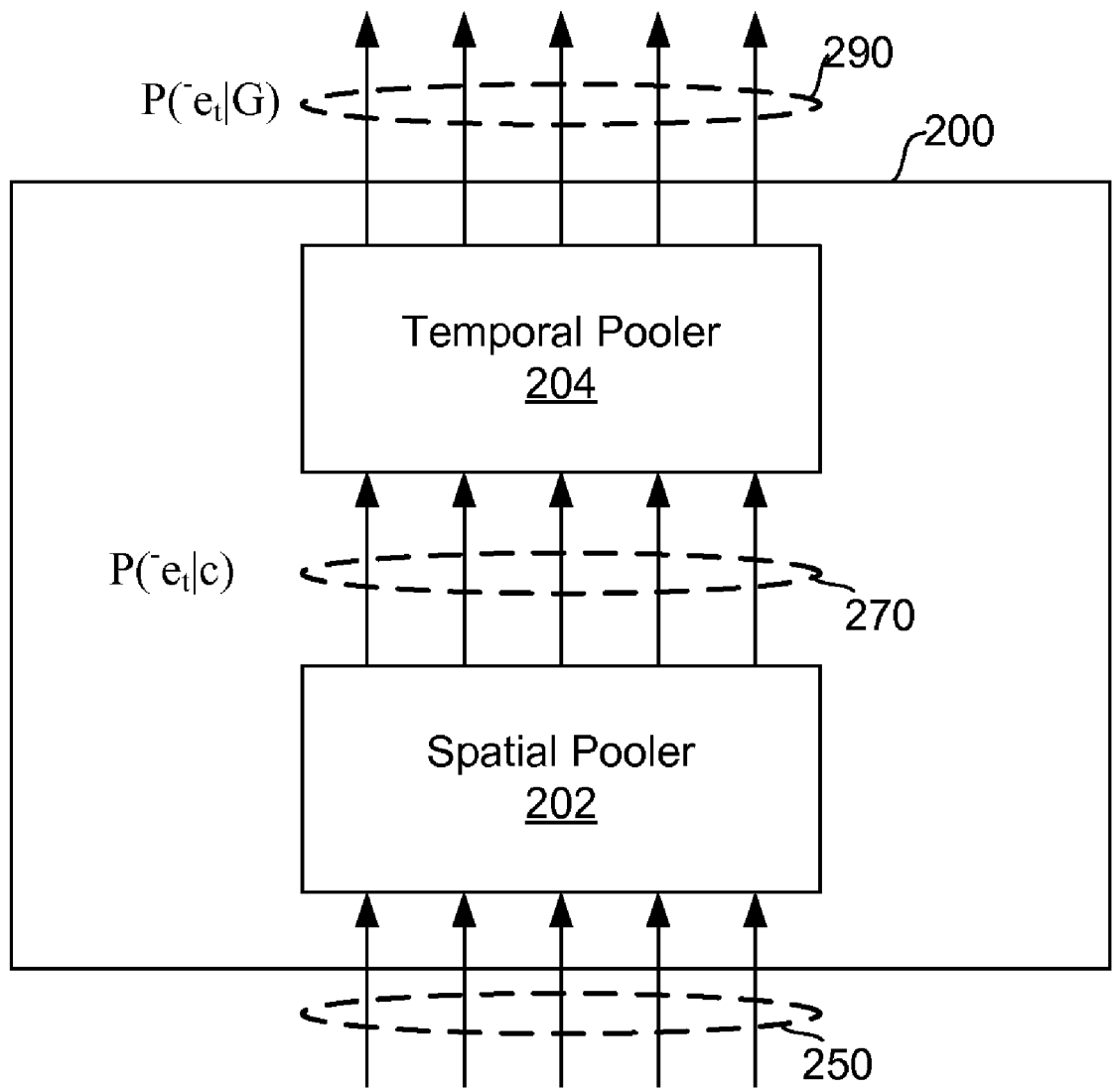
FIG. 2 is a block diagram illustrating a spatio-temporal learning (STL) node in accordance with an embodiment.

Temporal groups are learned using temporal pooling algorithms that recognize sensed input patterns that occur together at a rate statistically greater than what would be expected based on mere chance. For example, if of fifty sensed input patterns learned by an HTM node, three occur in order at some statistically significant rate, then the HTM node may learn that group of sensed input patterns Spatio-Temporal Learning (STL) Nodes A spatio-temporal learning (STL) node is comprised of one or more HTM nodes which learn both spatial and temporal groups of sensed input patterns. The STL nodes learn spatial and temporal groups of inputs over time. FIG. 2 illustrates an embodiment of a STL node 200. The STL node 200 comprises a spatial pooler 202 that is used to determine spatial groups in the set of sensed input patterns 250. The STL nodes 200 further comprises a temporal pooler 204 used to determine the groups of sensed input patterns that temporally co-occur or occur close in time. Each STL node 200 may operate the spatial pooler 202 and temporal pooler 204 in a different manner.

The spatial pooler 202 receives some input patterns 350. Generally, the spatial pooler 202 identifies spatial co-occurrences among input patterns. At each time-step, the spatial pooler 202 outputs a set of probabilities $P(^-e_t|c_t)$ 270 representing the probability of observing $e^-$ (evidence or input patterns from a lower level) at time t over learned spatial co-occurrences C. The temporal co-occurrences c include one or more occurrences $c_1, c_2, \ldots, c_N$. Thus, for example, at time t, the first entry in $P(^-e_t|c_1)$ is $P(^-e_t|c_1)$, the second entry is $P(^-e_t|c_2)$, and so forth.

Based on the set of probabilities $P(^-e_t|c)$ 270 outputted over time by the spatial pooler 202, the temporal pooler 204 outputs a set of probabilities $P(^-e_t|G)$ 290, where $P(^-e_t|G)$ represents the probability of observing $^-e$ (evidence from a lower level) at time t over learned temporal groups G. Thus, each entry in the set of probabilities $P(^-e_t|G)$ 290 represents probability that the received input patterns 250 corresponds to a learned temporal group $G_i=(G_1, G_2, \ldots G_M)$.

Figure 3:
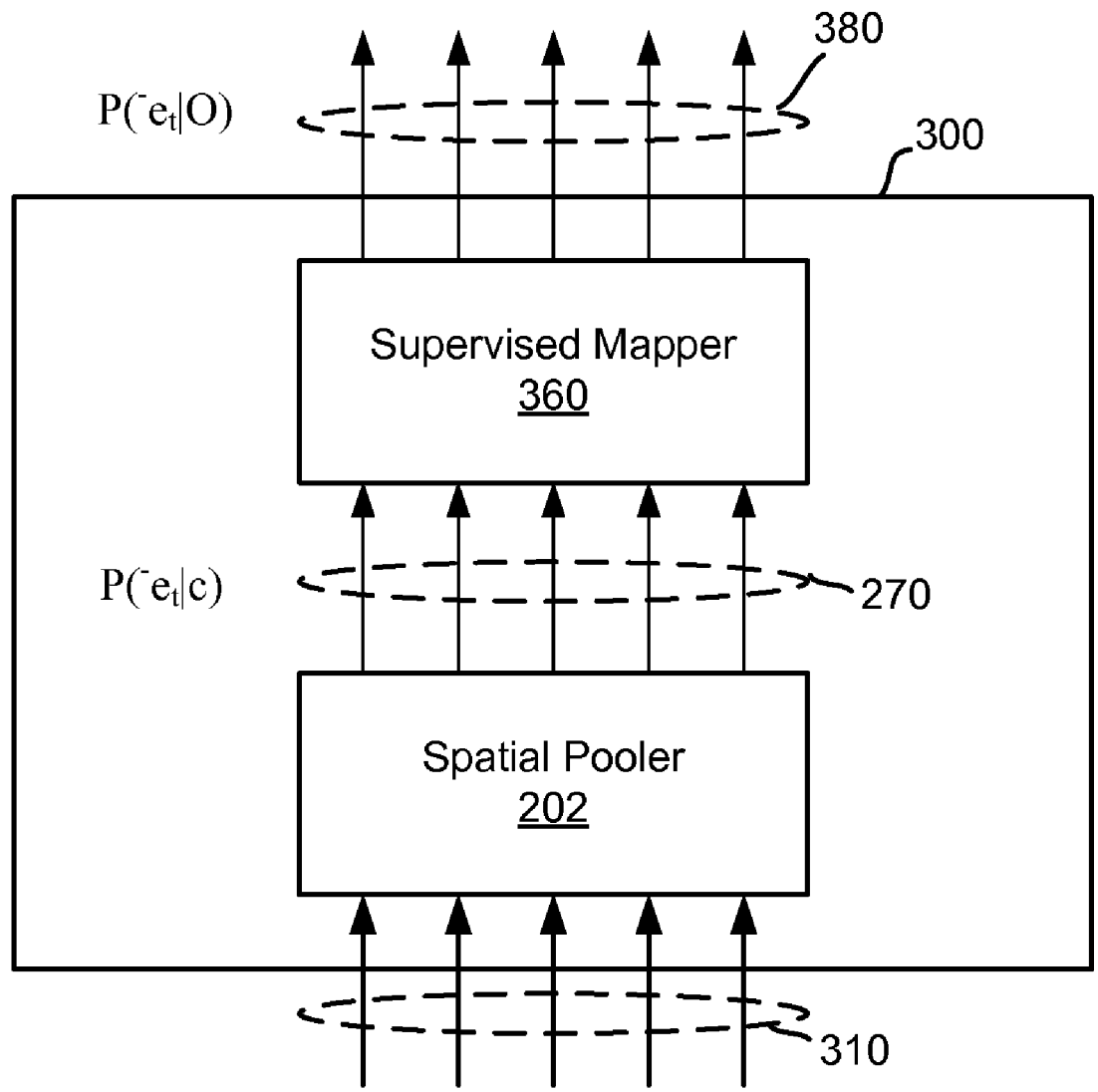
FIG. 3 is a block diagram illustrating a STL top node in accordance with an embodiment.

FIG. 3 is a block diagram illustrating a STL top node 300, according to one embodiment. The STL top node 300 is a node in the HTM network that is at the top of the hierarchy and directly or indirectly receives inputs from all of the nodes in the HTM network. The STL top node 300 receives a set of input patterns 310 that represent a set of probabilities $P(^-e_t|G)$ from nodes in a lower level. Each entry in the set of probabilities $P(^-e_t|G)$ represents the likelihood that evidence from a lower node is part of a learned temporal group $G_j$ learned by the nodes at a lower level right below the STL top node 300. The STL top node 400 comprises a spatial pooler 202 that is essentially the same as described above with reference to FIG. 2 except that it is coupled to a supervised mapper 360.

The STL top node 300 further comprises the supervised mapper 360 that receives the set of $P(^-e_t|c)$. Based on the set of probabilities $P(^-e_t|c)$ 270 outputted over time by the spatial pooler 202, the supervised mapper 360 outputs a set of probabilities $P(^-e_t|O)$ 380 that represents the probability that $^-e$ (evidence from a lower level) indicates that the sensed input provided to the HTM node is caused by O.

Spatio-Temporal Learning (STL) Networks

Figure 4:
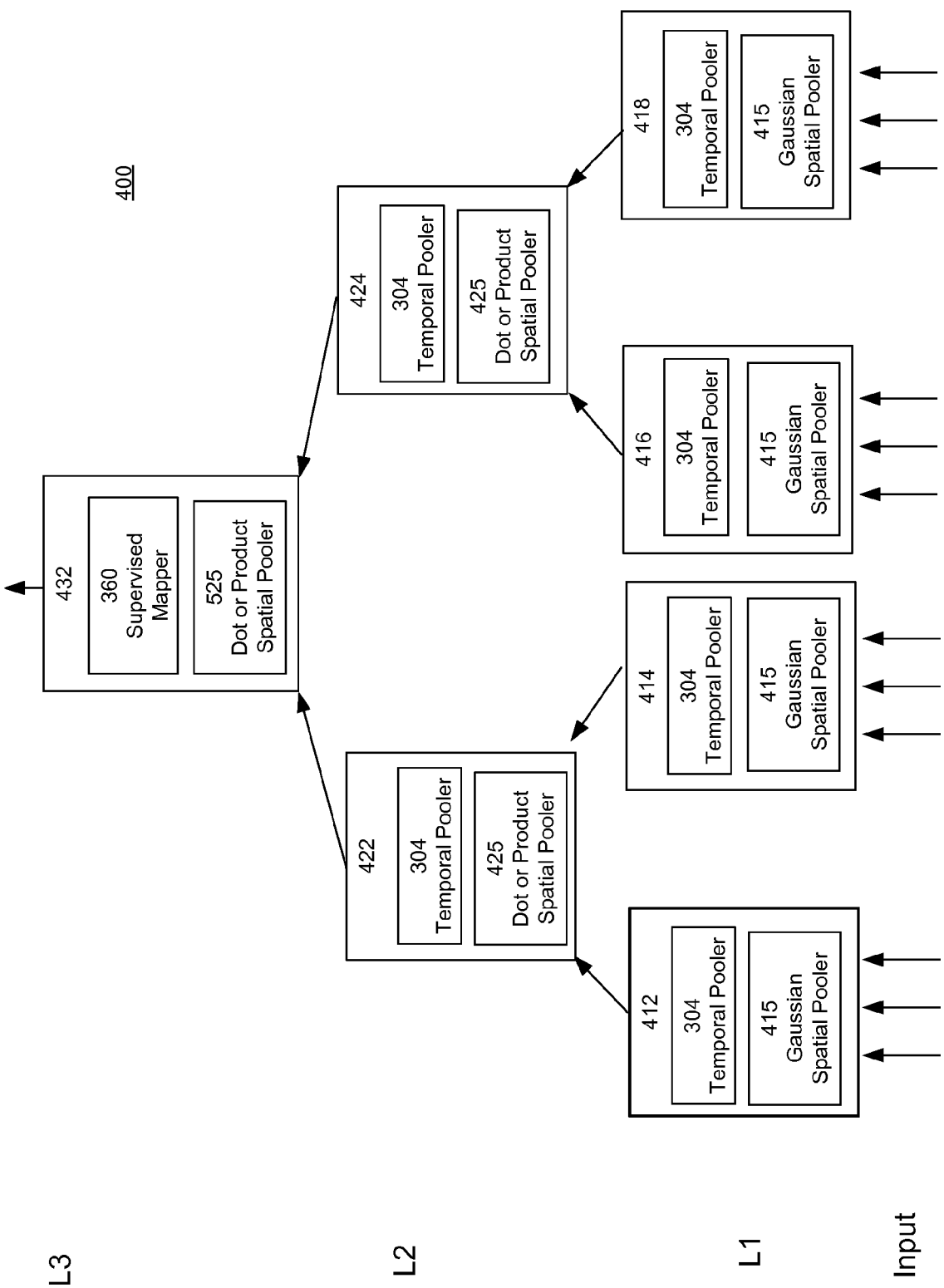
FIG. 4 is a diagram illustrating a STL network in accordance with an embodiment.

A Spatio-Temporal Learning (STL) network is a hierarchical temporal memory network including a plurality of STL nodes 200 and a STL top node 300. The STL network may use different spatial and temporal group algorithms at different levels of the hierarchy. FIG. 4 illustrates a STL network 400 using different temporal and spatial pooling algorithms at different levels.

In a first level L1 of the STL network 400, the STL nodes 412, 414, 416, 418 receive inputs from a data sensor. The data sensor partitions input data and distributes the input data to the first level L1 nodes. For example, in embodiments where the received input represents pixel data from a picture, the data sensor may partition the pixel data into 4 equal parts and distribute them to the first level L1 nodes 412, 414, 416 and 418.

In the embodiment illustrated, the STL nodes in the STL network 400 execute different spatial pooler 302 algorithms at each level. In the first level L1, the STL nodes 412, 414, 416, 418 execute Gaussian Spatial Poolers 415 that are described below in detail. In the second level L2 nodes 422, 424 and STL top node 432, the nodes 422, 424, 432 execute Dot or Product Spatial Poolers 425 that are described in detail below. In other embodiments, STL nodes at different levels of a STL network 400 may execute different or additional spatial pooling algorithms such as Sparse Distributed Code Poolers. In other embodiments, nodes at different levels of a STL network may execute different or additional temporal pooling algorithms. The STL top node further executes a Supervised Mapper 360 used to generate a probability that a sensed input belongs to a category of inputs.

Spatial Pooling in STL Nodes

In STL nodes 400, the spatial pooler 202 functions in both learning and inference. During learning, the spatial pooler 202 functions to identify common co-occurrences between input patterns. According to the embodiment, these input patterns may be represented in different ways, for example, as input vectors. The spatial pooler 202 generates the set of probabilities $P(^-e_t|c)$ and transmits these either to a temporal pooler 204 or a supervised mapper 360.

The spatial pooler 202 may be implemented in a variety of ways, for example, using any of the four algorithms as described herein. These spatial pooling algorithms are referred to as the Gaussian, Dot, Product and Sparse Distributed Code Pooling algorithms herein. The preferred spatial pooling algorithm depends primarily on the nature of the input vectors. In one embodiment, Gaussian spatial pooling is optimally used for nodes that receive input directly from a sensor. Dot or Product spatial pooling may be used as middle or top nodes that receive input from other STL nodes 200, 300. The Gaussian spatial pooling algorithm performs a form of vector quantization, which is useful for sensory input signals, whereas Dot/Product pooling does not. Sparse Distributed Code Poolers are used to learn canonical inputs or spatial co-occurrences from input patterns which may contain more than one independent canonical input. Sparse Distributed Code Poolers decompose the sensed input pattern received from a lower node into "sparse distributed codes" or spatial co-occurrences of independent canonical inputs. The Dot and Product algorithms process the distribution sent by each child STL Nodes by finding the index of the element which represents the "winning" temporal group.

In the learning stage, the spatial pooler 202 analyzes the stream of sensed input patterns in order to generate a spatial co-occurrence matrix. This spatial co-occurrence matrix represents the set of all possible input patterns as a relatively small, finite set of canonical input patterns. These canonical input patterns selected by the spatial pooler are referred to herein as "spatial co-occurrences" because they represent distinctive occurrences of input patterns from the node's children that tend to appear together far more often than would be expected by random chance.

The spatial co-occurrence matrix W, is a list of spatial co-occurrences. Each spatial co-occurrence is stored as a row $W_j$, and W contains one column for each element in the input pattern. In this embodiment, each node's input pattern is a row vector that is formed by concatenating together the output vectors of each of the node's children.

The spatial co-occurrence matrix may starts out empty. When the spatial pooler 202 selects a particular input vector to be a spatial co-occurrence, it simply appends this input vector to W as a new row. The spatial pooler 202 also counts the number of input vectors that are pooled with each of the spatial co-occurrences in the matrix in addition to its primary task of building a spatial co-occurrence matrix. These frequency counts are stored in a single vector called counts. After completing learning, this vector will contain one integer for each spatial co-occurrence in W. The value of the jth element is simply the total number of input vectors that were pooled with the jth spatial co-occurrence throughout the learning stage. The spatial pooler does not use this frequency count information directly, but instead provides it to the temporal pooler 204.

In the inference stage, the spatial pooler 202 no longer updates the spatial co-occurrence matrix W, and instead compares each new input vector to the spatial co-occurrences in W. During inference, the spatial pooler 202 computes a "belief vector" y for its input vector x. This output vector is a distribution over spatial co-occurrences, so it contains one element for each row in W. The output vector y is handed off to the temporal pooler 204. In fact, the spatial pooler 202 can be thought of as a pre-processor for the temporal pooler 204. The spatial pooler 302 simplifies the inputs to the temporal pooler 304 by pooling the vast space of input vectors into a relatively small set of discrete spatial co-occurrences that are easier to handle. In this context, the term "belief" represents a generalized measure of the likelihood that a particular input vector x and a particular spatial co-occurrences w both represent the same underlying real-world cause. Although this use of "belief" does not carry a precise mathematical meaning, a higher value in the belief vector implies a higher likelihood that the input vector and the corresponding spatial co-occurrences were produced by the same cause.

The Gaussian Spatial Pooler 415 receives a stream of input vectors. For each received input vector, the Gaussian Spatial Pooler 415 identifies the particular input vector x as a new spatial co-occurrence if x is sufficiently dissimilar (by a Euclidean distance metric) to all of the spatial co-occurrences that the Gaussian Spatial Pooler 415 has previously identified. The Gaussian Spatial Pooler 415 uses a Euclidean distance metric to compare the input vectors presented during training. The squared Euclidean distance between an input vector x and an existing spatial co-occurrence w is computed as follows:

$$d^2(x,w)=\Sigma_{j=1}^{Ndims}(x_j-w_j)^2 \quad \text{Equation (1)}$$

The Gaussian Spatial Pooler 415 identifies new spatial co-occurrences based on a specified threshold distance value, maxDistance. If the squared distance between an input vector x and an existing spatial co-occurrence w is less than maxDistance, the input vector is not considered to be a new spatial co-occurrence and is pooled together with that existing spatial co-occurrence. In this case, the frequency count of the existing spatial co-occurrence w in the counts vector is incremented by 1. If the input vector's squared distance to all existing spatial co-occurrences is greater than maxDistance is the input vector identified as a new spatial co-occurrence, in which case the Gaussian Spatial Pooler 415 appends the new spatial co-occurrence to W. The Gaussian Spatial Pooler 415 algorithm is highly dependent on the value of maxDistance. The Gaussian Spatial Pooler 415 will identify more spatial co-occurrences when maxDistance is low. A high value of maxDistance will result in fewer spatial co-occurrences. If maxDistance is equal to 0, every unique input vector presented during training will be selected as a spatial co-occurrence.

The Dot or Product Spatial Poolers 425 operate in an identical manner during the learning stage and only differ in operation during the inference stage. In one embodiment of the STL nodes 200, 300, the outputs from the node's children are concatenated together into a single row vector representing an input pattern. The Dot/Product Spatial Pooler 425 tracks which elements of this concatenated vector came from which child node in the STL network 400, using this information to make spatial pooling decisions. The Dot/Product Spatial Poolers 425 employ a winner-take-all approach to spatial pooling. When presented with a concatenated input vector x, the STL nodes 200, 300 divide this input vector into $N_{children}$ portions, where $N_{children}$ denotes the number of children feeding into the STL node 200, 300. Each of these portions contains the elements of x that were contributed by a particular child node.

The elements in each portion represent a distribution over the temporal groups of a single child node. Within each portion, the Dot/Product Spatial Pooler 425 locates the largest element and declares it the "winner". The Dot/Product Spatial Pooler 425 then updates this portion of x by setting the winning element's value to 1 and setting all the other elements in that portion to 0. The Dot/Product Spatial Pooler 425 performs this operation on each portion of the input vector. The result is an updated input vector containing $N_{children}$ elements with a value of 1, with all remaining elements set to 0. Each child's portion contains a single 1. After performing this operation on the concatenated input vector, the Dot/Product Spatial Pooler 425 inserts the updated input vector into the spatial co-occurrence matrix W if the vector is not already present in the matrix. After the node sees the entire set of training data, W will be a list of all unique input vectors as updated by the winner-take-all rule. As with the Gaussian Spatial Pooler 415, the Dot/Product Spatial Pooler 425 maintains a count of the number of input vectors that have been pooled with each spatial co-occurrence. If a particular input vector is found to match an existing spatial co-occurrence, the frequency count associated with that spatial co-occurrence is incremented.

The Dot/Product Spatial Pooler 425 requires no parameters. Despite the fact that the Dot/Product Spatial Pooler 425 stores as a spatial co-occurrence every unique input vector (subsequent to winner-take-all processing), the memory usage is not typically prohibitive in practice. Real-world data tends to have a great deal of causal structure; therefore, the number of unique spatial co-occurrences encountered each STL node 300, 400 is far lower than what would be expected if random inputs were presented to the network. In some embodiments the number of unique spatial co-occurrences encountered by a STL node 300, 400 can still become large. In these embodiments, the Dot/Product Spatial Pooler 425 uses sparse matrices and other coding optimizations to reduce memory usage during the learning stage.

In an inference stage, the spatial pooler 202 receives an input vector x and computes a new distribution vector y with one element for each spatial co-occurrence in the spatial co-occurrence matrix W. Each of these values $y_j$ represents the belief that the input x belongs to the spatial co-occurrence "bin" $W_j$. Note that a belief value generated by the spatial pooler 202 represents neither a true probability nor a mathematically rigorous likelihood. Instead, a belief value $y_j$ is best thought of as a generalized measure of "belief" that the input vector x was generated by the underlying cause associated with the spatial co-occurrence $W_j$ from the spatial co-occurrence matrix.

The Gaussian Spatial Pooler 415 receives an input vector x, it first computes the Euclidean distance between x and each of the spatial co-occurrences in W. The Gaussian Spatial Pooler 415 then converts these distances to belief values using a Gaussian approach. The algorithm models the input vector x as a random sample drawn from one of $N_{coincs}$ Gaussian probability distributions. Each of these distributions is centered on a different spatial co-occurrence vector in W; the $N_{coincs}$ rows of W represent the mean vectors of the Gaussian distributions. The distributions all have an identical variance, which is uniform across all dimensions of the input space. This variance is the user-specified parameter sigma, also denoted as σ, which is defined as the square root of this uniform variance. The Gaussian Spatial Pooler 515 computes the belief that x was generated from the cause represented by the $j^{th}$ spatial co-occurrence as the local probability density of the $j^{th}$ Gaussian distribution, as measured at point x:

$$y_j = e^{-(x-W_j)^2/2\sigma^2} \qquad \text{Equation (2)}$$

If the sequence of input vectors was randomly drawn from a set of $N_{coincs}$ true Gaussian processes, then the belief $y_j$ calculated by the Gaussian Spatial Pooler 415 would be strictly proportional to the probability that the input vector x was drawn from the $j^{th}$ distribution. However, in most real applications, the sequence of input vectors cannot be accurately modeled by such processes. Nevertheless, this model provides an approximation, and produces an exponential decay of the belief in the $j^{th}$ cause with increasing distance between x and $W_j$. The aforementioned parameter sigma controls the rate at which the Gaussian probability distributions decay with distance. A low value of sigma will result in very small Gaussian "clouds" centered tightly around each spatial co-occurrence. Only the spatial co-occurrences that are highly similar to the input vector will receive non-infinitesimal belief values.

Spatial co-occurrence matrices generated by the Dot or Product Spatial Pooler 425 using the Dot and Product algorithms store input vectors updated using the winner-take-all approach. Each of these vectors has $N_{children}$ elements set to 1—one such element for each child node—and all other elements set to 0. When the Dot inference algorithm receives a concatenated input vector from its child nodes, it generates a belief value for each of its stored spatial co-occurrences using a dot product operation. The belief value $y_j$ associated with the $j^{th}$ spatial co-occurrence is simply the dot product of the $j^{th}$ (updated) spatial co-occurrence vector with the input vector.

Because a spatial co-occurrence vector defines a single "winning" element for each of its children, the input values for each of these winning elements are simply summed together to yield the belief value. The Dot Spatial Pooler 425 repeats this process for each of the spatial co-occurrences in W to produce the output vector y with $N_{coincs}$ elements. Because the dot product operation reduces to a summation, the Dot Spatial Pooler 425 provides flexibility in instances in which most of the inputs from a node's children match a particular spatial co-occurrence well, but one or two children are badly mismatched. In this case, the high input values of the matching child nodes will dominate the summation and tend to compensate for the low input values coming from the mismatched child nodes.

The Product Spatial Pooler 425 inference algorithm is very similar to the Dot algorithm. When the Dot Spatial Pooler 425 computes a belief value, it sums the support from each of its children. By contrast, the Product Spatial Pooler 425 multiplies the support. This simple distinction generates to very different belief vectors. Consider a node with ten (10) children nodes. If the node uses the Dot Spatial Pooler 425, a spatial co-occurrence that matches well with the input vectors from nine of the ten children nodes but is dissimilar to the input from the tenth child node will still receive a very high belief value. But if the node uses the Product Spatial Pooler 525, the tenth child node can "veto" the spatial co-occurrence by zeroing out the overall belief value. Accordingly, the Product Spatial Pooler 425 algorithm thus requires strong consensus among the children to produce a non-infinitesimal belief value.

Group Based Temporal Pooler Learning

Figure 5:
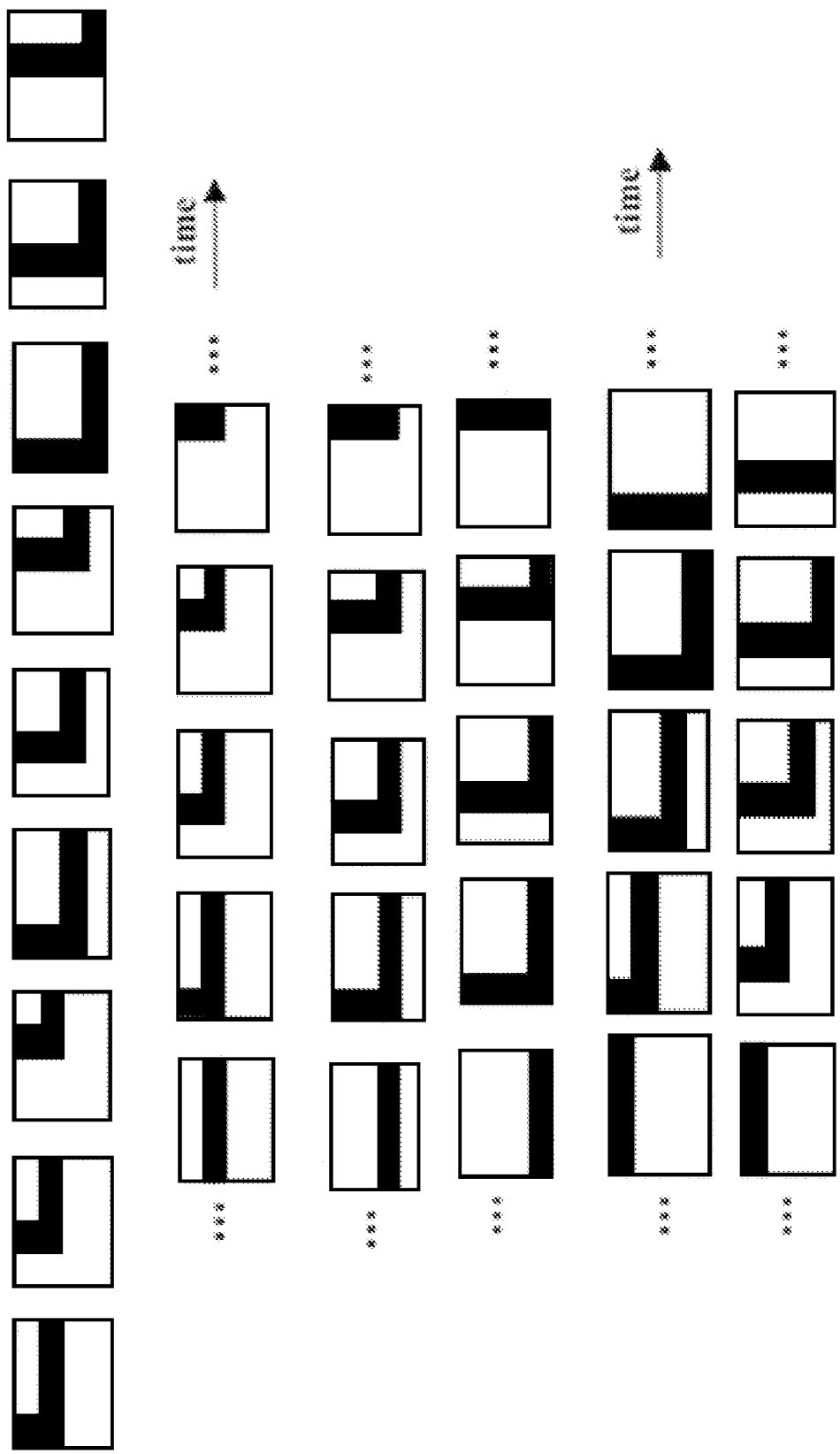
FIG. 5 is a diagram illustrating a sequence of temporal sequences.

FIG. 5 illustrates an example of sensing or perceiving a right corner moving in and out of vision. Although the individual sequences of input patterns may represent the same input of a right corner, the sequences of viewing the corner moving into view may be interspersed over time. Additionally, not all of the sequences of patterns representing the right corner are comprised of the exact same image or pattern but instead patterns which represent the same cause.

As discussed above, one limitation of temporal pooling based strictly on sequential patterns is that this technique often causes a large number of sequences to be created and grouped. When inputs or patterns of inputs with the same cause are sensed in real life, it is not always the case that they adhere to the same sequence every time. Random noise and variety in the order which inputs or patterns are sensed can create a large number of sequences of events, which all have the same cause. Due to different orders in which inputs can be sensed, a large number of patterns which have the same cause can create a combinatorial explosion when considering all possible sequences the patterns can form. Enumerating all of the possible different sequences is not only computationally expensive but often inaccurately reflects the frequency with which patterns co-occur. Promiscuous sequences can sometimes lead to an even or "flat" distribution in frequencies of temporal adjacencies. This "flat" distribution can occlude the detection of differences in frequency of temporal adjacency due to a common cause.

Group based temporal pooling addresses these problems in temporal and spatial pooling by identifying groups of input patterns thought to have the same cause by identifying temporally temporal adjacency between inputs without relying on the sequence of occurrence of these inputs. Temporal adjacency is used herein to refer to two input patterns occurring at the exact same time as well as close in time point to each other such as directly before or after each other (temporally adjacent) or close to each other in a sequence of inputs over time (temporally proximal). In temporal adjacency, the order in which the input patterns occur can be symmetrical or asymmetrical. In other words, the identified temporal adjacency values may be based or the order the inputs occur (for example, A . . . B is not equivalent to B . . . A) or independent of the order the input occur (that is, A . . . B is equivalent to B . . . A). In most embodiments, the groups identified by group based temporal pooling are unordered, meaning that there is no inherent structure or sequence in which the input patterns occur within the group. However, in alternate embodiments, the input patterns may be partially ordered in a group based on various criteria such as frequency of occurrence.

Temporal adjacency may be enumerated for each of the input patterns in a time adjacency matrix. Each row in the time adjacency matrix represents a sensed input pattern for a time point. Each column in the time adjacency matrix also represents a sensed input pattern. The matrix is enumerated to reflect the frequency of temporal adjacency. At each time point t, the matrix is updated at the row corresponding to the input at time t and the column corresponding to the input that occurred at the previous time point $W_{t-1}$. According to the embodiment of the present invention, the matrix is also updated at several previous time points. The number of time points can range from 1 to n, where n represents all previous all time points used to update the matrix. According to the embodiment, n may be parameterized or take a default value. The matrix may be updated with an integer number which enumerates the number of times the input at time t and the input at time $W_{t-1}$ are temporally adjacent, or any alternative numeric variable to represent the frequency of temporal adjacency. Additionally, alternate data structures may be used to score temporal adjacency. Various combinations of data structures and numeric variables to enumerate frequency will be apparent to those skilled in the art.

Figure 6A:
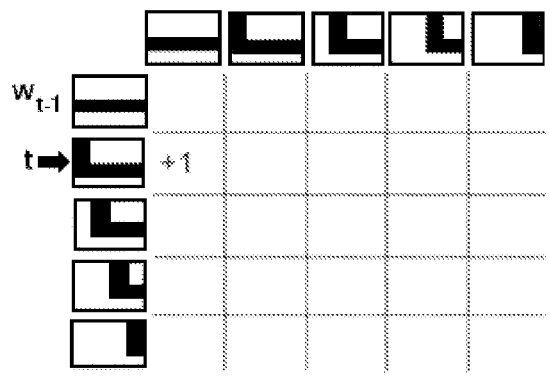
FIGS. 6A-6D are diagrams illustrating four consecutive updates of a time adjacency matrix, in accordance with an embodiment.
Figure 6B:
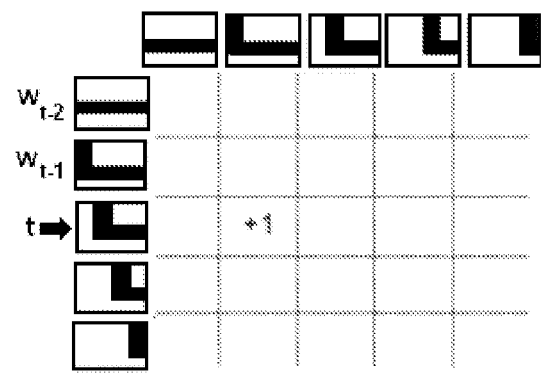
Figure 6C:
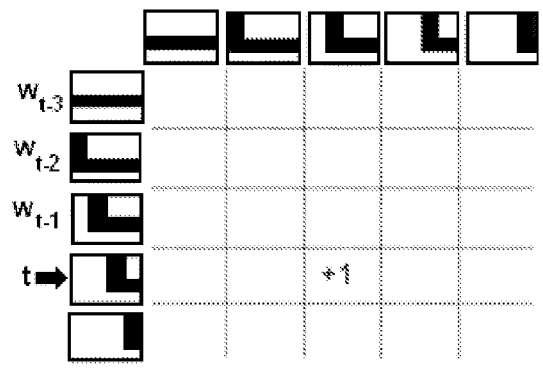
Figure 6D:
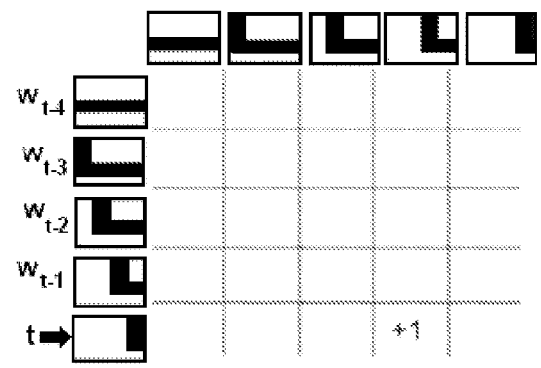

Four consecutive updates of a time adjacency matrix are illustrated in FIGS. 6A-6D. In FIG. 6A, the row corresponding to the pattern at time t is updated at the column corresponding to the pattern at time $W_{t-1}$ to add an integer value of 1. The increment of +1 represents an update to a value representing the frequency of temporally adjacency of the two patterns. In FIG. 6B, the time point is advanced such that the previous times t and $W_{t-1}$ are now respectively $W_{t-1}$ and $W_{t-2}$. The matrix is again updated at the column corresponding to the pattern of $W_{t-1}$ and the row corresponding to the pattern of time t. FIGS. 6C and 6D illustrate two additional consecutive updates of the time adjacency matrix.

Where the matrix is updated for temporal adjacency up to $W_{t-n}$ where n>1, a decay function can be used to weight the enumeration of temporal adjacency. The decay functions may be linear in proportion to n, which represents the number of time points between t and $W_{t-n}$. Alternatively, the decay function may be exponential or pseudo-exponential over time. Examples of suitable decay functions to weight temporal adjacency by proximity include but are not limited to: persistence decay functions, block decay functions and exponential decay functions. According to the embodiment, the decay function may be adjusted to weight temporally proximal patterns with a greater or lesser weight.

Figure 7A:
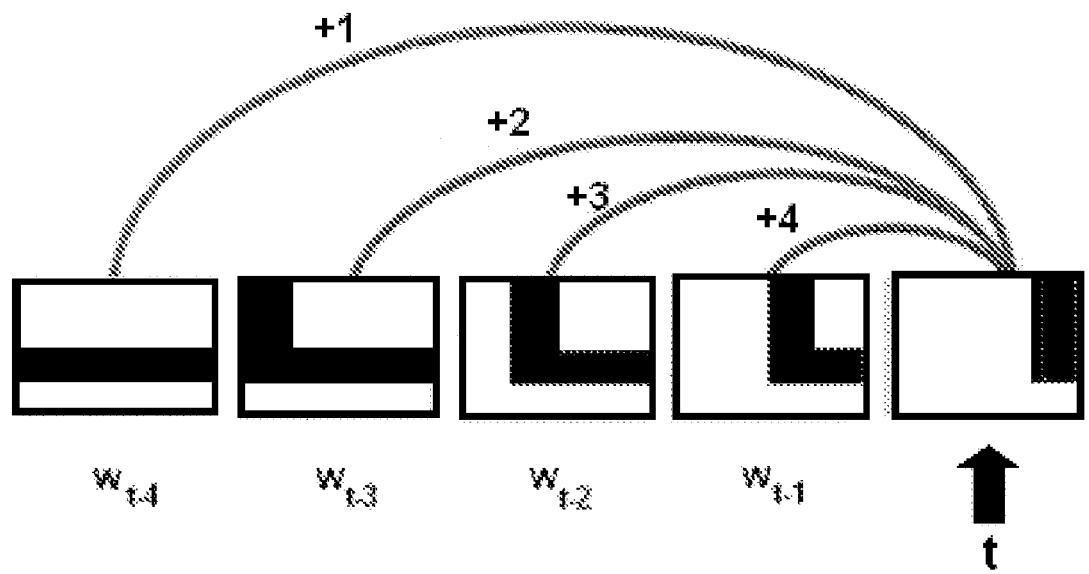
FIG. 7A is a diagram illustrating a decay function in accordance with an embodiment.
Figure 7B:
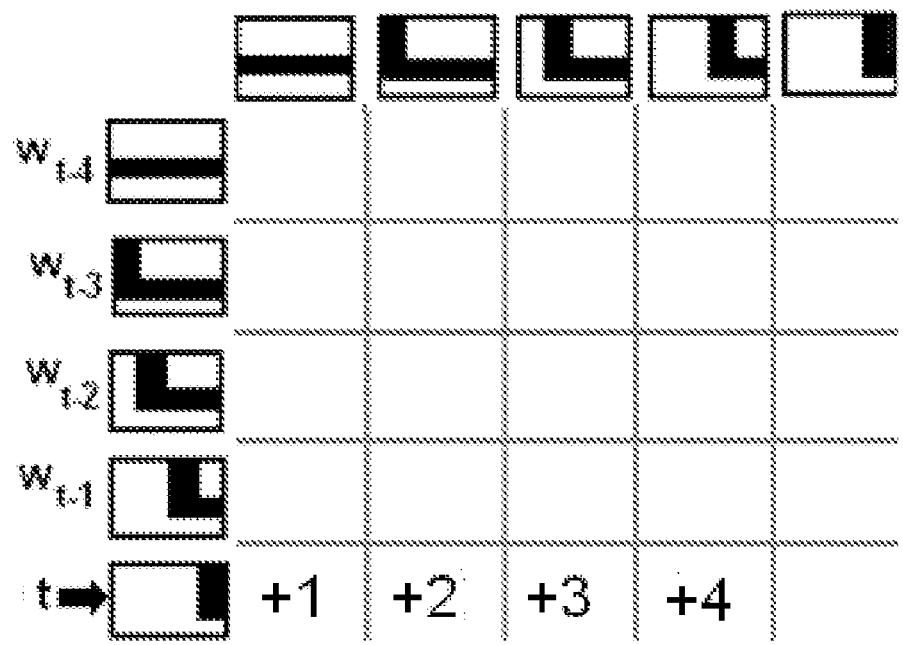
FIG. 7B is a diagram illustrating an update of the time adjacency matrix using a decay-function, in accordance with an embodiment.

FIGS. 7A and 7B illustrate a linear decay function using the integer based enumeration shown in FIGS. 6A-6D. FIG. 7A illustrates a decay function which is linearly proportional to n, where n equals 4. In FIG. 7A, the maximum number used to enumerate the temporal adjacency is four (4) for $W_{t-1}$. Each pattern at the previous time points ($W_{t-2}$, $W_{t-3}$, $W_{t-4}$) is assigned an integer value which reflects its temporal distance relative to the pattern at time t. In the example illustrated, the linear decay function subtracts one integer value for every time point between the enumerated pattern and the pattern at time t. FIG. 7B illustrates one update of the time adjacency matrix using the decay function. In FIG. 7B, the row representing the pattern at time t is updated at the columns representing patterns at $W_{t-1}$, $W_{t-2}$, $W_{t-3}$ and $W_{t-4}$ with values 4, 3, 2 and 1, respectively.

In addition to temporal proximity, the enumeration of the time adjacency matrix is also weighted to reflect spatial proximity of the patterns in some embodiments. In systems where a large number of potential patterns may exist, it may be necessary to represent new patterns using a set of quantization points or by defining a threshold on the number of input patterns to include in the time adjacency matrix. As discussed above, quantization points may be determined based upon frequency of occurrence. Quantization points may also be determined using standard machine learning techniques such as principle components analysis. Alternatively, quantization points may be determined using other unsupervised learning methods such as Gaussian clustering. According to the embodiment, the number of quantization points may be parameterized by specifying the number of input patterns to include in the time adjacency matrix.

Similarity to existing patterns or quantization points may be determined in a number of ways using conventional methods. In some embodiments, each pattern may be assigned a set of features and similarity may be determined between two patterns using a variety of distance functions. The set of features and distance functions may be specific to the type of pattern used and the application of the pooled groups. For example, patterns comprised of images may be compared using distance functions based on image-based features such as pixel color, luminescence, etc. Patterns comprised of sequences may be compared using distance functions including mismatch values and gapped alignments. Additional similarity metrics and distance functions will be readily apparent to those skilled in the art in light of this disclosure.

Figures 8A, 8B:
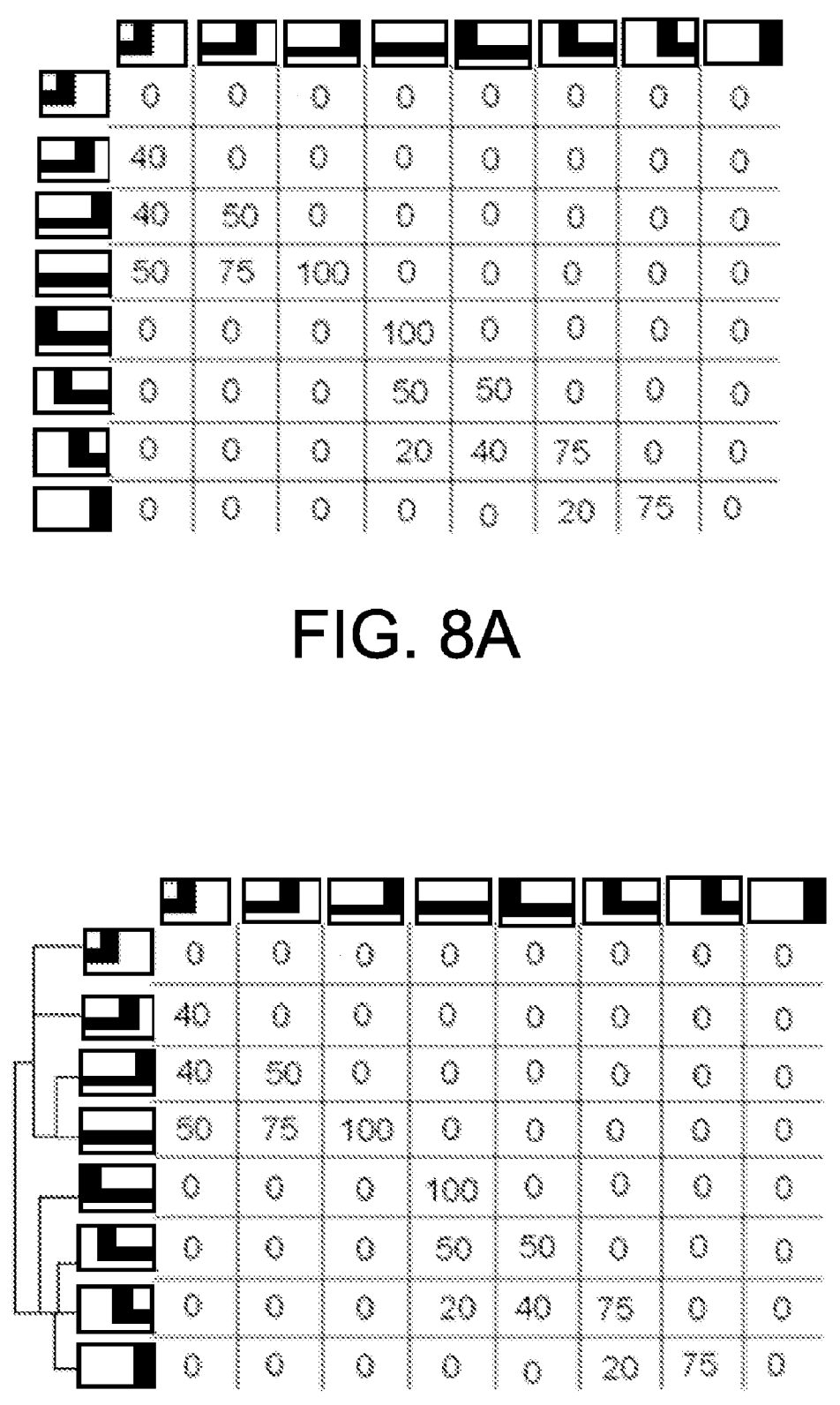

Once the time adjacency matrix is fully updated, the groups of sensed input patterns are identified. FIG. 8A illustrates a simple example of a complete time adjacency matrix with two distinct groups of input patterns, a set of right corners and a set of left corners. Upon inspection of the time adjacency matrix, it is clear that the two groups distinctly co-occur with each other only (there are never any left corners in the columns enumerated for the right corners) and are separate entities. The only pattern (image) that has overlap between the two groups is that of the straight line, which temporally co-occurs or is adjacent to both the left corner and the right corners. If the pattern representing the straight line is removed from the time adjacency matrix, the right corners and left corners would form two separate and distinct groups.

In one embodiment, these groups are identified using hierarchical agglomerative clustering or any method of "hard" clustering wherein each row of the time adjacency matrix is assigned to only one cluster or group. In one embodiment, the clustering algorithm may learn a number of clusters reflective of the natural groups of input patterns. Alternatively, the clustering algorithm may take a number of clusters to form as a parameter. The identification of the two groups of input patterns through clustering is illustrated in FIG. 8B. Suitable clustering methods include single linkage clustering and n-means clustering. In this type of clustering, the temporal adjacencies enumerated in each row of the matrix form the set of values used to pair-wise similarities between the two input patterns. Any type of distance metric can be employed to determine the pair-wise similarities which are then used to cluster or group the rows representing the input patterns.

Figure 9A:
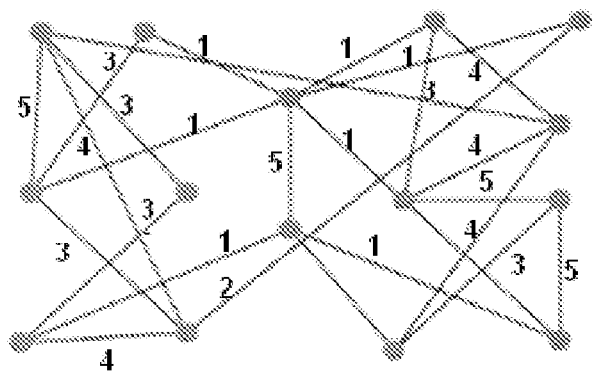
FIG. 9A is a graph illustrating temporal relationships of patterns as stored in a time adjacency matrix, in accordance with an embodiment.
Figure 9B:
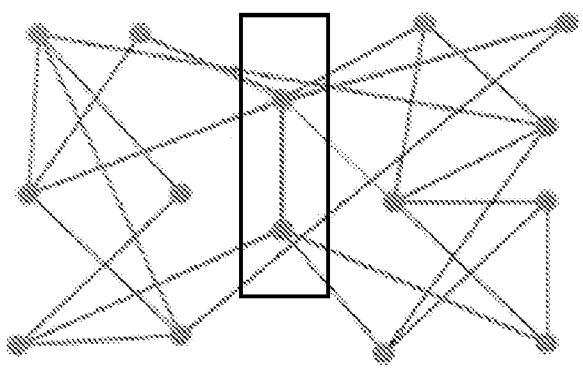
FIG. 9B illustrates the selection of nodes in the graph according in accordance with an embodiment.
Figure 9C:
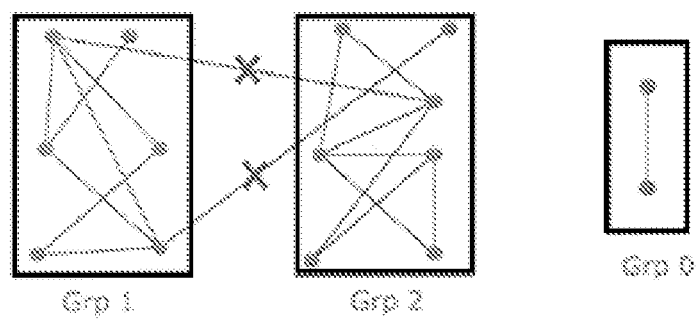
FIG. 9C illustrates grouping of a graph into three subgraphs, in accordance with an embodiment.

In some embodiments, the groups are identified though a method which employs a greedy graph traversal to identify cliques or groups of co-occurring patterns. This method relies on the principle of graph connectivity to identify and remove patterns which have overlap between multiple groups. This concept is illustrated in FIGS. 9A-9C. FIG. 9A depicts a graphic illustration of a time adjacency matrix wherein each pattern is represented by a node in the graph and each edge between the nodes in the graph indicates temporal adjacencies between the two patterns. In FIG. 9B, the two center nodes are identified as a distinct group of having high connectivity to other nodes. Each node is connected to four other nodes, causing both of the center nodes have a high sum of temporal adjacency values due to increased connectivity. However, the two center nodes have low temporal adjacency values with the other nodes, having the largest temporal adjacency value with each other. In FIG. 9C, the identified group of center nodes (Group 0) is removed from the graph, forming two other distinct sub-graphs representing the remaining groups (Group 1 and 2).

This method of identifying groups based on the time adjacency matrix works well because there are several patterns which will be over-represented or sensed more frequently than others, leading to both higher connectivity and also higher likelihood of connectivity (that is, a high number of temporal adjacencies) with input patterns in multiple groups. Since the rows representing these frequently sensed patterns will be enumerated at each time point, the row representing pattern will have a large value when summed. The inequity in frequency of different patterns produces an uneven distribution over the sum of the rows of the matrix. The sum of the rows of the matrix can then serve as an indicator of the relative frequency of temporal adjacency or "connectivity" of each pattern.

Supervised Mapper Learning and Inference

In a STL top node 300, a supervised mapper 360 receives spatial pooler 202 as input. During supervised learning, the supervised mapper 360 receives the index of a winning spatial co-occurrence from the spatial pooler 202 in conjunction with a category label. During inference, it receives the belief vector y representing the set of probabilities $P(^-e_t|c)$ over the set of spatial co-occurrences. The output of the supervised mapper 360 during inference is a distribution over categories $P(^-e_t|c)$. The supervised mapper 360 produces no output during learning.

During supervised learning, the Supervised Mapper 360 forms a matrix with $N_{coincs}$ rows and one column for each category O it receives as input. The Supervised Mapper 360 retrieves an index for the received category O on each iteration and increments the corresponding value in its mapping matrix. During inference, the Supervised Mapper 360 receives the belief vector $P(^-e_t|c)$ 270 from the spatial pooler 202, and produces a distribution over categories $P(^-e_t|O)$ 380, which are the output of the node.

Enhanced Inference

One or more nodes (hereinafter referred to as the "enhanced inference nodes") may be implemented in the HTM network to perform enhanced inference that allows the HTM network to perform inference based on feedback information from nodes at a higher level and/or the history of state of node. The feedback information represents the state of the enhanced inference node and is provided to its children nodes. The enhanced inference node may also maintain history of its state derived from input patterns or co-occurrences received at the node to perform inference based on temporal relationships of input patterns received during an inference stage. By exchanging the feedback information between nodes and/or maintaining the history of the input patterns at the nodes, the HTM network may infer the cause of the input patterns more accurately.

Figure 10:
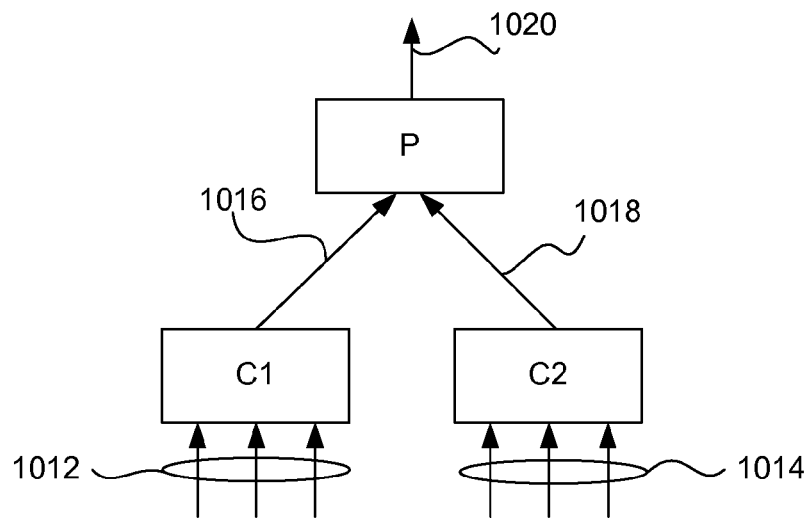
FIG. 10 is a diagram illustrating a parent node and two children nodes in a HTM network, in accordance with an embodiment.

FIG. 10 is a diagram illustrating a parent node P and two children nodes C1, C2, in accordance with one embodiment. In this example, the child node C1 receives an input pattern 1012, performs inference, and outputs the index of "winning" temporal group 1016 to the parent node P. Likewise, the child node C2 also receives input pattern 1014, performs inference, and outputs the index of "winning" temporal group 1018 to the parent node P. The outputs 1016, 1018 collectively form an input pattern for the parent node P. The parent node P performs inference based on the input patterns (that is, outputs 1016, 1018) and also outputs the index of "winning" temporal group 1020.

Figure 11:
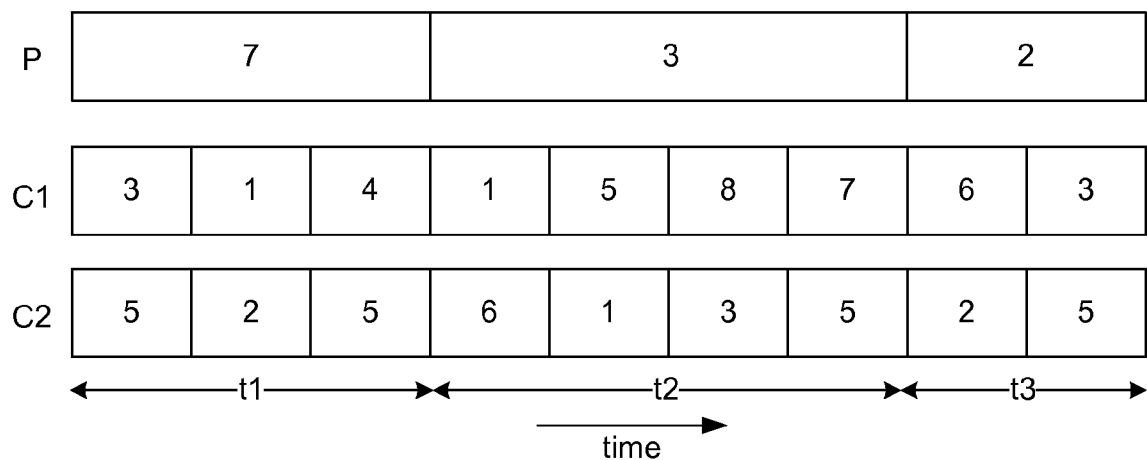
FIG. 11 is a diagram illustrating outputs at the parent node and the children nodes of FIG. 10 in accordance with an embodiment.

FIG. 11 is a diagram illustrating the outputs from the nodes of FIG. 10, in accordance with one embodiment. In this example, the child node C1 outputs indexes of groups in the following sequence: 3, 1, 4, 1, 5, 8, 7, 6, 3. The child node C2 outputs the following sequence of indexes: 5, 2, 5, 6, 1, 3, 5, 2, 5. The parent node P receives indexes from the children nodes C1, C2, and generates output 7, 3, 2 as time progresses. During time t1, the parent node P outputs 7 while the child node C1 outputs the sequence of 3, 1, 4 and the child node C2 outputs the sequence of 5, 2, 5. During time t2, the parent node P outputs 3 while the child node C1 outputs the sequence of 1, 5, 8, 7 and the child node C2 outputs the sequence of 6, 1, 3, 5. During time t3, the parent node P outputs 2 while the child node C1 outputs a sequence of 6, 3 and the child node C2 outputs the sequence of 2, 5. The outputs at the parent node P persists longer than the outputs from the children nodes C1, C2.

Assuming that the nodes P, C1, and C2 are STL nodes described above in detail with reference to FIGS. 2 and 3, only forward information is exchanged between the nodes (that is, information from the children nodes C1, C2 to the parent node P). The children nodes C1, C2 have no information about which co-occurrence is detected at the parent node P and how the detected co-occurrences are grouped at the parent node P. Therefore, the children nodes C1, C2 cannot anticipate which indexes are likely to entail at its output after the current index based on the grouping of the co-occurrences at the parent node P. The parent node P has information about the sequence of outputs from the children nodes C1, C2 that are likely to follow one another. The parent node P, however, has no information when the outputs from the children nodes C1, C2 will change. The change of outputs from the children nodes C1, C2 occur when the children nodes C1, C2 receives input patterns representing a different group is received at the children nodes C1, C2 but the parent node P does not know when such input patterns are received until the children nodes C1, C2 processes the input patterns and provides outputs to the parent node P. Communicating information available in a parent node to the child node during an inference stage is advantageous because a child node may anticipate which temporal group is likely to follow.

Further, a STL node 200, 300 does not update and maintain the history of previous states at the STL node 200, 300. A STL node 200, 300 generates a time adjacency matrix representing the temporal relationships between the spatial co-occurrences and classifies the spatial co-occurrences to groups based on the time adjacency matrix generated during a learning stage. Therefore, in a STL node 200, 300, the temporal relationships of co-occurrences are stored in the form of the time adjacency matrix. The STL node 200, 300, however, does not maintain the history of its previous states during an inference stage. The STL node 200, 300, therefore, outputs the same belief vector $P(^-e_t|G)$ 290 after detecting the same co-occurrences regardless of previous states of the node. In other words, the STL node 200, 300 performs only 'flash inference' based on the currently detected co-occurrences.

By updating and maintaining previously detected co-occurrences in the inference stage, the enhanced inference node may, among others, (i) increase the accuracy of the inference by determining which group was detected in the previously received input patterns, (ii) determine if there is any 'surprise' in the received input patterns, and (iii) make predictions based on previously received input patterns.

Embodiments of the enhanced inference node combine all sources of information to generate probabilities of causes (belief) at a node. The possibilities of causes at a node is mathematically defined as $P(c_t|^-e_0{}^t, {}^+e_0{}^t)$ where $c_t$ refers to a co-occurrence detected at the node at time t, $^-e_0{}^t$ refers to evidence from lower nodes received from time 0 to t, and $^-e_0{}^t$ refers to evidence from upper nodes received from time 0 to time t. Preferably, the exchange of information should be structured so that a node receives and sends only minimal information needed for computing its possibilities of causes. That is, the node should not be required to access or reference an excessive amount of information stored in another node.

Figure 12:
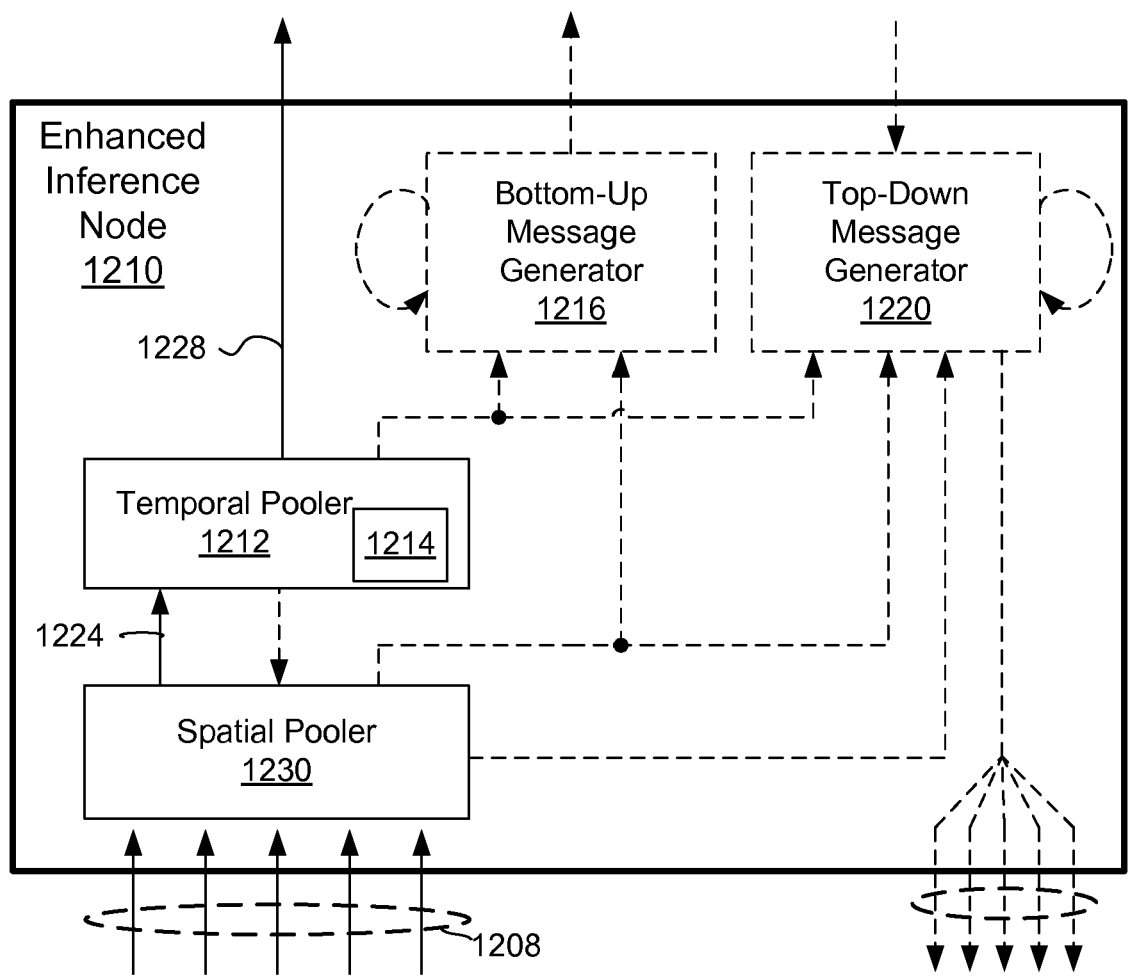
FIG. 12 is a block diagram illustrating an enhanced inference node in a learning stage, in accordance with an embodiment.

FIG. 12 is a block diagram illustrating an enhanced inference node 1210 in a learning stage in accordance with an embodiment. The enhanced inference node 1210 includes, among other components, a temporal pooler 1212, a spatial pooler 1230, a bottom-up parameter generator 1216, and a top-down message generator 1220. The temporal pooler 1212 includes a memory 1214 for storing the time adjacency matrix and temporal statistics data generated by the temporal pooler 1212 as described above in detail with reference to FIGS. 8A to 9C.

The temporal pooler 1212 and the spatial pooler 1230 are substantially identical to the temporal pooler 204 and the spatial pooler 202 of the STL node 200 described above in detail with reference to FIG. 2 except that the temporal pooler 1212 and the spatial pooler 1230 use a variable to represent whether a group g of co-occurrences started at time t or before time t. In one or more embodiments, a binary variable $A_{g_t}$ is adopted to describe the temporal state in the enhanced inference node 1210. Specifically, $A_{g_t}(t)=1$ means that the current group $g_t$ began at time t whereas $A_{g_t}(t)=0$ means that the current group $g_t$ began at some time other than time t. Likewise, $A_{c_t}(t)=1$ denotes that the event causing the co-occurrence at time t began at time t whereas $A_{c_t}(t)=0$ denotes that the event causing the co-occurrence at time t did not begin at time t.

The bottom-up message generator 1216 generates and sends a bottom-up message to a parent node of the enhanced inference node 1210, as described below in detail with reference to FIGS. 14 and 15. The top-down message generator 1220 generates and sends top-down messages to children nodes of the enhanced inference node 1210, as described below in detail with reference to FIGS. 16 and 17. Nodes receiving the bottom-up message or the top-down messages from the enhanced inference node 1210 may be enhanced inference nodes or nodes other than the enhanced inference nodes such as the STL node 200, 300.

In the embodiment illustrated in FIG. 12, the enhanced inference node 1210 learns spatial co-occurrences and groups the spatial co-occurrences in the same manner as the STL node as described above in detail with reference to FIG. 2. Components and data path shown in solid lines of FIG. 12 are active during a learning stage whereas components and data path shown in dashed lines are inactive during the learning stage. Specifically, the spatial pooler 1230 receives input patterns 1208 and generates a set of probabilities $P(^-e_0{}^t|c_t)$ 1224. The temporal pooler 1212 receives the set of probabilities $P(^-e_0{}^t|c_t)$ 1224 from the spatial pooler 1230 and generates a time adjacency matrix. The time adjacency matrix is stored in the memory 1214. After the enhanced inference node 1210 finishes the learning stage, the enhanced inference node 1210 generates a set of probabilities $P(^-e_0{}^t|G)$ 1228 for the same input patterns 1208 so that its parent node may be trained.

Figure 13:
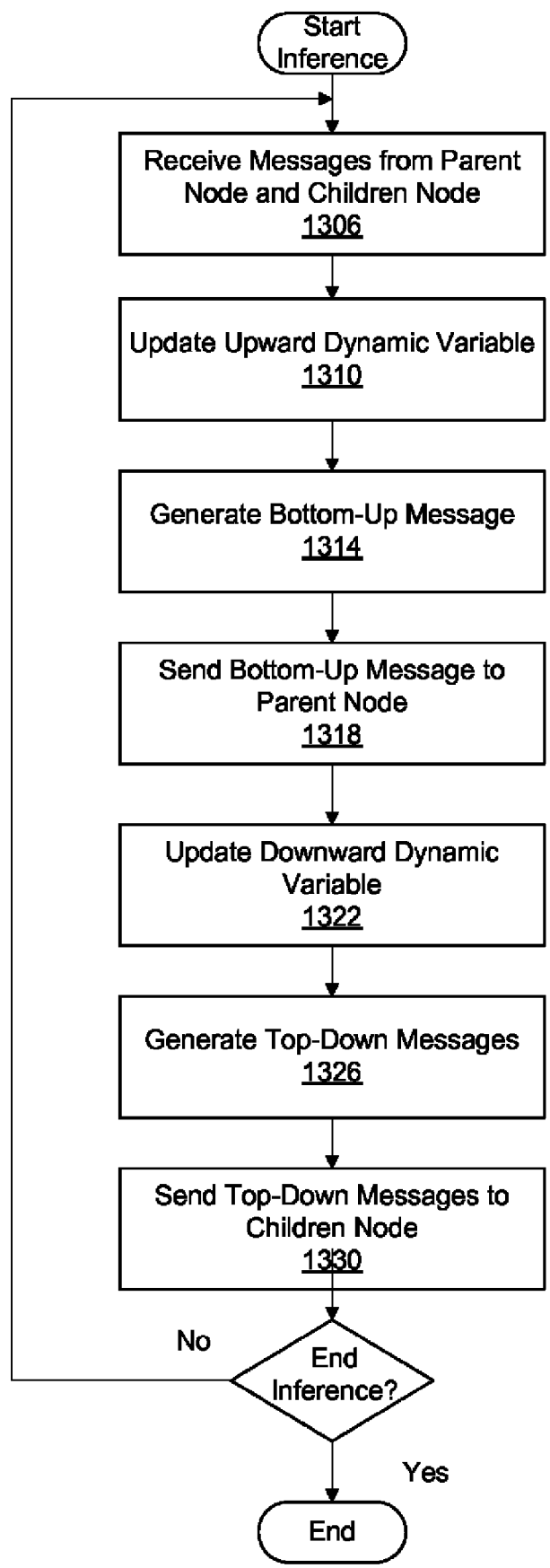
FIG. 13 is a flow chart illustrating a method of performing enhanced inference at a node, in accordance with an embodiment.

FIG. 13 is a flow chart illustrating a method of performing enhanced inference at the enhanced inference node 1210, in accordance with an embodiment. First, the enhanced inference node 1210 receives 1306 a top-down message from its parent node and/or bottom-up messages from children nodes. An upward dynamic variable $\alpha(g_t, c_t, A_{g_t})$ is updated 1310 at the bottom-up message generator 1216 as described below in detail with reference to FIGS. 14 and 15. The upward dynamic variable $=(g_t, c_t, A_{g_t})$ represents the history of states of the enhanced inference node 1210, as described below in detail with reference to FIG. 14. Then the enhanced inference node 1210 generates 1314 a bottom-up message at the bottom-up message generator 1216 based at least on the upward dynamic variable $\alpha(g_t, c_t, A_{g_t})$. The generated a bottom-up message is sent to 1322 the parent node of the enhanced inference node 1210.

A downward dynamic variable $\beta(c_t, g_t)$ is updated 1322 at the top-down message generator 1220. The downward dynamic variable $\beta(c_t, g_t)$ also represents the history of state of the enhanced inference node 1210, as described below in detail with reference to FIG. 16. Then the top-town message generator 1220 generates 1326 top-down messages based at least on the downward dynamic variable $\beta(c_t, g_t)$. The generated top-down messages are sent 1330 to the children nodes. If the inference stage is over, then the process ends. If the inference is to be performed on another input pattern, the process returns to the step 1306 to receive messages from the parent node and the children nodes.

The steps of the process as illustrated in FIG. 13 need not be performed in this sequence. For example, performing steps 1310 to 1318 are not prerequisite to performing steps 1322 to 1330. Therefore, steps 1322 to 1330 may be performed before or in parallel with steps 1310 to 1318.

Bottom-Up Message Generation in Enhanced Inference Node

Figure 14:
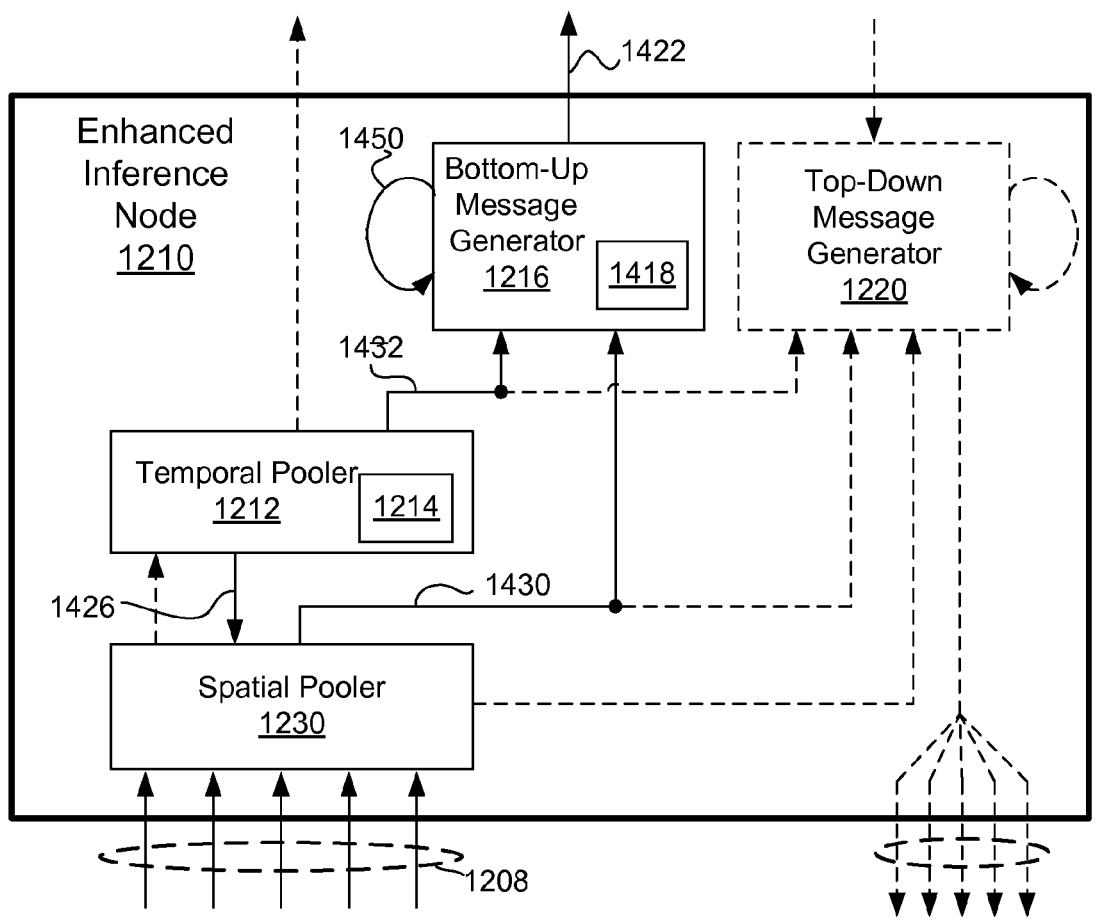
FIG. 14 is a block diagram illustrating an enhanced inference node in an inference stage for generating a bottom-up message, in accordance with an embodiment.

FIG. 14 is a block diagram illustrating the enhanced inference node 1210 in an inference stage for generating a bottom-up message 1422, in accordance with an embodiment. Components and data path shown in solid lines of FIG. 14 are active during an inference stage for generating a bottom-up message whereas components and data path shown in dashed lines are inactive during this stage. As illustrated, the spatial pooler 1230 receives input patterns 1208 and computes a spatial pooler output $P(\bar{e}_0^t | c_t, c_{t-1})$ 1430. The spatial pooler output $P(\bar{e}_0^t | c_t, c_{t-1})$ is computed differently based on whether the transition of group in the temporal pooler 1212 occurred at time t (that is, $A_{g_t}(t)=1$) or not (that is, $A_{g_t}(t)=0$). In one embodiment, the spatial pooler output $P(\bar{e}_0^t | c_t, c_{t-1})$ may be defined by the following equation:

$$P(\bar{e}_0^t | c_t, A_{c_t}(t)) = \prod_{i \in 1 \ldots k} P\left(\bar{e}_0^{t, child_i} \mid g_t^{child_i} \in c_t, A_g^{child_i}(t) = A_{g_t}(t)\right) \quad \text{Equation (3)}$$

where the notation $g_t^{child} \in c_t$ refers to a group in child node i that corresponds to co-occurrence $c_t$. Equation (3) is derived from the conditional dependencies as disclosed, for example, in Judea Pearl, "Probabilistic Reasoning in Intelligent Systems," sections 4.1 and 4.2, Morgan Kaufman (1988), which is incorporated by reference herein in its entirety.

When $c_t \neq c_{t-1}$, the transition occurred at time t, and therefore, the spatial pooler output $P(\bar{e}_t^0 | c_t, c_{t-1})$ can be expressed as follows:

$$P(\bar{e}_0^t | c_t, c_{t-1}) = P(\bar{e}_0^t | c_t, A_{c_t}(t)=1) \quad \text{Equation (4).}$$

Equation $c_t = c_{t-1}$ may be satisfied under two circumstances: (i) the co-occurrence did not finish in the last time step and it remains unchanged ($A_{g_t}(t)=0$) or (ii) the co-occurrence did finish but transitioned back to itself. The probability that the co-occurrence transitioned back to itself $P_{tr,self}(c_t)$ 1426 can be determined directly from the time adjacency matrix stored in the temporal pooler 1212. Using $P_{tr,self}(c_t)$ 1426, the spatial pooler output $P(\bar{e}_0^t | c_t, c_{t-1})$ can be computed as:

$$P(\bar{e}_0^t | c_t, c_{t-1}) = P(\bar{e}_0^t | c_t, A_{c_t}(t)=1)P_{tr,self}(c_t) + P(\bar{e}_0^t | c_t, A_{c_t}(t)=0)(1 - P_{tr,self}(c_t)) \quad \text{Equation (5)}$$

The bottom-up message generator 1216 receives the spatial pooler output $P(\bar{e}_0^t | c_t, c_{t-1})$ 1430 and temporal statistics data 1432 to generate a bottom-up message 1422. The temporal statistics data 1432 is computed by the temporal pooler 1212 based on the time adjacency matrix. The temporal statistics data 1432 is a special form of the time adjacency matrix and represents the probability that the current co-occurrence is detected in the received input pattern given the previous co-occurrences, a previous group, a current group, and whether the transition was made in the previous time step. The temporal statistics data 1432 may be expressed as $$P(c_t | g_t, c_{t-1}, g_{t-1}, A_{g_t}(t)).$$

The temporal statistics data 1432 may be computed using two different equations depending on whether $A_{g_t}(t)=1$ or $A_{g_t}(t)=0$. When the group started at time t (that is, $A_{g_t}(t)=1$), the co-occurrence corresponding to that group must also have started at time t. Also, when $A_{g_t}(t)=1$, the previous co-occurrence does not change the temporal statistics data because groups of co-occurrences are isolated and do not affect co-occurrences or groups across the group-to-group boundary. An assumption is made that there is a constant group-to-group transition, that is, each group is equally likely to be followed by every other group. Therefore, the temporal statistics data 1432 may be simplified as follows:

$$P(c_t | g_t, c_{t-1}, g_{t-1}, A_{g_t}(t)=1) = P(c_t | g_t, A_{g_t}(t)=1) \quad \text{Equation (6)}$$

Equation (6) simply represents the probability that $c_t$ is the starting co-occurrence of group $g_t$. The temporal statistics data of equation (6) may be calculated from the time adjacency matrix stored in the temporal pooler 1212 using the following equation:

$$P(c_t | g_t, A_{g_t}(t)=1) = \begin{cases} 1 - \sum_{c_{t-1} \in g_t} P(c_t | c_{t-1}) & \text{if } c_t \in g_t; \\ 0 & \text{else.} \end{cases} \quad \text{Equation (7)}$$

When the group of co-occurrences did not start at time t (that is, $A_{g_t}(t)=0$), the co-occurrence detected at the enhanced inference node 1210 is one of the co-occurrences in the middle of a group or at the end of the group. Two cases may be considered based on whether the co-occurrence transitioned or not (represented as the value of $A_{g_t}(t)$). The first case is where the co-occurrence did not transition at time t. In this case, $c_t = c_{t-1}$ by definition. The second case is where the co-occurrence did transition. In this case, the temporal statistics data is an intra-group transition probability calculated from the time adjacency matrix using the following equation:

$$\frac{P(c_t | c_{t-1})}{\sum_{c_{t-1} \in g_t} P(c_t | c_{t-1})} \quad \text{Equation (7)}$$

Both cases of the temporal statistics data $P(c_t | g_t, c_{t-1}, g_{t-1}, A_{g_t}(t))$ may be summarized by the following equations:

$$P(c_t | g_t, c_{t-1}, g_{t-1}, A_{c_t}(t)=0, A_{g_t}(t)=0) = \begin{cases} 1 & \text{if } c_t = c_{t-1} \\ 0 & \text{else} \end{cases} \quad \text{Equation (8)}$$

$$P(c_t | g_t, c_{t-1}, g_{t-1}, A_{c_t}(t)=1, A_{g_t}(t)=0) = \quad \text{Equation (9)}$$

$$\begin{cases} \frac{P(c_t | c_{t-1})}{\sum_{c_{t-1} \in g_t} P(c_t | c_{t-1})} & \text{if } c_t \in g_t, g_{t-1} = g_t \\ 0 & \text{else.} \end{cases}$$

The relative weights for the two cases represented by equations (8) and (9) must be determined. Assuming that probability of all co-occurrence transitions given $A_{g_t}(t)=0$ is a constant (that is, Bernouilli-distributed), the following equation can be derived:

$$P(c_t | g_t, c_{t-1}, g_{t-1}, A_{g_t}(t)=0) \approx \quad \text{Equation (10)}$$

$$P(c_t | g_t, c_{t-1}, g_{t-1}, A_{c_t}(t)=0, A_{g_t}(t)=0) \cdot \frac{L-1}{L} +$$

$$P(c_t | g_t, c_{t-1}, g_{t-1}, A_{c_t}(t)=1, A_{g_t}(t)=0) \cdot \frac{1}{L}$$

where L refers to the expected duration of co-occurrences at this level.

In one or more embodiments, the temporal statistics data may be calculated once during initialization and stored for reference by the bottom-up message generator 1216 and the top-down message generator 1220. The temporal statistics data is static and does not change with new inputs. Therefore, the temporal statistics data may be processed once after the learning stage and be used by the bottom-up message generator 1216 when generating the bottom-up message 1422.

In one or more embodiments, the bottom-up message generator 1216 maintains and updates an upward dynamic variable α that is a function of its own previous state and the state of other variables. The upward dynamic variable α is stored in memory 1418 after a time step for computation of the upward dynamic variable α at the next time step. The upward dynamic variable α encompasses all previous state information at the enhanced inference node 1210. One example form of the upward dynamic variable α is as follows:

$$\alpha(g_t, c_t, A_{g_t}(t)) \equiv \sum_{c_0^{t-1}} P(e_0^t \mid c_0^t) P(c_0^t \mid g_t, A_{g_t}(t)) \quad \text{Equation (11)}$$

The upward dynamic variable α of equation (11) corresponds to a pseudo-distribution over groups and coincidences. That is, the upward dynamic variable α may be viewed as a measure of confidence that the current group is $g_t$ and the current co-occurrence is $c_t$.

In order to calculate the upward dynamic variable α at the bottom-up message generator 1216, the following information is needed:

(1) spatial pooler output $P(^-e_0^t | c_t, c_{t-1})$;
(2) temporal statistics data $P(c_t | g_t, c_{t-1}, g_{t-1}, A_{g_t}(t))$;
(3) first information $P(g_{t-1} | g_t, A_{g_t}(t))$; and
(4) second information $P(A_{g_{t-1}}(t-1) | g_{t-1}, A_{g_t}(t))$.

The method of computing spatial pooler output $P(^-e^0_t | c_t, c_{t-1})$ and the temporal statistics data $P(c_t | g_t, c_{t-1}, g_{t-1}, A_{g_t}(t))$ is described above in detail. The method of computing first information $P(g_{t-1} | g_t, A_{g_t}(t))$, and second information $P(A_{g_{t-1}}(t-1) | g_{t-1}, A_{g_t}(t))$ are set forth below. Both the first information $P(g_{t-1} | g_t, A_{g_t}(t))$ and the second information $P(A_{g_{t-1}}(t-1) | g_{t-1}, A_{g_t}(t))$ are expressed differently depending on whether $A_{g_t}(t)=0$ and $A_{g_t}(t)=1$.

The first information is a time-reversed form of the group-to-group transitions. When $A_{g_t}(t)=0$, the group did not transition in this time step. Therefore, by definition, $g_t$ must equal $g_{t-1}$. Hence, the first information $P(g_{t-1} | g_t, A_{g_t}(t))$ may be obtained by the following equation:

$$P(g_{t-1} | g_t, A_{g_t}(t) = 0) = \begin{cases} 1 & \text{if } g_{t-1} = g_t; \\ 0 & \text{else.} \end{cases} \quad \text{Equation (12)}$$

When $A_{g_t}(t)=1$, the group transitioned in this step by definition. Accordingly, the first information $P(g_{t-1} | g_t, A_{g_t}(t))$ is simply a group-to-group transition probability. The group-to-group transition probability refers to the probability of transitioning from one group to another group. The group-to-group transition probability is not a constant and is determined by co-occurrence to co-occurrence transition probability of the parent node of the enhanced inference node 1210. The co-occurrence to co-occurrence transition probability refers the probability that one co-occurrence is likely to be followed by another co-occurrences. The enhanced inference node 1210 may not have information about the co-occurrence to co-occurrence transition probability of the parent node. In one or more embodiment, the group-to-group probability is simplified as a constant. The constant may, for example, be set by a user.

Assuming that group transitions do not occur in consecutive time steps, the second information $P(A_{g_{t-1}}(t-1) | g_{t-1}, A_{g_t}(t))$ can be stated as follows when the group transitioned at this time step (that is, $A_{g_t}(t)=0$):

$$P(A_{g_{t-1}}(t-1)=0 | g_{t-1}, A_{g_t}(t)=1)=1 \quad \text{Equation (13)}$$

$$P(A_{g_{t-1}}(t-1)=1 | g_{t-1}, A_{g_t}(t)=1)=0 \quad \text{Equation (14)}$$

If the group did not start at this time step (that is, $A_{g_t}(t)=0$), the second information $P(A_{g_{t-1}}(t-1) | g_{t-1}, A_{g_t}(t))$ represents the probability that the group started at the previous time step. In one or more embodiments, this probability is assumed to be a constant at all time steps. Therefore, the second information can be stated as follows:

$$P(A_{g_{t-1}}(t-1)=0 | g_{t-1}, A_{g_t}(t)=1) \equiv P_{group\ started\ last} \quad \text{Equation (15)}$$

where $P_{group\ started\ last}$ is a constant that may be set by the user. $P_{group\ started\ last}$ may be $1/T_{exp}$ where $T_{exp}$ is the length of time a group is expected to last.

The upward dynamic variable α can be computed at the bottom-up message generator 1216 using the following equation:

$$\alpha(g_t, c_t, A_{g_t}(t)) = \quad \text{Equation (16)}$$
$$\sum_{c_{t-1}} P(^-e_0^t | c_t, c_{t-1}) \sum_{g_{t-1}} P(c_t | c_{t-1}, g_t, g_{t-1}, A_{g_t}(t))$$
$$P(g_{t-1} | g_t, A_{g_t}(t)) \cdot \sum_{A_{g_{t-1}}(t-1)} P(A_{t-1}(g_{t-1}) | g_{t-1},$$
$$A_{g_t}(t)) \cdot \alpha(g_{t-1}, c_{t-1}, A_{g_{t-1}}(t-1))$$

Note that $\alpha(g_{t-1}, c_{t-1}, A_{g_{t-1}}(t-1))$ appearing in equation (16) indicates the upward dynamic variable at a previous time step t-1. $\alpha(g_{t-1}, c_{t-1}, A_{g_{t-1}}(t-1))$ is stored in the memory 1418 after computing at the previous time step t-1 and retrieved for computation of the upward dynamic variable α by the bottom-up message generator 1216 to compute the dynamic variable at current time step t. The updated dynamic variable α is stored in the memory 1418 so that the upward dynamic variable α may be loaded and updated at the next time step. Arrow 1450 in FIG. 14 indicates that the upward dynamic variable α is recursively computed from the upward dynamic variable of the previous time step.

The upward dynamic variable α represents all previous state information of the node conveniently in the form of a parameter. Because the previous state information is reduced into a single parameter, computational and storage resources associated with retaining and processing the previous state information are minimized.

The bottom-up message generator 1216 generates a bottom-up message 1422 based on the upward dynamic variable α. The bottom-up message 1422 indicates the probabilities of causes computed from evidence gathered from lower nodes given the state of the group of co-occurrences identified by the enhanced inference node 1210. The equation for the bottom-up message 1422 may be expressed as follows:

$$P(^-e_0^t | g_t, A_{g_t}(t)) = \sum_{c_t} \alpha(g_t, c_t, A_{g_t}(t)) \quad \text{Equation (17)}$$

In other words, the bottom-up message 1422 is computed at the bottom-up message generator 1216 by marginalizing the upward dynamic variable α over the co-occurrences $c_t$.

Figure 15:
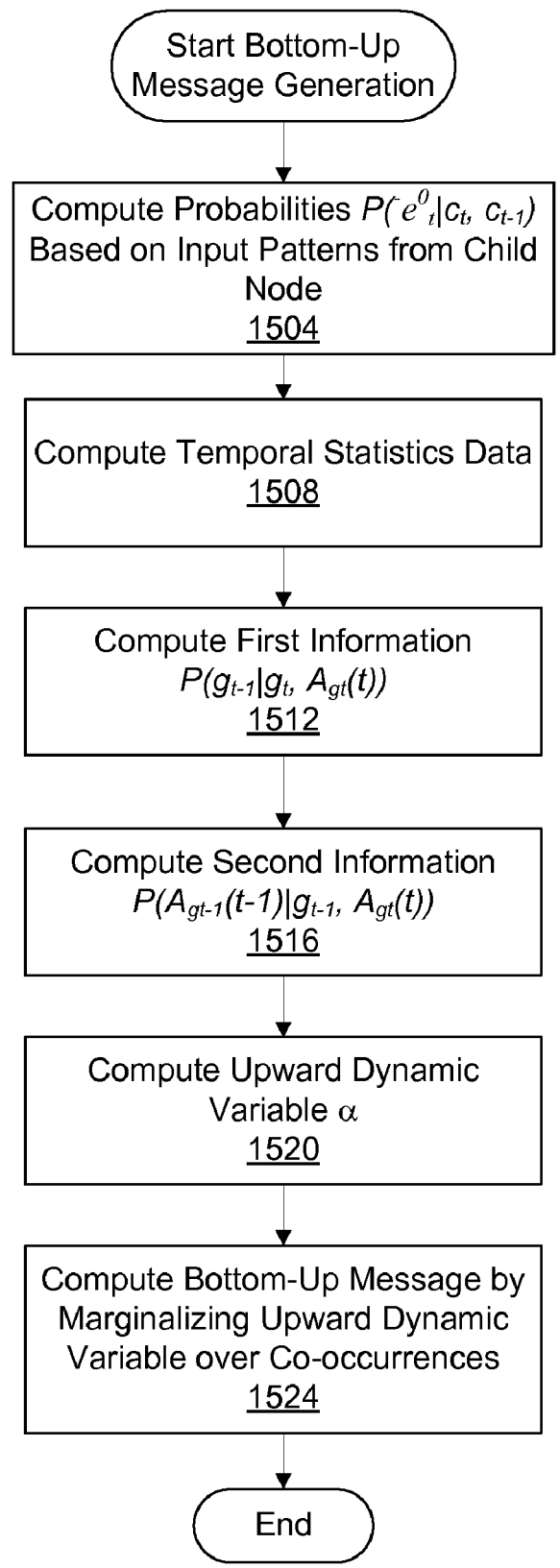
FIG. 15 is a flow chart illustrating a method of generating a bottom-up message in accordance with an embodiment.

FIG. 15 is a flow chart illustrating a method of generating the bottom-up message 1422 in accordance with an embodiment. The probabilities $P(^-e^0_t | c_t, c_{t-1})$ are computed 1504 at the spatial pooler 1230 and provided to the bottom-up message generator 1216. To compute the probabilities $P(^-e^0_t | c_t, c_{t-1})$, the spatial pooler 1230 may receive probability that the co-occurrence transitioned back to itself $P_{tr,self}(c_t)$ 1426 from the temporal pooler 1212. The temporal statistics data $P(c_t | g_t, c_{t-1}, g_{t-1}, A_{g_t}(t))$ is computed 1508 at the temporal pooler 1212 and stored in the memory 1214 for reference by the bottom-up message generator 1216. If the temporal statistics data was computed previously and stored in the memory 1214, this step may be omitted. The second information $P(A_{g_{t-1}}(t-1) | g_{t-1}, A_{g_t}(t))$ is also computed 1516. The upward dynamic variable α is computed 1520 at the bottom-up message generator 1422 using equation (16). The bottom-up message 1422 is then computed 1524 by marginalizing the upward dynamic variable α over co-occurrences $c_t$. The sequence of steps shown in FIG. 15 is merely illustrative and the steps may be performed in a different sequence.

The computed bottom-up message may be sent to the parent node of the enhanced inference node 1210. The parent node may then use the same algorithm to generate its bottom-up message to a grandparent node. Alternatively, the parent node may use an algorithm different from the algorithm used by the enhanced inference node 1210. In one embodiment, all the nodes in the HTM nodes are implemented using the enhanced inference in one form or another. In another embodiment, a set of nodes at a certain level of the HTM network implements the HTM network while other nodes such as the STL nodes are used in other levels of the HTM network.

Generation of Top-Down Messages in Enhanced Inference Node

Figure 16:
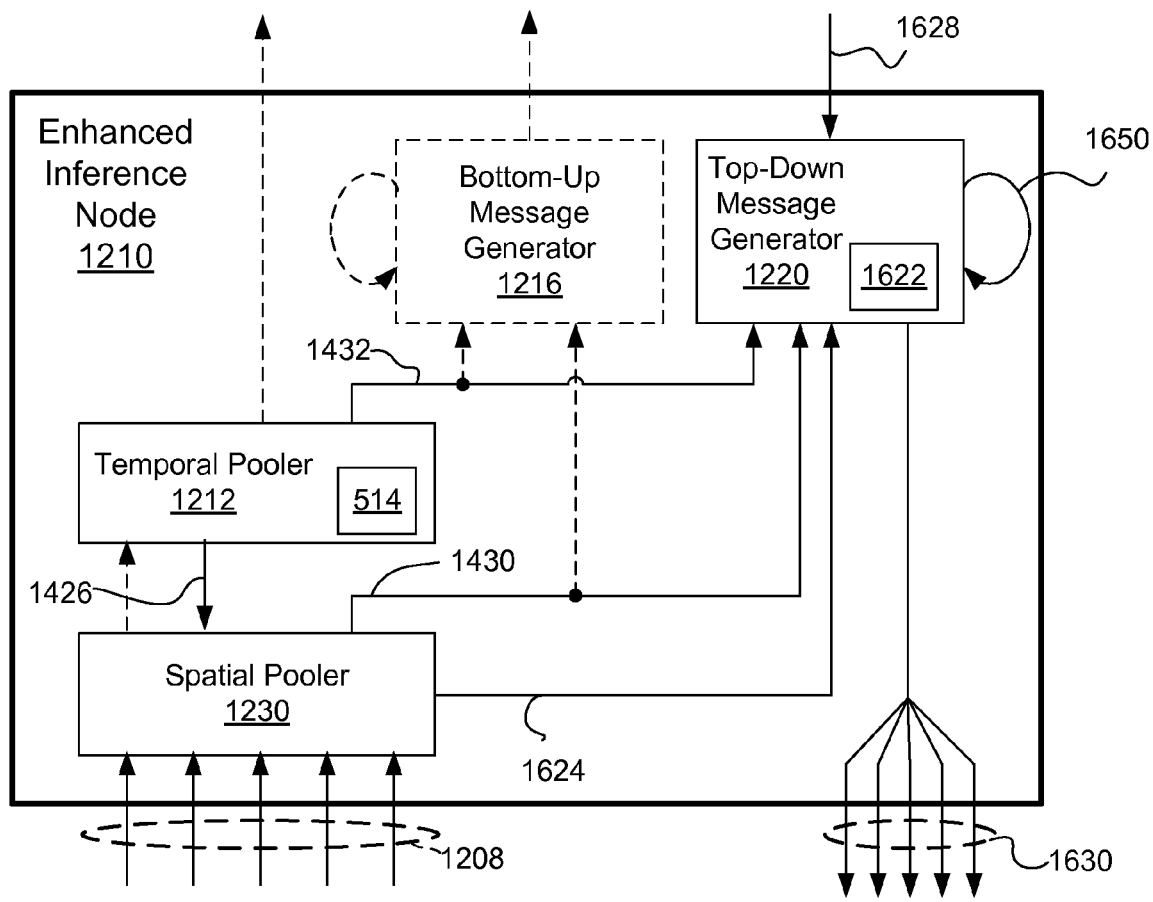
FIG. 16 is a block diagram illustrating an enhanced inference node in an inference stage for generating top-down messages, in accordance with an embodiment.

FIG. 16 is a block diagram illustrating the enhanced inference node 1210 in an inference stage for generating top-down messages 1630 in accordance with an embodiment. Components and data path shown in solid lines of FIG. 16 are active during an inference stage for generating top-down messages whereas components and data path shown in dashed lines are inactive during this stage of the enhanced inference node 1210. The top-down messages 1630 are passed down to children nodes of the enhanced inference node 1210. The top-down messages 1630 indicate the probabilities computed at the enhanced inference node 1210 about the groups identified by its children nodes given all the information available at the enhanced inference node 1210. The information used by the top-down message generator 1220 to generate the top-down message 1630 includes, among others, a top-down message 1628 received from a parent node, the temporal statistics data 1432, the spatial pooler output 1230, and the mapping information 1624 of co-occurrences at the spatial pooler 1230.

In one or more embodiments, a downward dynamic variable β is introduced to generate the top-down messages 1630 at the top-down message generator 1220. The top-down message generator 1220 computes the downward dynamic variable β and stores it in a memory 1622. The downward dynamic variable β is defined as follows:

$$\beta(c_t, g_t) \equiv P(g_t \mid {}^-e_0^t) \sum_{c_0^{t-1}} P({}^-e_0^t \mid c_0^t) P(c_0^t \mid g_t, {}^+e_0^t) \quad \text{Equation (18)}$$

The downward dynamic variable β for a current time step may be computed using the spatial pooler output $P({}^-e_0^t \mid c_t, c_{t-1})$, the temporal statistics data $P(c_t \mid g_t, c_{t-1}, g_{t-1}, A_{g_t}(t))$ and the dynamic variable β of the previous time step according to the following equation:

$$\beta(c_t, g_t) = P(g_t \mid {}^+e_0^t) \sum_{c_{t-1}} P({}^-e_0^t \mid c_t, c_{t-1})$$
$$\sum_{g_{t-1}} P(c_t \mid g_t, c_{t-1}, g_{t-1}) \cdot \beta(c_{t-1}, g_{t-1}) \quad \text{Equation (19-1)}$$

The spatial pooler output $P({}^-e_0^t \mid c_t, c_{t-1})$, and the temporal statistics data $P(c_t \mid g_t, c_{t-1}, g_{t-1}, A_{g_t}(t))$ equation (19-1) are defined and computed, as described above with reference to FIG. 14. Arrow 1650 in FIG. 16 indicates that the downward dynamic variable β is recursively computed from the downward dynamic variable of the previous time step.

$P(c_t \mid {}^-e_0^t, {}^+e_0^t)$ appearing in equation (19-2) indicates co-occurrence probabilities at the enhanced inference node 1210 based on the information received from its parent node in the form of the top-down message 1628 and the information received from the children nodes in the form of input patterns 1208 over time 0 to t. The co-occurrence probabilities $P(c_t \mid {}^-e_0^t, {}^+e_0^t)$ can be computed by marginalizing the downward dynamic variable β over the group $g_t$:

$$P(c_t \mid {}^-e_0^t, {}^+e_0^t) \propto \sum_{g_t} \beta(c_t, g_t) \quad \text{Equation (19-2)}$$

In one or more embodiments, proportionality constant equation (19-2) is not calculated. After marginalizing the downward dynamic variable β, the result is normalized with respect to $c_t$ to obtain the co-occurrence probabilities $P(c_t \mid {}^-e_0^t, {}^+e_0^t)$.

As described, for example, in Judea Pearl, "Probabilistic Reasoning in Intelligent Systems," sections 4.1 and 4.2, Morgan Kaufman (1988), the evidence from nodes above a node includes information from the parents of the node, nodes above the parents, and the sibling nodes. In order to prevent self-enforcing positive feedback loop caused by including information generated by the enhanced inference node 120 itself in the evidence from nodes above the enhanced inference node 1210, all information generated by the enhanced inference node 1210 itself should be removed.

In one or more embodiments, it is assumed that the correct top-downward message 1630 may be approximated by skipping the dividing out of the top-messages from the children nodes altogether. The top-down message generator 1220 computes the co-occurrence probabilities at the enhanced inference node 1210 according to the following equation:

$$P(g_t^{child\,i} \mid {}^+e_0^{t,child\,i}) \approx \begin{cases} P(c_t \mid {}^+e_0^t, {}^-e_0^t) & g_t^{child\,i} \in c_t \\ 0 & \text{else.} \end{cases} \quad \text{Equation (20)}$$

Because the information received from a child node is not divided out at the enhanced inference node 1210, a computational loop is induced when generating the top-down messages 1630 for the children nodes.

After the top-down message generator 1220 computes the co-occurrence probabilities, the top-down message generator 1220 references the mapping information 1624 in the spatial pooler 1230 that indicates which co-occurrence corresponds to which set of group indexes from the children nodes that collectively form the input patterns 1208 of the enhanced inference node 1210. After the probabilities of groups at the children nodes are generated at the top-down message generator 1220, the top-down message generator 1220 identifies the index of the groups at the children nodes based on the mapping information 1624. In an alternative embodiment, the top down message generator 1220 may send the co-occurrence probabilities to the spatial pooler 1230. The spatial pooler 1230 then converts the co-occurrence probabilities into top-down messages for each child node and sends the top-down messages to the children nodes.

Figure 17:
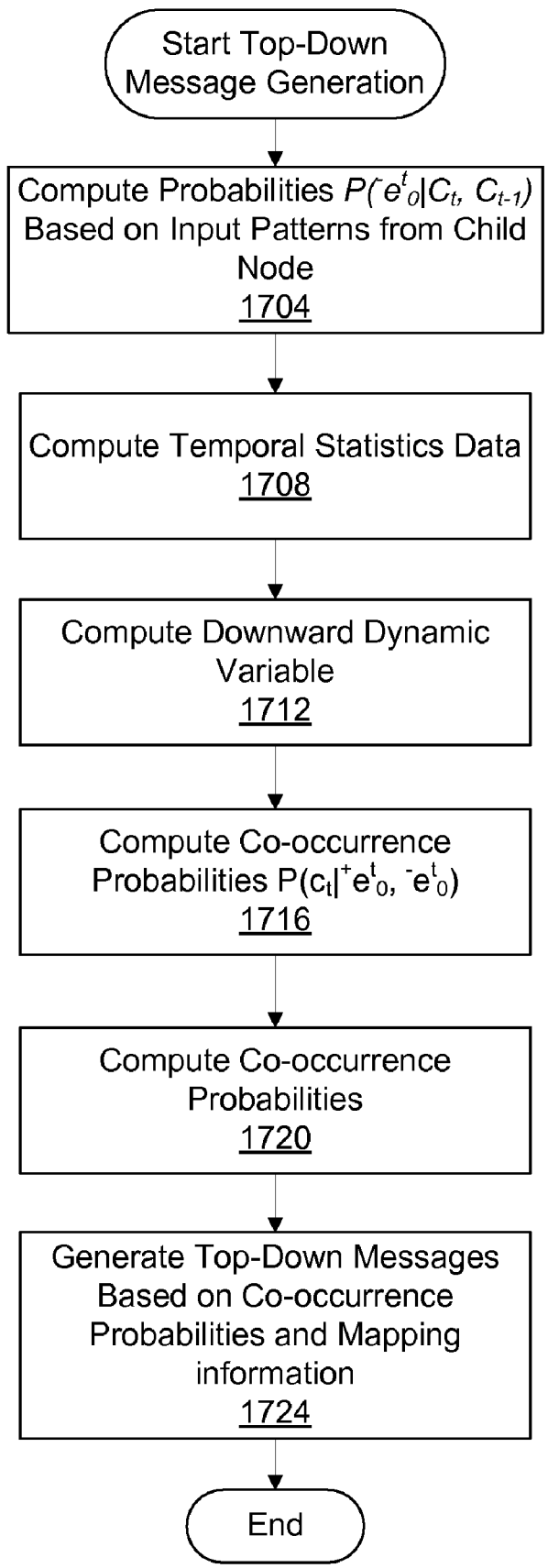
FIG. 17 is a flow chart illustrating a method of generating top-down messages, in accordance with an embodiment.

FIG. 17 is a flow chart illustrating a method of generating a top-down message 1630, in accordance with an embodiment. The spatial pooler 1230 generates an output $P({}^-e_t^0 \mid c_t, c_{t-1})$ based on the input patterns 1208 received at the spatial pooler 1230 and provided to the top-down message generator 1220. To compute the probabilities $P({}^-e_t^0 \mid c_t, c_{t-1})$, the spatial pooler 1230 may receive $P_{tr,self}(c_t)$ 1426 from the temporal pooler 1212, as described above with reference to FIG. 14. The temporal statistics data $P(c_t \mid g_t, c_{t-1}, g_{t-1}, A_{g_t}(t))$ is computed 1708 at the temporal pooler 1212 and stored in the memory 1214 for reference by the top-down message generator 1220. If the temporal statistics data $P(c_t \mid g_t, c_{t-1}, g_{t-1}, A_{g_t}(t))$ was computed previously and stored in the memory 514, this step may be omitted. The downward dynamic variable $\beta$ is computed 1712 at the top-down message generator 1220 equation (19-1). The co-occurrence probabilities $P(c_t|^-e_0^t, +e_0^t)$ is computed 1716 according to equation (20). The computation of the co-occurrence probabilities $P(c_t|^-e_0^t, +e_0^t)$ may involve multiple iterations of computation loop as described below in detail. After the co-occurrence probabilities $P(c_t|^-e_0^t, +e_0^t)$ are computed, the top-down messages 1630 are computed based on the co-occurrence probabilities $P(c_t|^-e_0^t, +e_0^t)$ and the mapping information 1624.

After the child node receives the top-down messages 1630, the child node may also perform enhanced inference as described herein or use a different algorithm to compute the bottom-up message for the next time step. For example, the child node may also be an enhanced inference node 1210 or a STL node 200.

Advantage of Enhanced Inference

One of many advantages in using the enhanced inference node 1210 is that the HTM network may predict future input patterns. The HTM network with the enhanced inference node 1210 may predict further input patterns because the node uses its history and its temporal statistics data to form an expectation of the next input patterns. This is a major difference from the HTM network with only STL nodes 200.

Prediction may be performed by (i) learning input patterns in a learning stage, (ii) presenting input patterns to the system over time in an inference stage, and (iii) "turning off" the input pattern to the HTM network by choosing an appropriate "don't care" input pattern or setting the spatial pooler 1230 of the enhanced inference node 1210 to "don't care" co-occurrence detection, and (iii) receiving an output from the HTM network while the input patterns is "turned off."

The enhanced inference node 1210 must be provided with input patterns 1208 to produce the bottom-up message 1422 or the top-down messages 1630. Therefore, the input patterns 1208 must be carefully chosen to produce messages 1422, 1630 without biasing the enhanced inference node 1210 by the current input patterns 1208. In one or more embodiments, "don't care" inputs are provided to the HTM network or the enhanced inference node 1210 to generate prediction at the HTM network of the enhanced inference node 1210. In an example where all the inputs are either 0 or 1 (for example, binary bitmap), the "don't care" inputs may be 0.5.

After prediction is performed by the HTM network, the enhanced inference nodes 1210 in the HTM network will be in a state different than the state before the prediction because parameters (for example, the upward dynamic variable and the downward dynamic variable) in the enhanced inference nodes change after the prediction. Therefore, the HTM network may not resume inference with actual sensory input patterns by simply restarting the input stream. In one or more embodiments, therefore, the HTM network stores its state before performing prediction and restores the state after performing the prediction so that the inference may be resumed without being affected by the prediction.

Another advantage of using the enhanced inference node 1210 is that the HTM network may yield different outputs based on different temporal histories. The HTM network maintains and updates the upward dynamic variable and the downward dynamic variable representing the history of input patterns at the enhanced inference node 1210. Therefore, the enhanced inference node 1210 may determine the same co-occurrence as belonging to different groups based on input patterns 1208 previously received or the state of variables in the enhanced inference node 1210.

The enhanced inference node 1210 also allows the HTM network to detect "surprising" input patterns. The STL nodes can also detect spatial surprise to the HTM network by monitoring the output probabilities at the top node. In the HTM network without the enhanced inference nodes, low output probabilities in the top node may be interpreted as a surprise to the HTM network. The STL nodes, however, are blind to temporal surprises. For example, even if an object shown in a sequence of images is changed from a cat to a dog abruptly, the STL nodes by themselves would output confidence that would be the same as when a sequence of images continuously and progressively transition from a cat to a dog.

In contrast, the enhanced inference node 1210 stores the past states in the form of upward dynamic variable $\alpha$ and the downward dynamic variable $\beta$. Using these variables, the enhanced inference node 1210 can detect temporal surprises as well as spatial surprises. The upward dynamic variable $\alpha$ and the downward dynamic variable $\beta$ encompass confidence in groups or co-occurrences based on the information received at the enhanced inference node 1210. Therefore, low overall confidence derived from either the upward dynamic variable or the downward dynamic variable is indicative of a spatio-temporal surprise to the HTM network.

In one embodiment, the overall confidence is defined as the sum of upward dynamic variable $\alpha$ and the downward dynamic variable $\beta$. In another embodiment is defined as the maximum value of the upward dynamic value and the downward dynamic variable. High overall confidence indicates that some combinations of learned causes likely explain the input patterns. To the contrary, low overall confidence indicates that none of the learned causes explains the input patterns. In one embodiment, a surprise is detected when the following equation is satisfied:

$$\Sigma_{c_t,g_t} \alpha(c_t,g_t) \leq T_{min} \qquad \text{Equation (20)}$$

where $T_{min}$ represents a threshold for a surprise. The threshold $T_{min}$ may be set by the user depending on the characteristics of the system and the subjective notion of "surprise." In system where the input statistics are relatively stable over time, a small drop in the overall confidence may indicate a surprise whereas in other systems where drops in the overall confidence often occurs, the threshold may be adjusted to a lower level.

The HTM network including the enhanced inference node 1210 may advantageously generate examples of a category. After selecting the category, a single multinomial is provided as top-down input to the top node of the HTM network. That is, a vector with one (1) in the desired category and zeros (0) in other categories are input to the top node as top-down input. Also, the bottom-up messages are turned off by inputting "don't care" messages or setting the spatial pooler 1230 of the enhanced inference node 1210 to "don't care" co-occurrence detection. A typical inference cycle is run at each level of the HTM node, and a single input vector is sampled from the spatial co-occurrence matrix before propagating downwards. At the lowest level of the HTM network, an output pattern is generated to construct an example of the selected category.

Generating examples may be used for determining which input patterns actually triggers particular outputs. For example, the HTM network may (i) generate examples of images corresponding to an object, (ii) generate examples of sounds corresponding to certain genre of music, and (iii) show example of market movements in a bullish stock market.

The HTM network with the enhanced inference node 1210 may also improve inference by filling in missing data or occluded data. Sometimes, sensory data received at the HTM network is occluded or missing. Occluded data is a valid sensory input pattern but it does not accurately reflect the real-world cause because something hinders the valid sensory data from conveying information about the real-world cause (for example, an image where an obstacle blocks a target object) where as the missing data is something absent from the sensory input pattern. The occluded data and missing data may be caused by various reasons including, among others, noises, inherent characteristics of the sensory data, and malfunction of the sensors.

Prediction can be viewed as a special case of filling in missing or occluded data where the entire input pattern is missing. When part of the data set is not missing or occluded, that data may be fed into the HTM network in pace of the "don't care" input used in prediction. Then the identical procedure is followed as in prediction.

Result of Comparative Experiment

Figure 18A:
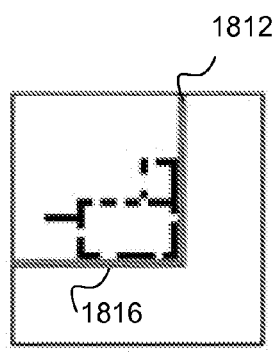
FIG. 18A is a diagram illustrating portion of a black-and-white image for inclusion in a first noisy image, in accordance with an embodiment.

Improved performance of the HTM network using the enhanced inference node is described herein using an example of recognizing an object in a sequence of progressing images. The HTM network was implemented using Numenta Platform for Intelligent Computing (NuPIC) version 1.5 available from Numenta, Inc. of Menlo Park, Calif. FIG. 18A is a diagram illustrating a black-and-white image of a cat where some pixels are missing to represent occluded or missing data. A vertical line 1812 and a horizontal line 1822 indicate the portion of the image to be presented to the HTM network by including in a noisy black-and-white image of FIG. 18B. The pixels indicating the cat is shown in the area 1832 of FIG. 18B.

Figure 18B:
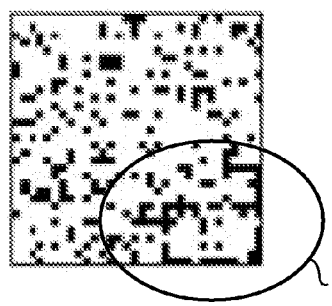
FIG. 18B is a first noisy image including the black-and-white image of a cat for presentation to the HTM network, in accordance with an embodiment.
Figure 18C:
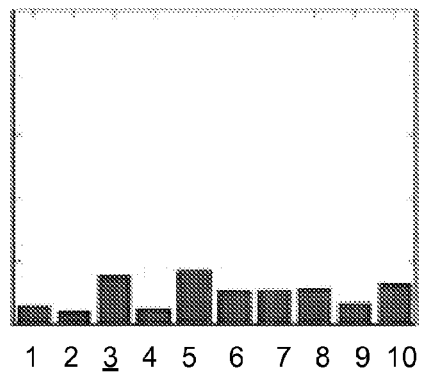
FIG. 18C is the result of performing inference on the first noisy image of FIG. 18B by a HTM network with enhanced inference nodes, in accordance with an embodiment.
Figure 18D:
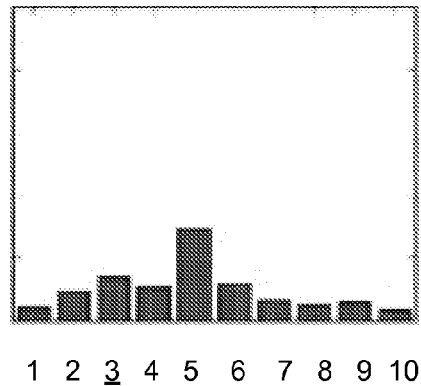
FIG. 18D is the result of performing inference on the first noisy image of FIG. 18B by a HTM network without enhanced inference nodes, in accordance with an embodiment.

FIG. 18C is a graph illustrating the result of performing inference on the image of FIG. 18B using a HTM network with the enhanced inference node 1210. Indexes one to ten at the bottom of FIG. 18C indicate different object where the index for the cat is three (3). The heights of the blocks indicate probabilities that the images include an object identified by the indexes. The image of FIG. 18B is the first image in a sequence of images presented to the HTM network. Therefore, the HTM network with the enhanced inference node 1210 does not have any previous history to enhance its inference. The HTM network with the enhanced inference node outputs index 5 as most likely, which is an incorrect inference. FIG. 18D is a graph illustrating the result of performing inference of the image of FIG. 18B using a HTM network including only STL nodes. In the graph of FIG. 18D, an object identified by index 5 has the highest probability, which is also an incorrect inference. Because the HTM network with the enhanced inference node 1210 does not have any history of input patterns to enhance inference, the result of inference is not significantly different from HTM network with only the STL nodes.

Figure 19C:
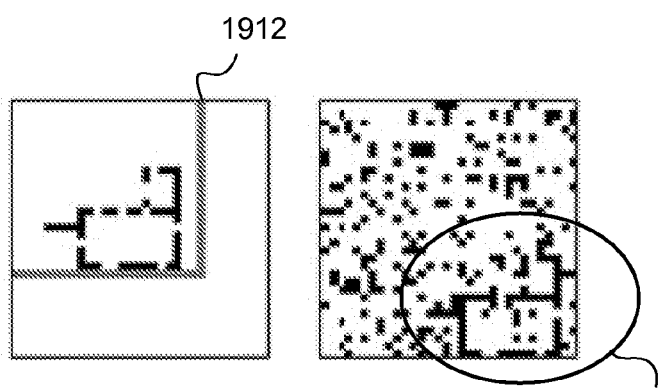
FIG. 19C is the result of performing inference on the second noisy image of FIG. 19B by a HTM network with the enhanced inference node, in accordance with an embodiment.
Figure 19C:
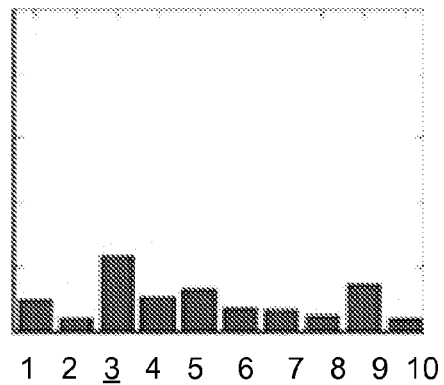
Figure 19D:
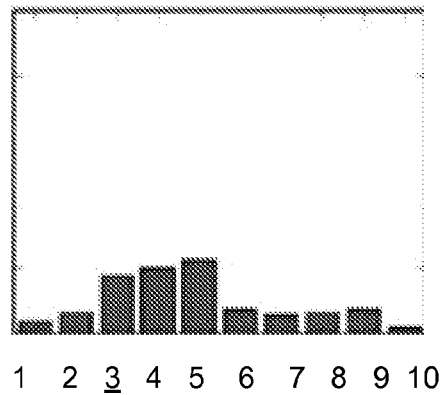
FIG. 19D is the result of performing inference on the second noisy image of FIG. 19B by a HTM network without enhanced inference nodes, in accordance with an embodiment.

FIG. 19A is a second image to be presented to the HTM networks in the form of a noisy image as illustrated in FIG. 19B. The portion of the image to be presented to the HTM networks is expanded compared to the image of FIG. 18A as indicated by line 1912. The selected portion of the image is included in the area 1932 of FIG. 19B. Because the image of FIG. 19B is the second image presented to the HTM network, the HTM network with the enhanced inference node 1210 now has history to enhance its inference. Therefore, the result of inference by the HTM network with the enhanced inference node 1210 now indicates that the object in the image of FIG. 19B is likely to be a cat (index 3). Contrast this with the result of inference by the HTM network without the enhanced inference nodes. Because the HTM network without the enhanced inference nodes does not store previous history to enhance its inference, the HTM network continues to infer incorrectly that the image probably contains an object indicated by index 5.

FIG. 20A is a third image to be presented to the HTM networks in the form of a noisy image as illustrated in FIG. 20B. The image to be presented to the HTM networks is further expanded to the right as indicated by vertical line 2012 and is included in an area 2032 of FIG. 20B. Now that the HTM network with the enhanced inference node has accumulated two previous input patterns as its history, the HTM network with the enhanced inference node has more clears indication that the object is a cat as illustrated in the graph of FIG. 20C. Contrast this with the result from the HTM network without enhanced inference nodes that continues to make an incorrect inference as illustrated in FIG. 20D.

Figure 21:
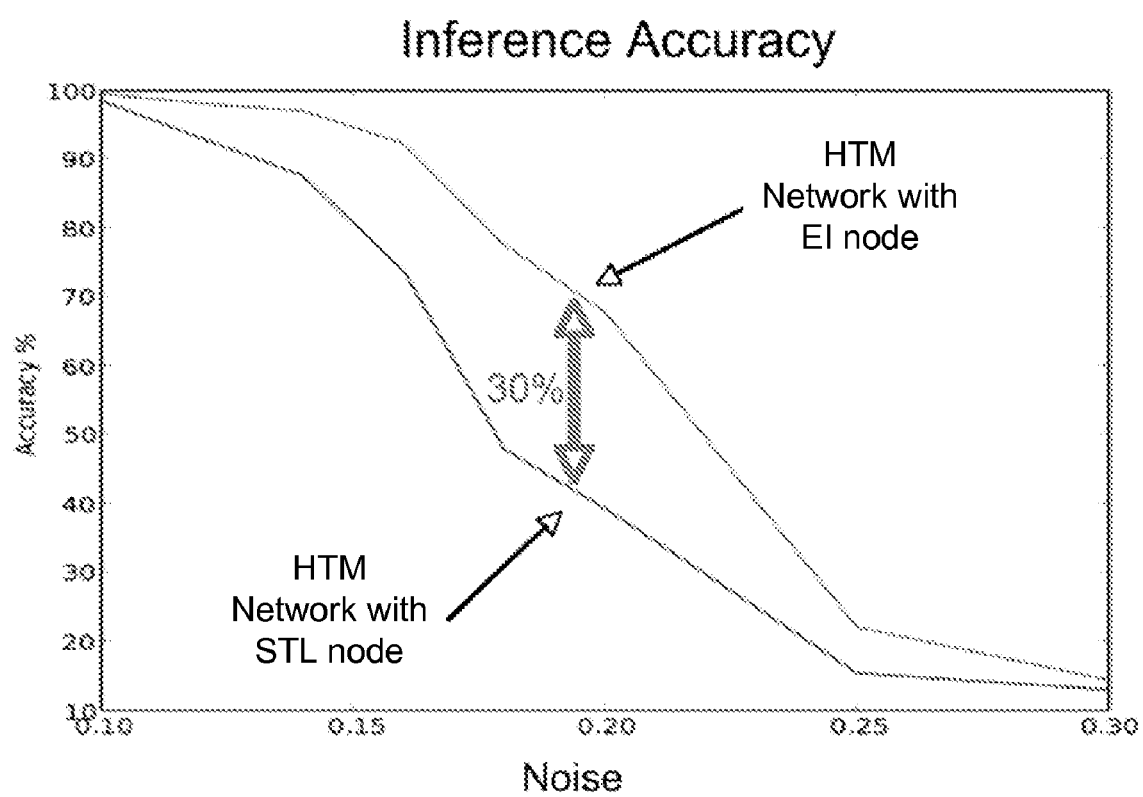
FIG. 21 is a diagram illustrating the accuracy of the inference performed by an HTM network with enhanced inference nodes and an HTM network without enhanced inference nodes, in accordance with an embodiment.

As illustrated in FIGS. 18A to 20D, the enhanced inference node allows the HTM network to perform more accurate inference as well as sharpen its inference based on temporal history of input patterns presented to the HTM network. FIG. 21 is a graph comparing the accuracy of the inference by the HTM network with only STL nodes and HTM network with enhanced inference nodes. FIG. 21 shows the accuracy of inference when different levels of noise were applied to the image. FIG. 21 shows that the HTM network with the enhanced inference nodes is up to 30% more accurate than the HTM nodes with only the STL nodes.

Enhanced Inference Implementation Considerations

A top node of the HTM network with the enhanced inference node is treated the same as the top node of the STL network except that the time adjacency matrix is replaced with the temporal statistics data. The "groups" become the top-level categories, and counts of how many times each co-occurrence occurred in each top-level category $\#(c, g)$ relative to the total frequency of that category $\#(g_t)$ are used. That is, the temporal statistics data at the top node is represented by the following equation:

$$P(c_t \mid g_t, c_{t-1}, g_{t-1}, A_{g_t}(t)) = P(c_t \mid g_t) \qquad \text{Equation (20)}$$

$$= \frac{\#(c_t, g_t)}{\#(g_t)}$$

In one or more embodiments, the HTM network is initialized when the upward dynamic variable $\alpha$ or the downward dynamic variable $\beta$ becomes corrupt. Unlike the STL nodes, the corrupted the upward dynamic variable $\alpha$ and the downward dynamic variable $\beta$ continues to affect the inference at subsequent time steps. Corruption of the dynamic variables may be caused by, among other reasons, noisy or surprising input data, and imperfect learning of the input patterns. The corrupted dynamic variables may be reset by reinitializing the HTM network as described above.

In one or more embodiments, the upward dynamic variable $\alpha(c_t, g_t)$ and/or the downward dynamic variable $\beta(c_t, g_t)$ is normalized by dividing the sum of all $\alpha(c_t, g_t)$ or $\beta(c_t, g_t)$ over all combinations of $c_t$ and $g_t$. If the upward dynamic variable $\alpha$ and/or the downward dynamic variable $\beta$ is continuously updated by multiplying the previous value, these variables quickly become very small. When the upward dynamic variable $\alpha$ and/or the downward dynamic variable $\beta$ become small, they may be treated as zero during digital computation process and contribute to numerical instability. Therefore, the upward dynamic variable or the downward dynamic variable is normalized whenever these variables fall below a threshold.

In embodiments where the assumption is made that the correct top-down message may be approximated by the overall belief as described above with reference to equation (20), the computational loop created in the HTM network by this assumption must be addressed. As set forth above, the presence of the computational loop means that the HTM network does not settle after sending a single message down the HTM network. Rather, multiple messages must be exchanged between the nodes before the HTM network settles. That is, multiple computational iterations need to be performed for each input presentation to the HTM network.

In one or more embodiment, the computational schedule for such iterations is accomplished by assigning to each node multiple phases within each time step to ensure that each node processes a number of times before receiving an input pattern for the next time step. Another critical step is that the node must be informed when new input presentation is provided to the HTM network and the time step needs to be advanced. Otherwise, the node is unable to determine whether variables are being processed as computational iterations within the time step or whether the variables are processed for input patterns of a subsequent time step. In one embodiment, a signal is provided by a sensor coupled to the lowest nodes to indicate that the time has advanced and the output from the lowest nodes represents new input patterns. When the node receives the signal, the node assigns the variables calculated to previous time step and processes the new variables for the current time step. During the next computational iterations before receiving another signal from the sensor, the node simply refines the values of the variables and output messages for current time step but does not shift variables and the messages to a previous time step.

Extension to Higher-Order Markov Models

Although embodiments were described above with reference to first-order Markov models, higher-order Markov models may also be used during the enhanced inference to further enhance performance of the inference. In one or more embodiments, higher-order temporal models are employed to effectively distinguish between different temporal histories. By implementing a higher-order temporal model, the HTM network may perform inference not possible with a lower-order temporal model. For example, it is typically not possible to distinguish a cat moving to the left in a sequence of images from a cat moving to the right in a sequence of images using a first-order temporal model because only the current position of the cat in the image is considered by the HTM network when predicting the next position. By expanding the temporal model to a higher-order, the HTM network may distinguish which direction the cat is moving in.

Figure 22A:
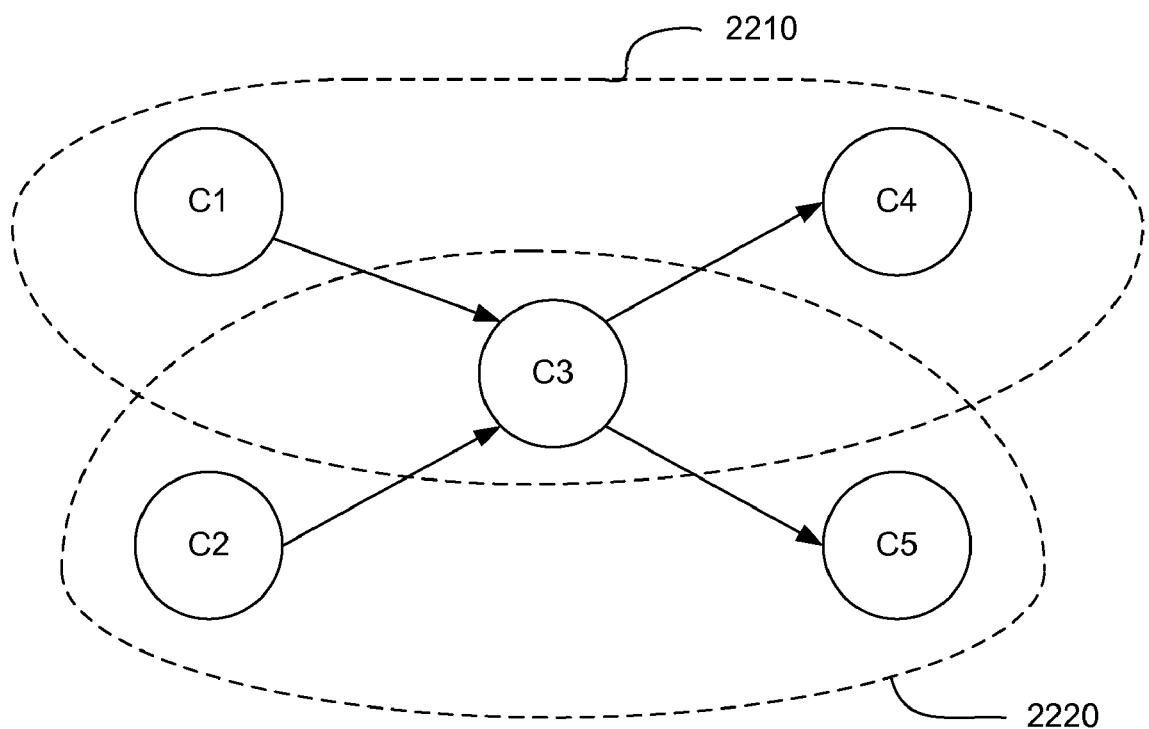
FIG. 22A is a graph illustrating a Markov chain where a co-occurrence is shared by two groups, in accordance with an embodiment.

Two different methods of implementing higher-model Markov model in the enhanced inference nodes are described herein. One way of extending a first-order Markov model into a second-order Markov model is by replicating the co-occurrences shared by two or more groups as described, for example, in G. V. Cormack et al., "Data Compression Using Dynamic Markov Modelling," The Computer Journal, vol. 30, no. 6, pp. 541-550 (1987), which is incorporated by reference herein in its entirety. An example using this method is described below with reference to two temporal groups of co-occurrences, each temporal group including three co-occurrences. FIG. 22A illustrates two groups 2210, 2220 of co-occurrences as detected by the temporal pooler 202, 1212. In group 2210, co-occurrence C1 is followed by co-occurrence C3 followed by co-occurrence C4. In group 2220, co-occurrence C2 is followed by the co-occurrence C3 followed by co-occurrence C5. In the enhanced inference node 1210 that uses the first-order Markov model, the enhanced inference node 1210 generates the same output after receiving the co-occurrence C4 or C5 regardless of whether these co-occurrences followed set of co-occurrences C1-C3 or C2-C3. That is, the enhanced inference node 1210 operating in the first-order Markov model makes no distinction whether the co-occurrence preceding C3 was C1 or C2.

Figure 22B:
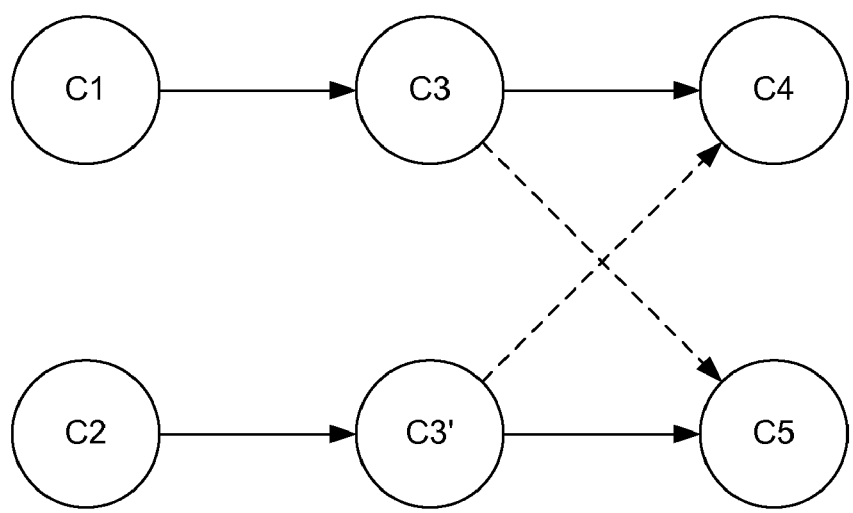
FIG. 22B is a graph illustrating a Markov chain where a co-occurrence is replicated, in accordance with an embodiment.

In order to implement the second-order Markov model, the co-occurrence C3 shared by the two groups 2210, 2220 is replicated as illustrated in FIG. 22B. Co-occurrences likely to be shared by two or more groups are selected and replicated. In one embodiment, the co-occurrences detected frequently are identified as co-occurrences likely to be shared by two or more groups. The co-occurrences including the replicated co-occurrences are then categorized into multiple groups. After grouping the co-occurrences, the time adjacency matrix is updated based on the replicated co-occurrences. Specifically, the entry for the co-occurrence C3 in the time adjacency matrix is incremented only when the co-occurrence C3 is detected after detecting the co-occurrence C1. The entry for the co-occurrence C3' is incremented only after detecting the co-occurrence C2. Therefore, the updated time adjacency matrix now indicates the degree of correlation between the co-occurrence C1, C2 and the co-occurrences C4 and C5.

The operation and function of the spatial pooler 1230, the temporal pooler 1212, the bottom-up message generator 1216 and the top-down message generator 1220 remains essentially the same except that the temporal statistics data is now revised to $P(c_t|c_{t-1}, c_{t-2}, g_t, g_{t-1}, g_{t-2}, A_{g_t}(t))$. Otherwise, the enhanced inference node functions in the same manner as in the case where the first-model Markov model is implemented.

Figure 23:
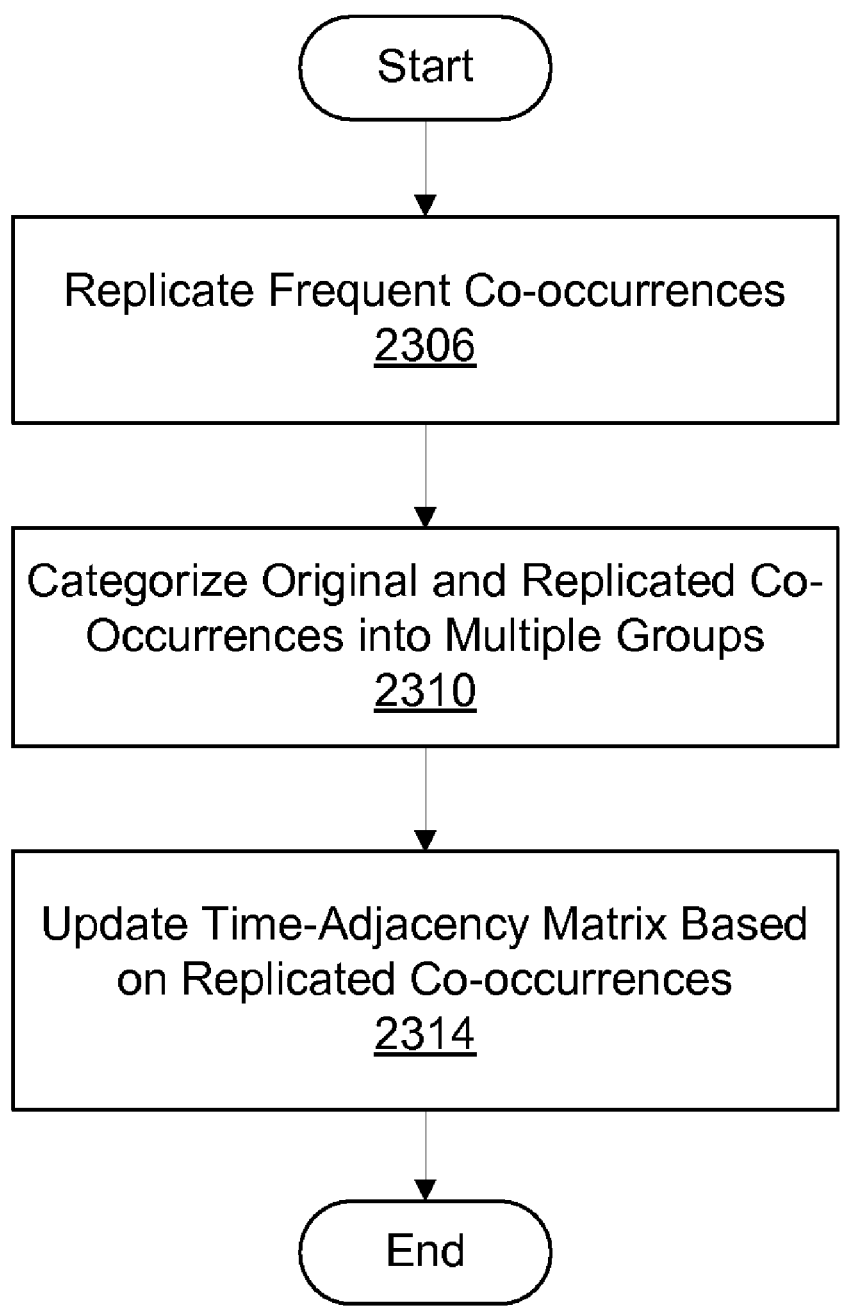
FIG. 23 is a flow chart illustrating a method of generating a higher order Markov model, in accordance with an embodiment.

FIG. 23 is a flow chart illustrating a method of generating a higher-order Markov model, in accordance with an embodiment. First, the co-occurrences frequently detected at the spatial pooler 1230 are replicated 2306. Then the original co-occurrences and replicated co-occurrences are categorized 2310 into groups at the temporal pooler 1212, as described above in detail with reference to FIG. 2. The entries in the time adjacency matrix in the temporal pooler 1212 are updated 2314 to reflect higher-order Markov model.

Another way of extending the first-order Markov model into the second-order Markov model is to replace the equations of the first-order Markov model with equations derived by adding another loop around new variables $c_{t-2}$ and $g_{t-2}$. This requires an expansion in the amount of state required because the last two input patterns, the last two upward dynamic variables, and the last two downward dynamic variables must be stored. The temporal statistics data must also be modified to $P(c_t|c_{t-1}, c_{t-2}, g_t, g_{t-1}, g_{t-2}, A_{g_t}(t))$. The upward dynamic variable for the second-order Markov model is derived as follows:

$$\alpha(g_t, c_t, A_{g_t}(t)) = \qquad\qquad\qquad\qquad \text{Equation (21)}$$
$$\sum_{c_{t-1}}\sum_{c_{t-2}} P(^-e_0^t | c_t, c_{t-1}) P(^-e_0^{t-1} | c_{t-1}, c_{t-2}) \cdot$$
$$\sum_{g_{t-1}}\sum_{g_{t-2}} P(c_t | c_{t-1}, c_{t-2}, g_t, g_{t-1}, g_{t-2}, A_{g_t}(t))$$
$$P(g_{t-1} | g_t, A_{g_t}(t)) P(g_{t-2} | g_{t-1}, A_{g_t}(t)) \cdot$$
$$\sum_{A_{g_{t-1}}(t-1)} P(A_{t-1}(g_{t-1}) | g_{t-1}, A_{g_t}(t))$$
$$\sum_{A_{g_{t-2}}(t-2)} P(A_{t-2}(g_{t-2}) | g_{t-2}, A_{g_{t-1}}(t-1)) \cdot \alpha(g_{t-2}, c_{t-2}, A_{g_{t-2}}(t-2))$$

Other information needed for the second-order Markov model may also be derived in a similar fashion but is omitted herein.

Architecture of HTM Network

Figure 24:
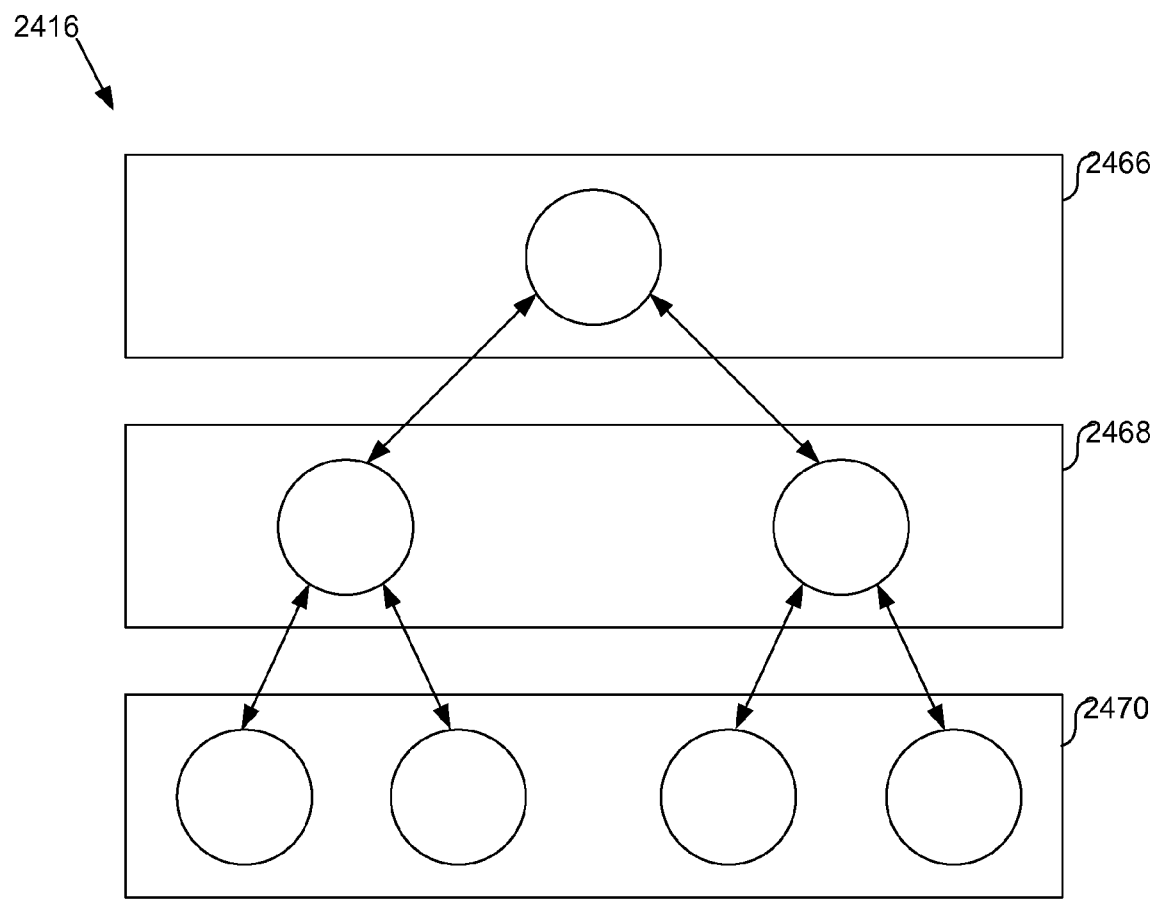
FIG. 24 is a diagram illustrating a HTM network running across several central processing units (CPUs), in accordance with an embodiment.

In one or more embodiments, at least a part of an HTM network including the enhanced inference node is implemented on a software platform. FIG. 24 is a diagram illustrating a HTM network 2416 running across several CPUs 2466, 2468, 2470. The CPUs 2466, 2468, 2470 may either be part of a single system (for example, a single server) or multiple systems. For example, an HTM network may be created in software across several multiprocessor servers, where such a group of servers may be referred to as a "cluster." The servers in a cluster may be heterogeneous, that is, the servers may have differing configurations/specifications (for example, clock speeds, memory size, number of processors per server).

Further, the servers may be connected via Ethernet or one or more other networking protocols such as, for example, Infiniband, Myrinet, or over a memory bus. Further, the servers may run any operating system (OS) (for example, Windows, Linux). In general, each of the servers in a cluster may be responsible for running some portion of an HTM network. The portion of the HTM network dedicated to each server may vary from server to server depending on, for example, the configuration/specification of each server.

Further, in one or more embodiments of the present invention, the CPUs over which an HTM network runs may be located at a single location (for example, at a datacenter) or at locations remote from one another.

Figure 25:
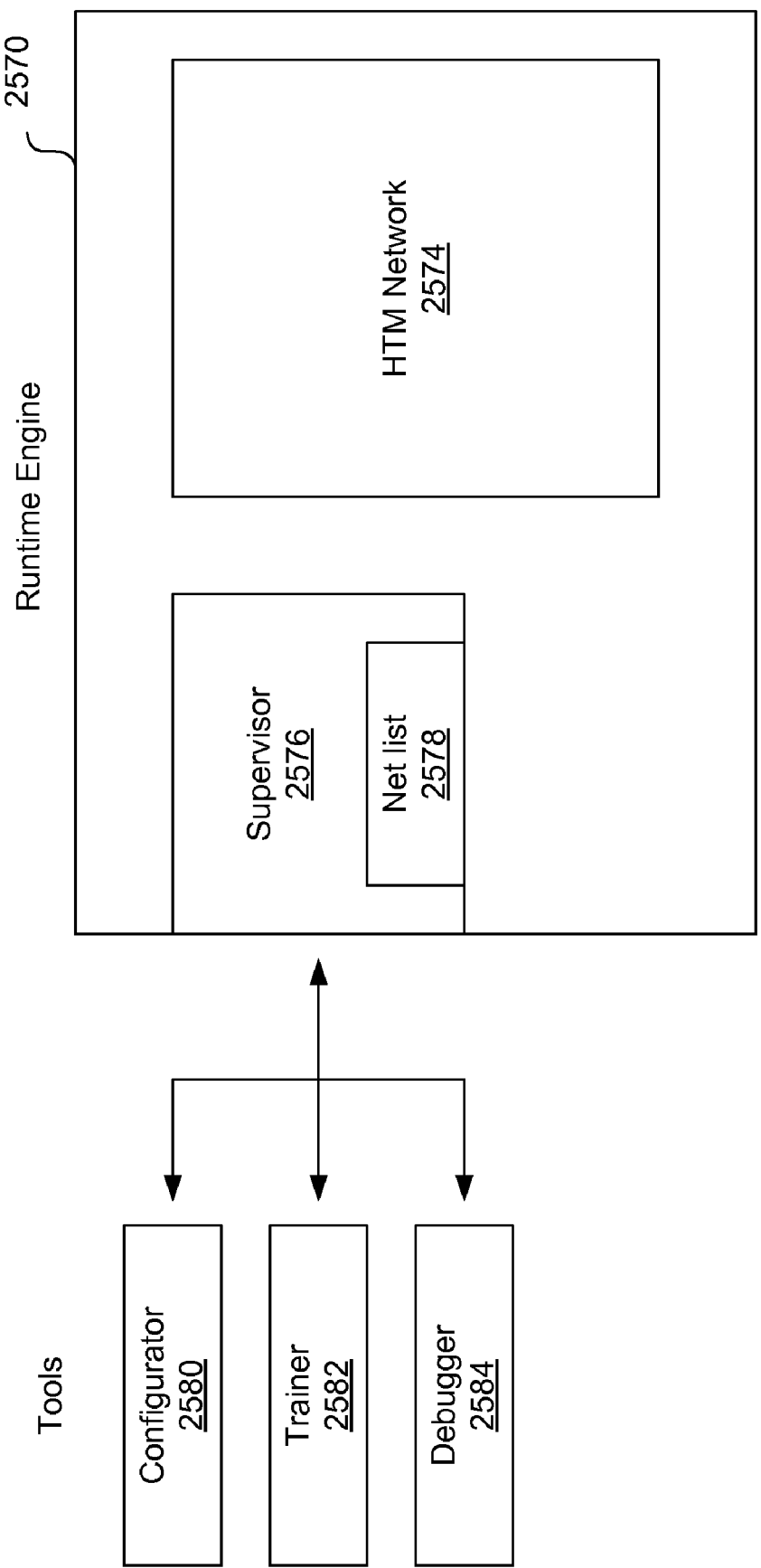
FIG. 25 is a schematic diagram illustrating software components for operating and implementing an HTM network, in accordance with an embodiment.

As described above, in one or more embodiments, at least part of an HTM network may be provided as a software platform. The software executables for creating and running the HTM network may be referred to as being part of a "runtime engine." As shown in FIG. 25, a runtime engine 2570 of an HTM-based system includes, in addition to the executables for running an HTM network 2574, a Supervisor entity 2576. In one or more embodiments, the Supervisor entity 2576 is responsible for, among other things, starting and stopping the HTM network 2574 and communicating with external applications (that is, "tools") 2580, 2582, 2584.

Figure 26:
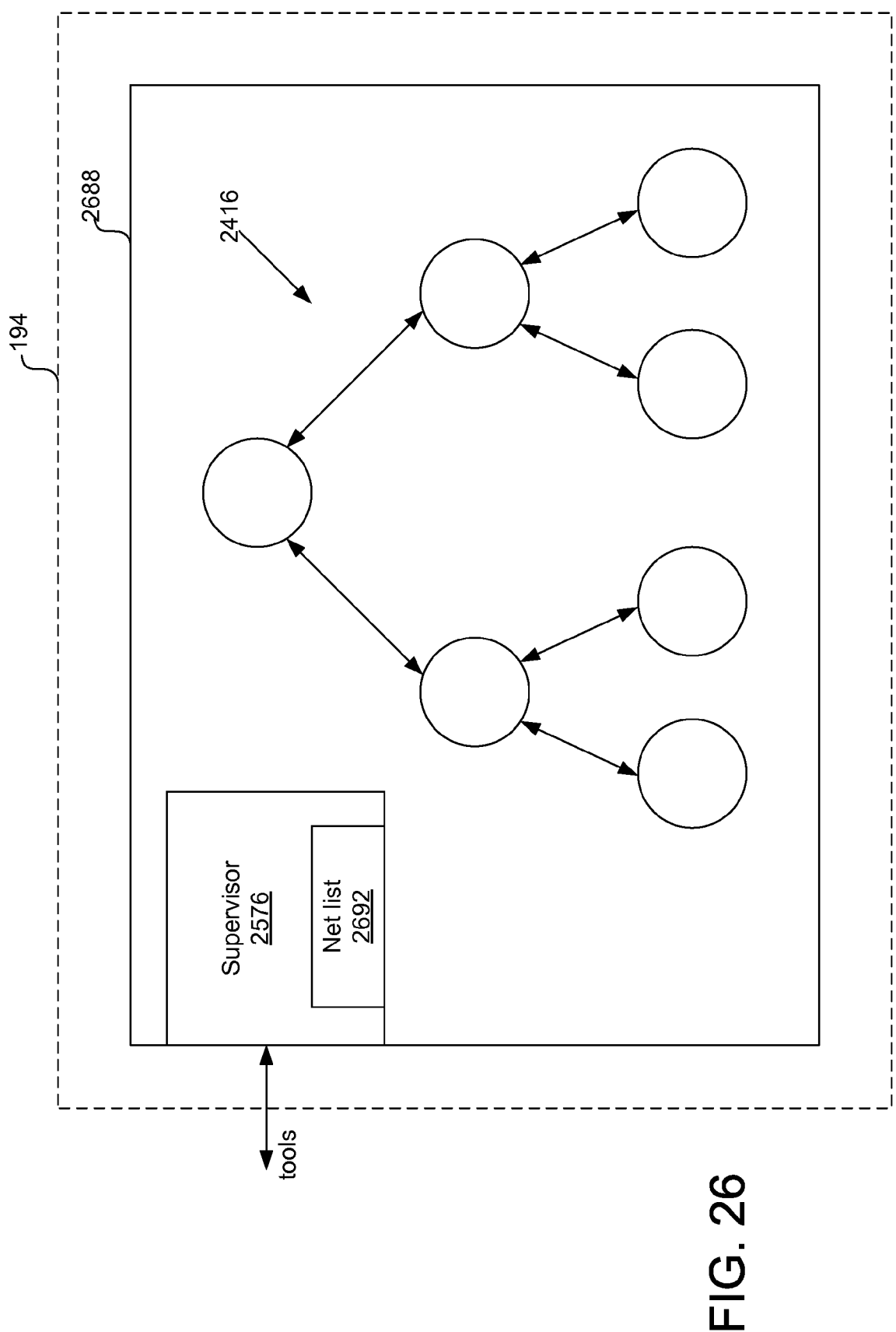
FIG. 26 is a schematic diagram illustrating implementing a HTM network in a runtime engine, in accordance with an embodiment.

As shown in FIG. 26, the Supervisor entity 2576 is associated with a net list 2692. The Supervisor entity 2576 uses a description in the net list 2692 to configure the HTM network 2416. For example, a description in the net list 2692 may specify the distribution of nodes across a given set of CPUs. However, in one or more other embodiments, the Supervisor entity 2576 may configure an HTM network dynamically if, for example, certain information is not contained in the net list 2692. Further, in one or more embodiments, the Supervisor entity 2576 may read a net list from a date file. Further, in one or more embodiments of the present invention, a net list may be specified interactively by a user using one or more tools 2580, 2582, 2584.

Further, in one or more embodiments, the Supervisor entity 2576 may perform global network actions, distribute nodes across CPUs, and/or coordinate CPU activity/behavior. Further, in one or more embodiments, the Supervisor entity 2576 may enforce licensing restrictions such as those relating to, for example, the number of usable CPUs, license expiration dates, number of user limitations, and/or the ability to load third-party "plug-ins." In one or more embodiments, the Supervisor entity 2576 may check for software updates on some regular basis. In such embodiments, if there is a software update available, the Supervisor entity 2576 may, for example, install the software update and restart the HTM network 2416. Further, in one or more embodiments of the present invention, the Supervisor entity 2576 may determine and/or select the order in which portions of the HTM network 2416 are to be updated.

The Supervisor entity 2576 may communicate with one or more CPUs (not shown in FIG. 26) running the HTM network 2416 using, for example, a private or internal application program interface (API). Further, in one or more embodiments of the present invention, the Supervisor entity 2576 and the one or more CPUs (not shown in FIG. 26) running the HTM network 2416 may all be on the same local area network (LAN).

FIG. 26 is a block diagram illustrating at least a portion of an HTM-based system that runs an HTM network 2416 on a single CPU 2688. In such embodiments, an instance of Supervisor entity 2576, along with a net list 2692, may run on CPU 2688.

Figure 27:
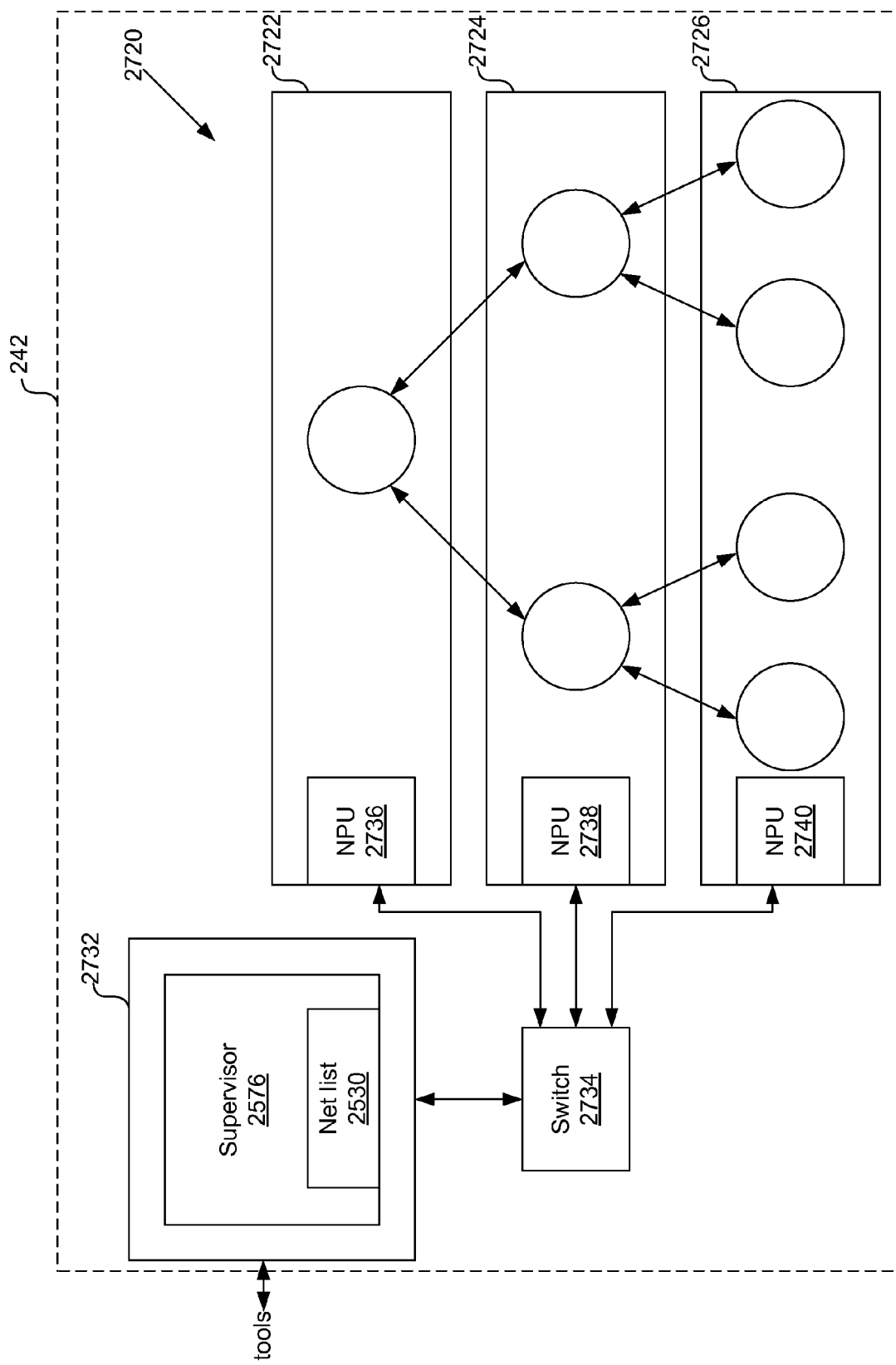
FIG. 27 is a block diagram illustrating at least a portion of an HTM-based system that runs an HTM network on multiple central processing units, in accordance with an embodiment.

FIG. 27 is a block diagram illustrating at least a portion of an HTM-based system that runs an HTM network 2720 on multiple CPUs 2722, 2724, 2726. The CPUs 2722, 2724, 2726 may all be part of the same server (thereby, sharing resources of that server) or they may be distributed over two or more servers. An instance of Supervisor entity 2576, along with a net list 2530, may run on a separate CPU 2732. In such embodiments, the Supervisor entity 2576 may communicate (across, for example, a switch 2734) with instances of "node processing units" (NPUs) 2736, 2738, 2740 running on each of the CPUs 2722, 2724, 2726. Each NPU 2736, 2738, 2740 may be a software component that is responsible for running and/or scheduling a portion (that is, a "sub-net") of the HTM network 2720 running on the CPU 2722, 2724, 2726 to which the NPU 2736, 2738, 2740 is respectively allocated. At an initial stage, each NPU 2736, 2738, 2740 may receive information from the Supervisor entity 2576 describing all or part of the HTM network 2720, including information relating to the portion of the HTM network 2720 that each NPU 2736, 2738, 2740 will manage. Further, each NPU 236, 238, 240 may be responsible for allocating the memory needed for the nodes, links, and other data structures for the portion of the HTM network 2720 for which it is responsible. Further, each NPU 2736, 2738, 2740 may run and/or schedule a portion of the HTM network 2720 in some timing relation to at least one other NPU 2736, 2738, 2740.

In another embodiment, the HTM-based system is implemented on an integrated chip that is capable of performing the algorithms as set forth above. Specifically, the integrated chip may include hardware components in the form of circuit elements that represent nodes of the HTM network. The integrated chips may be installed conveniently into various devices such as vehicles, portable computers, cameras and mobile phones.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A node in a computer-implemented hierarchical temporal memory network, the node associated with a child node, the node comprising:
   a spatial pooler adapted to generate and store information about spatial co-occurrences of first input patterns received at the node based on spatial similarity of the first input patterns in a learning stage, the spatial pooler generating an output representing information about second input patterns received in an inference stage subsequent to the learning stage corresponding to the spatial co-occurrences based on the spatial co-occurrences information, at least part of the first input patterns and at least part of the second input patterns received from the child node;
   a temporal pooler adapted to generate and store temporal statistics data indicating whether the second input patterns include a spatial co-occurrence based on spatial co-occurrences preceding the spatial co-occurrence in the second input patterns and temporal relationships of the spatial co-occurrences learned in the learning stage; and
   a top-down message generator adapted to generate a first top-down message representing information about a state of the node in the inference stage based on the spatial co-occurrences information and the temporal statistics data, the top-down message generator adapted to send the first top-down message to the child node.

2. The node of claim 1, wherein the top-down message generator is adapted to generate the first top-down message further based on history of a previous state of the node in the inference stage.

3. The node of claim 1, wherein the top-down message generator is adapted to generate the first top-down message further based on a second top-down message received from a parent node associated with the node, the second top-down message representing a state of the parent node in the inference stage.

4. The node of claim 1, wherein the top-down message generator is adapted to generate the first top-down message by multiplying a downward dynamic variable, the output of the spatial pooler in the inference stage, and the temporal statistics data, the downward dynamic variable representing history of a state of the node.

5. The node of claim 4, wherein the temporal statistics data is computed based on whether a preceding spatial co-occurrence in the second input patterns is indicative of a transition between temporal groupings of the spatial co-occurrences.

6. The node of claim 1, wherein the spatial pooler is adapted to generate a first output for a third input pattern responsive to previously having received a same third input pattern, and generate a second output for the third input pattern responsive to previously having received a fourth input pattern different than the third input pattern, the first output different than the second output.

7. The node of claim 1, further comprising a bottom-up message generator adapted to generate a bottom-up message representing information that the second input patterns received at the node in the inference stage correspond to the learned spatial co-occurrences based on the second input patterns, the spatial co-occurrences information, and history of a state of the node.

8. The node of claim 1, wherein the temporal pooler is further adapted to:
replicate a spatial co-occurrence shared by two or more temporal groupings of the spatial co-occurrences to represent a higher-order temporal model of first input patterns; and
modify the temporal statistics data according to the replicated spatial co-occurrence.

9. A node in a computer-implemented hierarchical temporal memory network between a parent node and a child node, comprising:
a spatial pooler adapted to generate and store information about spatial co-occurrences of first input patterns received at the node based on spatial similarity of the first input patterns in a learning stage, the spatial pooler generating an output representing information about second input patterns received in an inference stage subsequent to the learning stage corresponding to the spatial co-occurrences based on the spatial co-occurrences information, at least part of the first input patterns and at least part of the second input patterns received from the child node;
a temporal pooler adapted to generate and store temporal statistics data indicating whether the second input patterns include a spatial co-occurrence based on spatial co-occurrences preceding the spatial co-occurrence in the second input patterns and temporal relationships of the spatial co-occurrences learned in the learning stage; and
a bottom-up message generator adapted to generate a first bottom-up message representing information that the second input patterns received at the node in the inference stage correspond to the learned spatial co-occurrences based on the temporal statistics data and the spatial co-occurrences information, the bottom-up message generator adapted to send the first bottom-up message to the parent node.

10. The node of claim 9, wherein the bottom-up message generator is further adapted to generate the first bottom-up message based further on history of the state of the node in the inference stage.

11. The node of claim 9, wherein the temporal statistics data is computed based on whether a preceding spatial co-occurrence in the second input patterns is indicative of a transition between groupings of the spatial co-occurrences generated by the temporal pooler.

12. The node of claim 9, wherein the spatial pooler is adapted to generate a first output for a third input pattern responsive to previously having received a same third input pattern, and generate a second output for the third input pattern responsive to previously having received a fourth input pattern different than the third input pattern, the first output different than the second output.

13. The node of claim 9, wherein the temporal pooler is further adapted to:
replicate a spatial co-occurrence shared by two or more temporal groupings of the spatial co-occurrences to represent a higher-order temporal model of first input patterns; and
modify the temporal statistics data according to the replicated spatial co-occurrence.

14. A non-transitory computer-readable storage medium storing computer instructions adapted to operate a node in a hierarchical temporal memory network on a computer, the node associated with a child node in the hierarchical temporal memory network, the computer instructions when executed cause a processor in the computer to:
generate and store information about spatial co-occurrences of first input patterns received at the node based on spatial similarity of the first input patterns in a learning stage, at least part of the first input patterns received from the child node;
generate information about second input patterns received in an inference stage subsequent to the learning stage corresponding to the spatial co-occurrences based on the spatial co-occurrences information, at least part of the second input patterns received from the child node;
generate and store temporal statistics data indicating whether the second input patterns include a spatial co-occurrence based on spatial co-occurrences preceding the spatial co-occurrence in the second input patterns and temporal relationships of the spatial co-occurrences learned in the learning stage;
generate a first top-down message representing information about a state of the node in the inference stage based on the spatial co-occurrences information and the temporal statistics data; and
send the first top-down message to the child node.

15. The computer-readable storage medium of claim 14, wherein the first top-down message is further based on history of a previous state of the node in the inference stage.

16. The computer-readable storage medium of claim 14, wherein the first top-down message is further based on a second top-down message received from a parent node associated with the node, the second top-down message representing a state of the parent node in the inference stage.

17. The computer-readable storage medium of claim 14, further comprising computer instructions to generate the first top-down message by multiplying a downward dynamic variable, the output and the temporal statistics data, the downward dynamic variable representing history of a state of the node.

18. The computer-readable storage medium of claim 17, further comprising computer instructions to compute the temporal statistics data based on based on whether a preceding spatial co-occurrence in the second input patterns is indicative of a transition between temporal groupings of the spatial co-occurrences.

19. The computer-readable storage medium of claim 15, further comprising computer instructions to:
generate a first output for a third input pattern responsive to previously having received a same third input pattern; and
generate a second output for the third input pattern responsive to previously having received a fourth input pattern different than the third input pattern, the first output different than the second output.

20. The computer-readable storage medium of claim 15, further comprising computer instructions to generate a bottom-up message representing information that the second input patterns received at the node in the inference stage correspond to the learned spatial co-occurrences based on the second input patterns, the spatial co-occurrences information, and history of a state of the node.

21. The computer-readable storage medium of claim 15, further comprising computer instructions to:
replicate a spatial co-occurrence shared by two or more temporal groupings of the spatial co-occurrences to represent a higher-order temporal model of input patterns; and
modify the temporal statistics data according to the replicated spatial co-occurrence.

22. A non-transitory computer-readable storage medium storing a computer program product including computer instructions adapted to instantiate a node of a hierarchical temporal memory network on a computer, the node between a parent node and a child node in the hierarchical temporal memory network, the computer instructions when executed cause a processor in the computer to:
generate and store information about spatial co-occurrences of first input patterns received at the node based on spatial similarity of the first input patterns in a learning stage, at least part of the first input patterns received from the child node;
generating information about second input patterns received in an inference stage subsequent to the learning stage corresponding to the spatial co-occurrences based on the spatial co-occurrences information, at least part of the second input patterns received from the child node;
generate and store temporal statistics data indicating whether the second input patterns include a spatial co-occurrence based on spatial co-occurrences preceding the spatial co-occurrence in the second input patterns and temporal relationships of the spatial co-occurrences learned in the learning stage;
generate a first bottom-up message representing information that the second input patterns received at the node in the inference stage correspond to the learned spatial co-occurrences based on the temporal statistics data and the spatial co-occurrences information; and
send the bottom-up message to the parent node.

23. The computer-readable storage medium of claim 22, further comprising computer instructions to generate the first-bottom-up message based further on history of the state of the node in the inference stage.

24. The computer-readable storage medium of claim 22, wherein the temporal statistics data is computed based on whether a preceding spatial co-occurrence in the second input patterns is indicative of a transition between groupings of the spatial co-occurrences.

25. The computer-readable storage medium of claim 22, further comprising computer instructions to:
generate a first output for a third input pattern responsive to previously having received a same third input pattern; and
generate a second output for the third input pattern responsive to previously having received a fourth input pattern different than the third input pattern, the first output different than the second output.

26. The computer-readable storage medium of claim 22, further comprising computer instructions to:
replicate a spatial co-occurrence shared by two or more temporal groupings of the spatial co-occurrences to represent a higher-order temporal model of first input patterns; and
modify the temporal statistics data according to the replicated spatial co-occurrence.

27. A method for operating a hierarchical temporal memory network on a computer, comprising:
generating information about spatial co-occurrences of first input patterns received at a node based on spatial similarity of the first input patterns in a learning stage, at least part of the first input patterns received from a child node;
generating information about second input patterns received in an inference stage subsequent to the learning stage corresponding to the spatial co-occurrences based on the spatial co-occurrences information, at least part of the second input patterns received from the child node;
by a processor, generating temporal statistics data indicating whether the second input patterns include a spatial co-occurrence based on spatial co-occurrences preceding the spatial co-occurrence in the second input patterns and temporal relationships of the spatial co-occurrences learned in the learning stage;
generating a first top-down message representing information about a state of the node in the inference stage based on the spatial co-occurrences information and the temporal statistics data; and
sending the first top-down message to the child node.

28. A method for operating a hierarchical temporal memory, comprising:
generating information about spatial co-occurrences of first input patterns received at the node based on spatial similarity of the first input patterns in a learning stage, at least part of the first input patterns received from a child node;
generating information about second input patterns received in an inference stage subsequent to the learning stage corresponding to the spatial co-occurrences based on the spatial co-occurrences information, at least part of the second input patterns received from the child node;
by a processor, generating temporal statistics data indicating whether the second input patterns include a spatial co-occurrence based on spatial co-occurrences preceding the spatial co-occurrence in the second input patterns and temporal relationships of the spatial co-occurrences learned in the learning stage;
generate a first bottom-up message representing information that the second input patterns received at the node in the inference stage correspond to the learned spatial co-occurrences based on the temporal statistics data and the spatial co-occurrences information; and
send the bottom-up message to a parent node.

* * * * *